(12) United States Patent
Lee et al.

(10) Patent No.: US 10,635,902 B2
(45) Date of Patent: *Apr. 28, 2020

(54) ELECTRONIC APPARATUS AND OPERATING METHOD THEREOF

(71) Applicant: Samsung Electronics Co., Ltd., Gyeonggi-do (KR)

(72) Inventors: Wu Seong Lee, Sejong-si (KR); Sihong Kim, Gyeonggi-do (KR); Taekyun Kim, Gyeonggi-do (KR); Young-Chul Shin, Gyeonggi-do (KR); Jung-Jae Lee, Gyeongsangbuk-do (KR); Jonghee Han, Seoul (KR); Seung-Nyun Kim, Incheon (KR); Byoung-Uk Yoon, Gyeonggi-do (KR); So-Young Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 82 days.

This patent is subject to a terminal disclaimer.

(21) Appl. No.: 15/612,601

(22) Filed: Jun. 2, 2017

(65) Prior Publication Data
US 2017/0351900 A1 Dec. 7, 2017

(30) Foreign Application Priority Data
Jun. 2, 2016 (KR) ........................ 10-2016-0068647

(51) Int. Cl.
*G06K 9/00* (2006.01)
*B64D 47/08* (2006.01)
(Continued)

(52) U.S. Cl.
CPC .......... *G06K 9/0063* (2013.01); *B64C 39/024* (2013.01); *B64D 47/08* (2013.01);
(Continued)

(58) Field of Classification Search
CPC ............. G06K 9/0063; G06K 9/00711; G06K 9/00255; G06K 9/00288; G06K 9/46;
(Continued)

(56) References Cited

U.S. PATENT DOCUMENTS

| 8,594,862 B2 | 11/2013 | Callou et al. |
| 8,958,928 B2 | 2/2015 | Seydoux et al. |

(Continued)

FOREIGN PATENT DOCUMENTS

| CN | 103731599 | 4/2014 |
| CN | 105391939 | 3/2016 |

(Continued)

OTHER PUBLICATIONS

Chinese Office Action dated Jan. 2, 2020 issued in counterpart application No. 201710407624.9, 31 pages.

*Primary Examiner* — Hee-Yong Kim
(74) *Attorney, Agent, or Firm* — The Farrell Law Firm, P.C.

(57) ABSTRACT

An unmanned photographing device and method thereof is provided which includes establishing a wireless connection with an external electronic device using a communication device, receiving a first signal at a first three-dimensional (3D) position from the external electronic device through the wireless connection, the first signal comprising data associated with a first image comprising a first object, determining a second 3D position based on at least part of the data and the first 3D position, controlling the unmanned photographing device to fly to or near the second 3D position, tracking a second object corresponding to the first object using a camera, and capturing a second image comprising the second object at or near the second 3D position such that the second image corresponds to the first image.

20 Claims, 58 Drawing Sheets

(51) Int. Cl.
*G05D 1/00* (2006.01)
*G06K 9/46* (2006.01)
*H04N 5/232* (2006.01)
*H04N 5/225* (2006.01)
*B64C 39/02* (2006.01)
*G06T 7/73* (2017.01)
*G05D 1/10* (2006.01)
*G01C 11/02* (2006.01)
*H04N 13/296* (2018.01)
*H04N 13/239* (2018.01)

(52) U.S. Cl.
CPC ........... *G01C 11/02* (2013.01); *G05D 1/0094* (2013.01); *G06K 9/00228* (2013.01); *G06K 9/00255* (2013.01); *H04N 5/2257* (2013.01); *H04N 5/23203* (2013.01); *H04N 5/23206* (2013.01); *B64C 2201/127* (2013.01); *B64C 2201/146* (2013.01); *H04N 13/239* (2018.05); *H04N 13/296* (2018.05)

(58) Field of Classification Search
CPC .... B64C 39/024; B64D 47/08; G05D 1/0022; G05D 1/0038; G06T 7/74; H04N 5/23296; H04N 5/23206; H04N 5/2252

USPC ......................................................... 348/144
See application file for complete search history.

(56) References Cited

U.S. PATENT DOCUMENTS

| 9,164,506 | B1 | 10/2015 | Zang | |
|---|---|---|---|---|
| 2009/0043422 | A1 | 2/2009 | Lee et al. | |
| 2012/0307042 | A1 | 12/2012 | Lee et al. | |
| 2014/0316616 | A1* | 10/2014 | Kugelmass | G05D 1/101 701/8 |
| 2016/0088286 | A1* | 3/2016 | Forsythe | G06F 17/30528 348/46 |
| 2017/0180623 | A1* | 6/2017 | Lin | G05D 1/0094 |
| 2017/0369164 | A1* | 12/2017 | Klein | B64C 39/024 |

FOREIGN PATENT DOCUMENTS

| CN | 105438488 | 3/2016 |
|---|---|---|
| JP | 2006027448 | 2/2006 |
| KR | 1020150097274 | 8/2015 |

* cited by examiner

SMART WATCH SENDS TARGET COMPOSITION

SEND TARGET COMPOSITION

ELECTRONIC APPARATUS AND OPERATING METHOD THEREOF

PRIORITY

This application claims priority under 35 U.S.C. § 119(a) to Korean Patent Application Serial No. 10-2016-0068647, which was filed in the Korean Intellectual Property Office on Jun. 2, 2016, the entire content of which is incorporated herein by reference.

BACKGROUND

1. Field of the Disclosure

The present disclosure generally relates to an electronic apparatus, and more particularly to an electronic apparatus for unmanned photographing, and a method thereof.

2. Description of the Related Art

An unmanned electronic device may be wirelessly connected to and remotely controlled by a remote controller (RC). To take a picture using the unmanned electronic device, the unmanned electronic device may be controlled through the RC to take a picture.

Since a user needs to directly control an unmanned photographing device to take a picture, it is difficult to control the unmanned photographing device. Also, to attain an intended composition of the image captured by the unmanned photographing device, the unmanned photographing device and a camera should be controlled at the same time.

SUMMARY

An aspect of the present disclosure provides an apparatus and a method for setting an intended image and composition using an unmanned photographing device and sending it to the unmanned photographing device in an electronic device.

Another aspect of the present disclosure provides an apparatus and a method for determining an object of a subject according to composition information received from an electronic device, automatically moving an unmanned photographing device, and capturing an image of the set composition in the unmanned photographing device.

Another aspect of the present disclosure provides, an apparatus and a method for autonomously flying an unmanned photographing device to capture an image with a composition set by a user, and when recognizing the set composition, automatically capturing the image in association with a mobile communication device in the unmanned photographing device.

According to an aspect of the present disclosure, an unmanned photographing device is provided which includes a housing, a navigation device attached to or integrated with the housing and configured to fly an electronic device to a three-dimensional (3D) position, at least one wireless communication device, a camera attached to or integrated with the housing, a processor electrically connected to the navigation device, the communication device, and the camera, and a memory electrically connected to the processor and storing instructions, which when executed, cause the processor to establish a wireless connection with an external electronic device using the communication device, receive a first signal at a first 3D position from the external electronic device through the wireless connection, the first signal comprising data associated with a first image comprising a first object, determine a second 3D position based on at least part of the data and the first 3D position, control the navigation device to fly the electronic device to or near the second 3D position, track a second object corresponding to the first object using the camera, capture a second image comprising the second object at or near the second 3D position such that the second image corresponds to the first image, and send the second image to the external electronic device through the wireless connection.

According to another aspect of the present disclosure, an electronic device is provided which includes a housing, at least one wireless communication device, a camera attached to or integrated with the housing, a display, a processor electrically connected to the communication device and the camera, and a memory electrically connected to the processor and storing instructions, which when executed, cause the processor to establish a wireless connection with an unmanned photographing device using the at least one communication device, send a first signal to the unmanned photographing device through the wireless connection, the first signal comprising data associated with a first image comprising a first object, and receive a second image from the unmanned photographing device through the wireless connection.

According to another aspect of the present disclosure, a method for operating an unmanned photographing device is provided which includes establishing a wireless connection with an external electronic device using a communication device, receiving a first signal at a first 3D position from the external electronic device through the wireless connection, the first signal comprising data associated with a first image comprising a first object, determining a second 3D position based on at least part of the data and the first 3D position, controlling the unmanned photographing device to fly to or near the second 3D position, tracking a second object corresponding to the first object using a camera, capturing a second image comprising the second object at or near the second 3D position such that the second image corresponds to the first image, and sending the second image to the external electronic device through the wireless connection.

According to another aspect of the present disclosure, a method for operating an electronic device is provided which includes establishing a wireless connection with the unmanned photographing device using a communication device, sending target composition data to the unmanned photographing device through the wireless connection, the target composition data comprising data of the first image comprising an object, and receiving the second image from the unmanned photographing device through the wireless connection.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
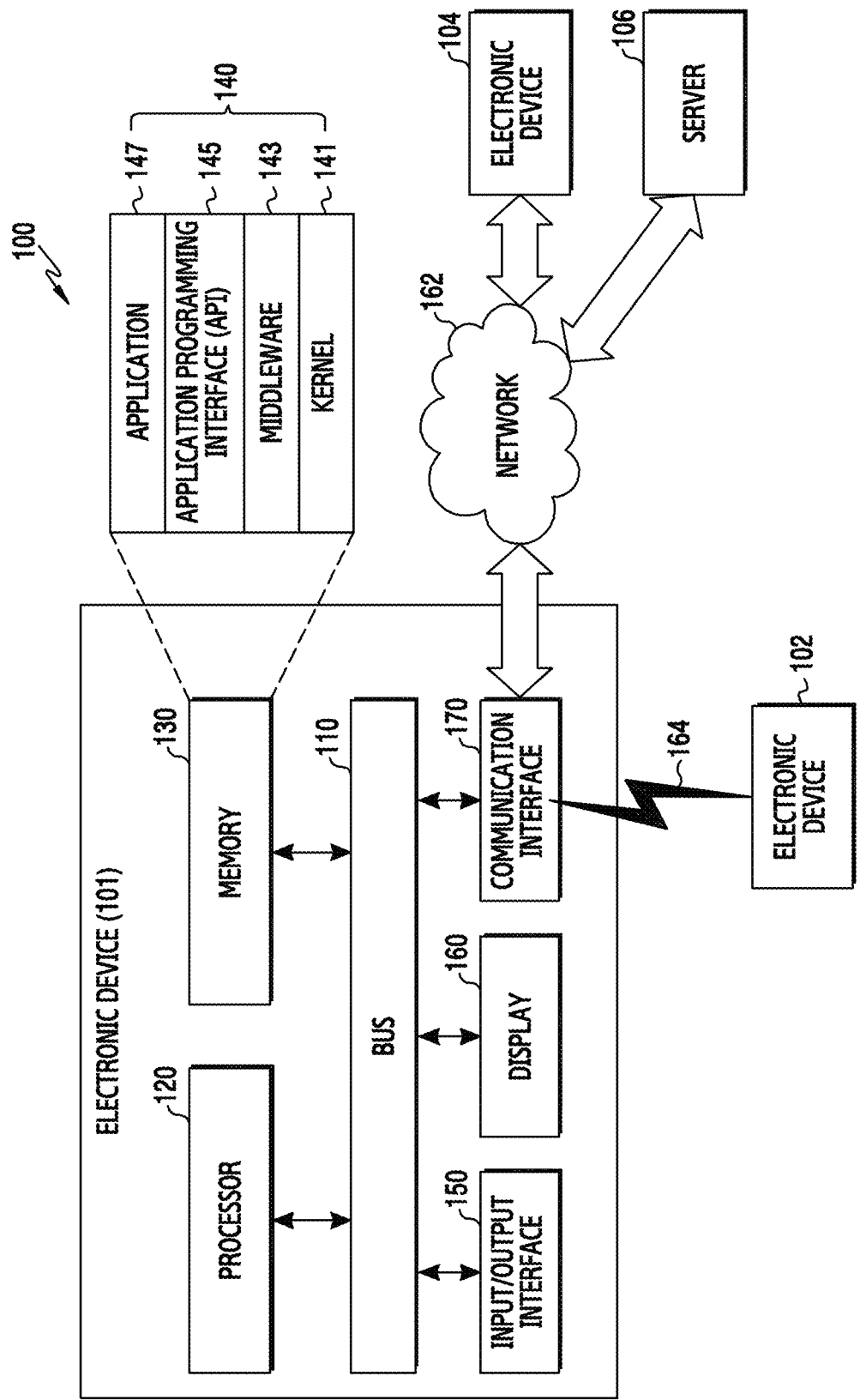
FIG. 1 is a block diagram of a network environment system according to an embodiment of the present disclosure.

Hereinafter, certain embodiments of the present disclosure will be described with reference to the accompanying drawings. However, it should be understood that there is no limiting of the present disclosure to the particular forms disclosed herein; rather, the present disclosure should be understood to cover various modifications, equivalents, and/or alternatives of embodiments of the present disclosure. In describing the drawings, similar reference numerals may be used to designate similar constituent elements.

As used herein, the expressions "have", "may have", "include", or "may include" refer to the existence of a corresponding feature (e.g., numeral, function, operation, or constituent element such as component), and do not exclude one or more additional features.

In the present disclosure, the expressions "A or B", "at least one of A or/and B", or "one or more of A or/and B" may include all possible combinations of the items listed. The expressions "A or B", "at least one of A and B", or "at least one of A or B" refer to all of (1) including at least one A, (2) including at least one B, or (3) including all of at least one A and at least one B.

The expressions "a first", "a second", "the first", or "the second" as used in an embodiment of the present disclosure may modify various components regardless of the order and/or the importance but do not limit the corresponding components. A first user device and a second user device indicate different user devices although both of them are user devices. A first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, when an element (e.g., first element) is referred to as being "directly connected," or "directly coupled" to another element (second element), there are no elements (e.g., third element) interposed between them.

The expression "configured to" as used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may refer to a situation in which the device, together with other devices or components, "is able to". The phrase "processor adapted (or configured) to perform A, B, and C" may refer, for example, to a dedicated processor (e.g. embedded processor) only for performing the corresponding operations or a general-purpose processor (e.g., central processing unit (CPU) or application processor (AP)) that may perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the meanings equal to the contextual meanings in the relevant field of art, and are not to be interpreted to have ideal or excessively formal meanings unless clearly defined in the present disclosure. In some cases, even where a term is defined in the present disclosure, it should not be interpreted to exclude embodiments of the present disclosure.

An electronic device according to an embodiment of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device, and the like, but is not limited thereto. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit), and the like, but is not limited thereto.

According to an embodiment of the present disclosure, the electronic device may be a home appliance. The home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung Home-Sync™, Apple TV™, or Google TV™), a game console (e.g., Xbox™ and PlayStation™), an electronic dictionary, an electronic key, a camcorder, and an electronic photo frame, and the like, but is not limited thereto.

According to an embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic device for a ship (e.g., a navigation device for a ship, and a gyro-compass), avionics, security devices, an automotive head unit, a robot for home or industry, an automatic teller machine (ATM), a point of sales (POS) terminal, or an Internet of things (IoT) device (e.g., a light bulb, various sensors, electric or gas meter, a sprinkler device, a fire alarm, a thermostat, a streetlamp, a toaster, a sporting good, a hot water tank, a heater, a boiler, etc.), and the like, but is not limited thereto.

According to an embodiment of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter), and the like, but is not limited thereto. The electronic device may be a combination of one or more of the aforementioned various devices. The electronic device a may be a flexible device. Further, the electronic device is not limited to the aforementioned devices, and may include a new electronic device according to the development of new technology.

Hereinafter, an electronic device according to an embodiment of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to an embodiment of the present disclosure.

An electronic device 101 within a network environment 100, according to an embodiment of the present disclosure, will be described with reference to FIG. 1. The electronic device 101 includes a bus 110, a processor 120, a memory 130, an input/output interface 150, a display 160, and a communication interface 170. The electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a central processing unit (CPU), an application processor (AP), and a communication processor (CP). The processor 120 may carry out, for example, calculation or data processing relating to control and/or communication of at least one other component of the electronic device 101. An operation of processing (or controlling) the processor 120 will be described below in detail with reference to the accompanying drawings.

The memory 130 may include a volatile memory and/or a non-volatile memory. The memory 130 may store, for example, commands or data relevant to at least one other component of the electronic device 101. According to an embodiment of the present disclosure, the memory 130 stores software and/or a program 140. The program 140 includes, for example, a kernel 141, middleware 143, an application programming interface (API) 145, and/or application programs (or "applications") 147. At least some of the kernel 141, the middleware 143, and the API 145 may be referred to as an operating system (OS). The memory 130 may include a computer readable recording medium having a program recorded thereon to execute the method in the processor 120.

The kernel 141 may control or manage system resources (e.g., the bus 110, the processor 120, or the memory 130) used for performing an operation or function implemented in the other programs (e.g., the middleware 143, the API 145, or the applications 147). Furthermore, the kernel 141 may provide an interface through which the middleware 143, the API 145, or the applications 147 may access the individual components of the electronic device 101 to control or manage the system resources.

The middleware 143, for example, may serve as an intermediary for allowing the API 145 or the applications 147 to communicate with the kernel 141 to exchange data.

The middleware 143 may process one or more task requests received from the applications 147 according to priorities thereof. The middleware 143 may assign priorities for using the system resources (e.g., the bus 110, the processor 120, the memory 130, and the like) of the electronic device 101, to at least one of the applications 147. The middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a light-emitting diode (LED) display, an organic light-emitting diode (OLED) display, a microelectromechanical Systems (MEMS) display, and an electronic paper display, and the like, but is not limited thereto. The display 160 may display, for example, various types of content (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and a first external electronic device 102, a second external electronic device 104, or a server 106. The communication interface 170 may be connected to a network 162 through wireless or wired communication, and may communicate with the second external electronic device 104 or the server 106.

The wireless communication may use at least one of, for example, long term evolution (LTE), LTE-advance (LTE-A), code division multiple access (CDMA), Wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may include at least one of, for example, Wi-Fi, Bluetooth™ (BT), near field communication (NFC), and global navigation satellite system (GNSS). GNSS may include, for example, at least one of global positioning system (GPS), global navigation satellite system (Glonass), Beidou navigation satellite system (Beidou) or Galileo, the European global satellite-based navigation system, based on a location, a bandwidth, and the like. Hereinafter, in the present disclosure, the term "GPS" may be interchangeably used with the term "GNSS". The wired communication may include, for example, at least one of a universal serial bus (USB), a high definition multimedia interface (HDMI), recommended standard 232 (RS-232), and a plain old telephone service (POTS).

The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. All or some of the operations performed in the electronic device 101 may be executed in the electronic devices 102 and 104 or the server 106. When the electronic device 101 has to perform some functions or services automatically or in response to a request, the electronic device 101 may request the electronic device 102 or 104 or the server 106 to execute at least some functions relating thereto instead of or in addition to autonomously performing the functions or services. The electronic device 102 or 104, or the server 106 may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

The server 106 may include at least one of a certification server, an integration server, a provider server (or a mobile network operator server), a content server, an internet server, or a cloud server.

Figure 2:
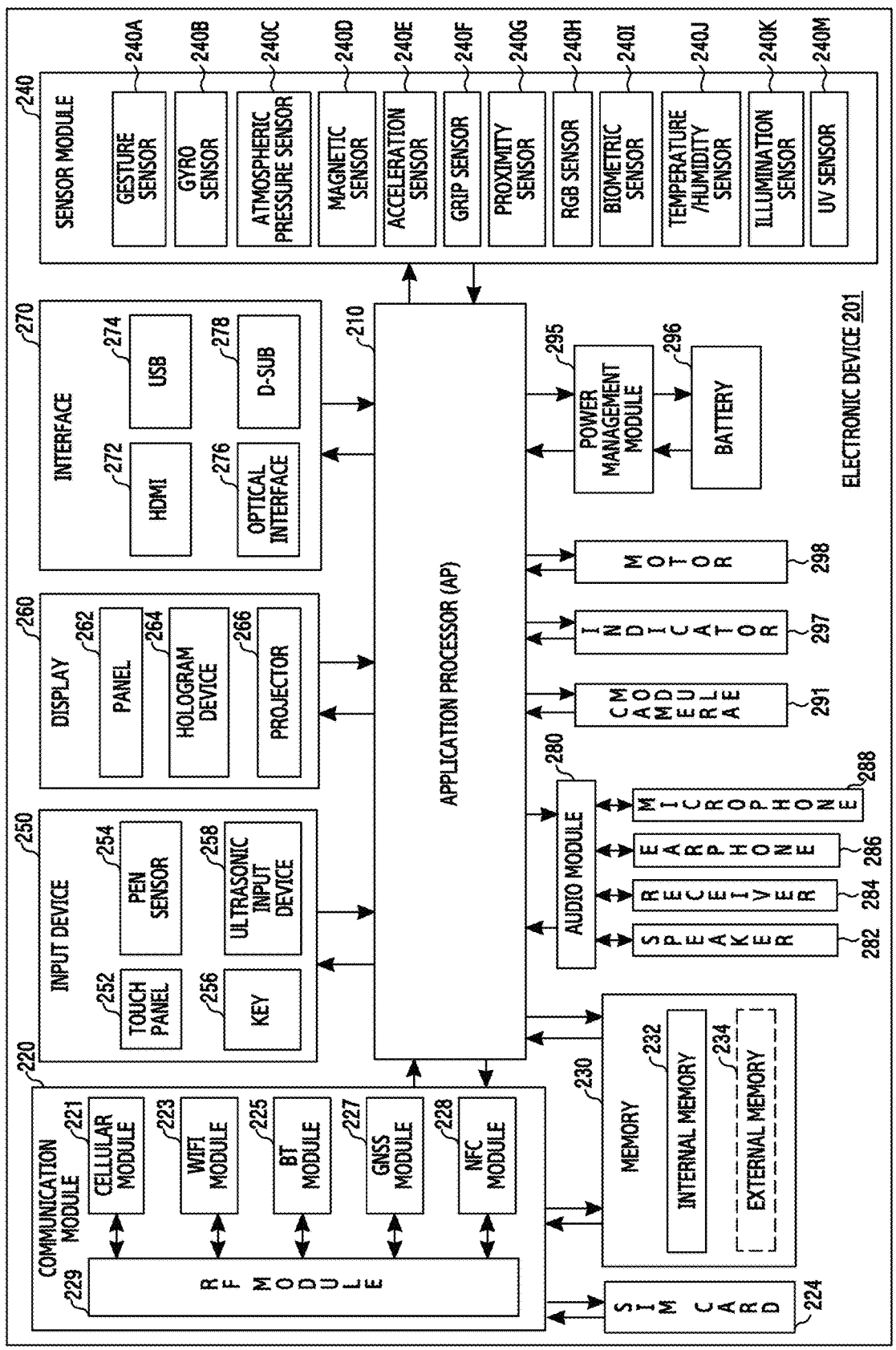
FIG. 2 is a block diagram of an electronic device according to an embodiment of the present disclosure.

FIG. 2 is a block diagram of an electronic device according to an embodiment of the present disclosure.

The electronic device 201 may include, for example, all or a part of the electronic device 101 shown in FIG. 1. The electronic device 201 includes one or more processors 210 (e.g., application processors (AP)), a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a system on chip (SoC). According to an embodiment of the present disclosure, the processor 210 may further include a graphic processing unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 includes, for example, the cellular module 221, a Wi-Fi module 223, a BT module 225, a GNSS module 227 (e.g., a GPS module, a Glonass module, a Beidou module, or a Galileo module), an NFC module 228, and a radio frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using the SIM card 224. The cellular module 221 may perform at least some of the functions that the AP 210 may provide. The cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one integrated chip (IC) or IC package.

The RF module 229, for example, may transmit/receive a communication signal (e.g., an RF signal). The RF module 229 may include, for example, a transceiver, a power amplifier module (PAM), a frequency filter, a low noise amplifier (LNA), and an antenna. According to an embodiment of the present disclosure, at least one of the cellular module 221, the Wi-Fi module 223, the BT module 225, the GNSS module 227, and the NFC module 228 may transmit/receive an RF signal through a separate RF module.

The SIM card 224 may include a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) includes, for example, an internal memory 232 and/or an external memory 234. The internal memory 232 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), and the like).

The external memory 234 may further include a flash drive, for example, a compact flash (CF), a secure digital (SD), a micro secure digital (Micro-SD), a mini secure digital (Mini-SD), an extreme digital (xD), a multimediaCard (MMC), a memory stick, and the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 includes, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 includes, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone 288, ultrasonic waves generated by an input tool, and identify data corresponding to the detected ultrasonic waves.

The display 260 (e.g., the display 160) includes a panel 262, a hologram device 264, or a projector 266.

The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 includes, for example, and without limitation, a high-definition multimedia interface (HDMI) 272, a universal serial bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an image signal processor (ISP) or a flash (e.g., LED or xenon lamp).

The power management module 295 may manage, for example, power of the electronic device 201. According to an embodiment of the present disclosure, the power management module 295 may include a power management integrated circuit (PMIC), a charger integrated circuit (IC), or a battery gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual charge quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, and the like) of the electronic device 201 or a part (e.g., the processor 210) of the electronic device 201. The motor 298 may convert an electrical signal into a mechanical vibration, and may generate a vibration, a haptic effect, and the like. The electronic device 201 may include a processing device (e.g., a GPU) for supporting a mobile TV. The processing device for supporting a mobile TV may process, for example, media data according to a certain standard such as digital multimedia broadcasting (DMB), digital video broadcasting (DVB), or MediaFlo™.

Each of the above-described component elements of hardware according to the present disclosure may be configured with one or more components, and the names of the corresponding component elements may vary based on the type of electronic device. In an embodiment of the present disclosure, the electronic device may include at least one of the above-described elements. Some of the above-described elements may be omitted from the electronic device, or the electronic device may further include additional elements. Also, some of the hardware components may be combined into one entity, which may perform functions identical to those of the relevant components before the combination.

Figure 3:
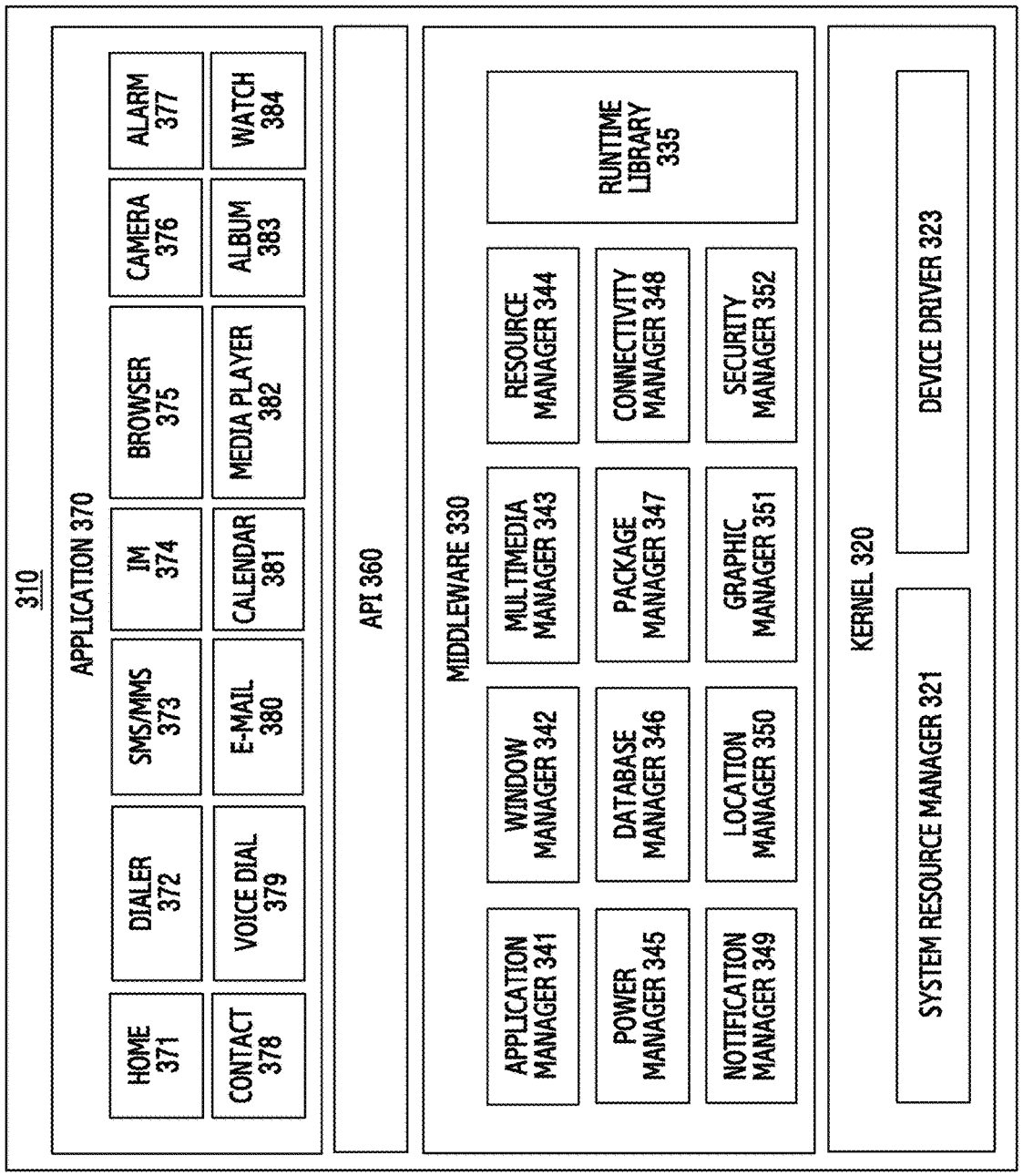
FIG. 3 is a block diagram of a program module according to an embodiment of the present disclosure.

FIG. 3 is a block diagram of a program module according to an embodiment of the present disclosure.

According to an embodiment of the present disclosure, the program module 310 (e.g., the program 140) may include an operating system (OS) for controlling resources related to the electronic device 101 and/or various applications (e.g., the application programs 147) executed in the operating system. The operating system may be, for example, Android™, iOS™, Windows™, Symbian™, Tizen™, Bada™, and the like.

The program module 310 includes a kernel 320, middleware 330, an API 360, and/or applications 370. At least some of the program module 310 may be preloaded on an electronic device, or may be downloaded from the electronic device 102 or 104, or the server 106.

The kernel 320 (e.g., the kernel 141) includes, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth™ driver, a shared memory driver, a USB driver, a keypad driver, a Wi-Fi driver, an audio driver, or an inter-process communication (IPC) driver.

The middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) includes at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, and the like.

The application manager 341 may manage, for example, a life cycle of at least one of the applications 370. The window manager 342 may manage graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a basic input/output system (BIOS) and the like to manage a battery or power source and may provide power information and the like required for the operation of the electronic device. The database manager 346 may generate, search for, and/or change a database to be used by at least one of the applications 370. The package manager 347 may manage installation or an update of an application distributed in a form of a package file.

The connectivity manager 348 may manage wireless connectivity such as Wi-Fi or Bluetooth™. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, and the like. According to an embodiment of the present disclosure, when the electronic device 101 has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. In the case of Android™ or iOS™, one API set may be provided for each platform. In the case of Tizen™, two or more API sets may be provided for each platform.

The applications 370 (e.g., the application programs 147) include, for example, one or more applications which may provide functions such as a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, a watch 384 and the like. According to an embodiment of the present disclosure, the application 370 may include an application for providing health care (e.g., for measuring exercise quantity or blood sugar level, etc.), or environment information (e.g., providing atmospheric pressure, humidity, or temperature information), an authentication application for authenticating an electronic device, and the like.

According to an embodiment of the present disclosure, the applications 370 may include an information exchange application that supports exchanging information between the electronic device 101 and the electronic device 102 or 104. The information exchange application may include, for example, a notification relay application for transferring specific information to an external electronic device or a device management application for managing an external electronic device.

The notification relay application may include a function of transferring, to the electronic device 102 or 104, notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of the electronic device 102 or 104 communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance and the like) designated according to attributes of the electronic device 102 or 104. The applications 370 may include an application received from the server 106, or the electronic device 102 or 104. The applications 370 may include a preloaded application or a third party application that may be downloaded from a server. The names of the components of the program module 310 of the illustrated embodiment of the present disclosure may change according to the type of operating system.

According to an embodiment of the present disclosure, at least a part of the programming module 310 may be implemented in software, firmware, hardware, or a combination of two or more thereof. At least some of the program module 310 may be implemented (e.g., executed) by, for example, the processor 120. At least some of the program module 310 may include, for example, a module, a program, a routine, a set of instructions, and/or a process for performing one or more functions.

The term "module" as used herein may, for example, refer to a unit including one of hardware, software, and firmware or a combination of two or more of them. The term "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. The "module" may include at least one of a dedicated processor, a CPU, an application-specific integrated circuit (ASIC) chip, a field-programmable gate arrays (FPGA), and a programmable-logic device for performing operations which has been known or are to be developed hereinafter.

According to an embodiment of the present disclosure, at least some of the devices (for example, modules or functions thereof) or the method (for example, operations) may be implemented by a command stored in a computer-readable storage medium in a programming module form. The instruction, when executed by a processor 120, may cause the one or more processors to execute the function corresponding to the instruction. The computer-readable storage medium may be, for example, the memory 130.

The computer readable storage medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high level language codes, which may be executed in a computer by using an interpreter, as well as machine codes made by a compiler. The aforementioned hardware device may be configured to operate as one or more software modules in order to perform the operation of the present disclosure, and vice versa.

Any of the modules or programming modules according to an embodiment of the present disclosure may include at least one of the above described elements, exclude some of the elements, or further include other additional elements. The operations performed by the modules, programming module, or other elements may be executed in a sequential, parallel, repetitive, or heuristic manner. Further, some operations may be executed according to another order or may be omitted, or other operations may be added.

In an embodiment of the present disclosure, a hardware approach will be described as an example. However, since embodiments of the present disclosure include a technology using both hardware and software, the present disclosure does not exclude a software-based approach.

According to the present disclosure, an electronic device may generate and send photographing information in association with an application, and an unmanned photographing device may autonomously move to a photographing position based on the received photographing information and capture an image of a subject. The electronic device may extract subject composition information from the image, and generate the photographing information based on the extracted composition information. The unmanned photographing device may analyze the photographing information received from the electronic device, autonomously move to a photographing position of the subject composition information based on subject and composition information of the photographing information, and automatically capture an image of a subject at the photographing position.

In the present disclosure, the term "unmanned photographing device" may indicate an unmanned mobile device including a camera. The unmanned photographing device may include an unmanned aerial vehicle (UAV), an unmanned vehicle, a robot, and the like. The term "auto photographing" may indicate that the unmanned photographing device photographs by automatically moving to a target photographing position based on a subject in a photographing mode.

In the present disclosure, the term "autonomous flying" may mean that the unmanned photographing device flies to a photographing position based on the subject and/or composition information received from the electronic device.

In the present disclosure, the term "first signal" may indicate data about a first image including a first object, and may be transmitted from the electronic device. The first signal may include the photographing information. The term "first image" may indicate a reference image in the electronic device for extracting the subject information and/or the composition information of the image to be automatically taken by the unmanned photographing device. The term "first object" may indicate a subject included in the first image, and may be a reference object for capturing an image in the unmanned photographing device.

In the present disclosure, the term "first three-dimensional (3D) position" may be a position for recognizing the subject for the auto photographing. The term "second 3D position" may be a photographing position where the unmanned photographing device arrives after the autonomous flight based on the first signal. The term "second object" may indicate an object in an image previewed or taken by the unmanned photographing device, and may be the first object taken by the unmanned photographing device. The term "composition" may indicate structure, placement or arrangement of the image, and include information regarding a position, a size, and an orientation of an object in the image.

Figure 4:
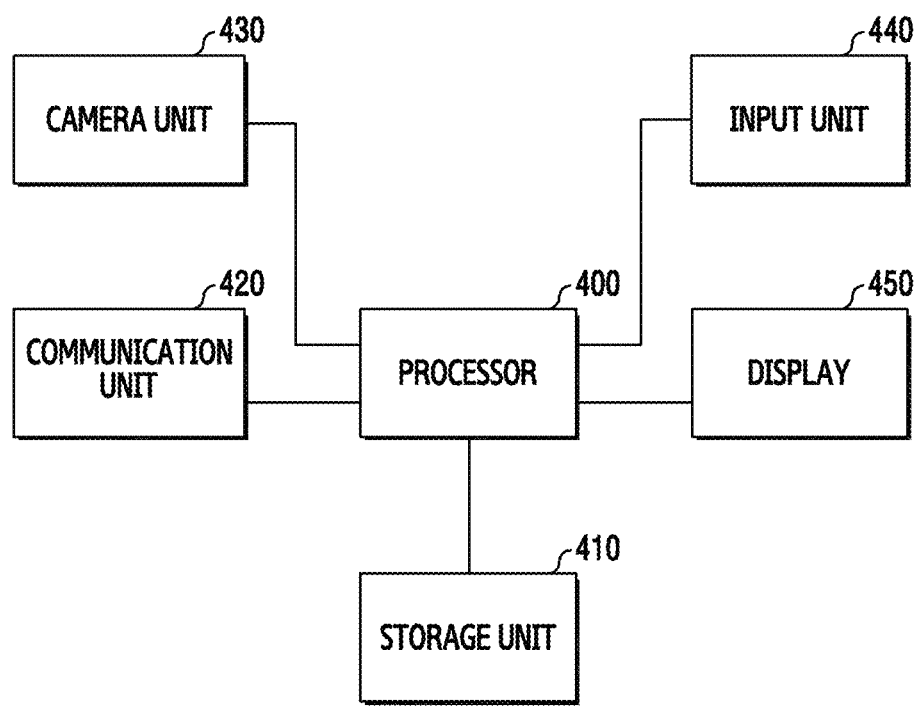
FIG. 4 is a block diagram of an electronic device according to another embodiment of the present disclosure.

FIG. 4 is a block diagram of an electronic device according to another embodiment of the present disclosure.

Referring to FIG. 4, an electronic device according to an embodiment of the present disclosure, includes a processor 400, a storage unit 410, a camera unit 430, a communication unit 420, an input unit 440, and a display 450.

The processor 400 may create photographing information for automatic photography of an unmanned photographing device. The photographing information may be a first signal. The photographing information may include an object (e.g., a first object) information in a selected image (e.g., a first image).

The photographing information may be a movement control command of the unmanned photographing device. The photographing information may include at least one information of a type, a position, a size, and/or composition of a subject. The photographing information may include object position information (e.g., coordinates of the subject, or an object ratio based on an aspect ratio of the image), and object size information in the image.

The position information may be related to a center point and/or edges of the subject. According to an embodiment of the present disclosure, the photographing information may include position information and size information of two or more objects. When the object is a person, the photographing information may include position information (in the image) and size information of a body part. The body part may be a face of the person. The body part may include the face and/or part or the entire of the body including the face of the person.

The storage unit 410 may store image information taken by the unmanned photographing device. The storage unit 410 may store an image received through the network communication. The storage unit 410 may store the photographing information generated by the processor 400. The storage unit 410 may include a composition database. The composition database may store multiple instances of composition information. The composition information may include information about an object type, an image resolution or size (XY ratio), an object position, an object size, an object orientation, and composition area.

The communication unit 420 may establish a wireless connection with the unmanned photographing device. The communication unit 420 may receive path information according to movement of the unmanned photographing device. The communication unit 420 may send the photographing information generated by the electronic device to the unmanned photographing device through the wireless connection. The communication unit 420 may receive the image captured by the unmanned photographing device and its photographing information through the wireless connection.

The camera unit 430 may include a lens, an image sensor, an image signal processor, and a camera controller. The image sensor may include a row driver, a pixel array, and a column driver. The image signal processor may include an image preprocessor, an image postprocessor, a still image codec, and a video codec. The image signal processor may be included in the processor 400. The camera controller may control focusing and tracking.

The input unit 440 may include the entire or part of the input/output interface 150 of FIG. 1 and the input device 250 of FIG. 2. The input unit 440 may receive inputs and data to control operations of the electronic device. The input unit 440 may include a touch panel. The input unit 440 may further include a (digital) pen sensor. The input unit 440 may further include key buttons.

The display 450 may include a liquid crystal display (LCD) or a light emitting diode (LED) display. The LED display may include an organic LED (OLED) and an active matrix OLED (AMOLED).

The input unit 440 and the display 450 may construct an integral touch screen. The touch screen may display a screen under control of the processor 400, and detect touch, gesture, proximity, or hovering input using a digital pen or a user's body part.

Figure 5:
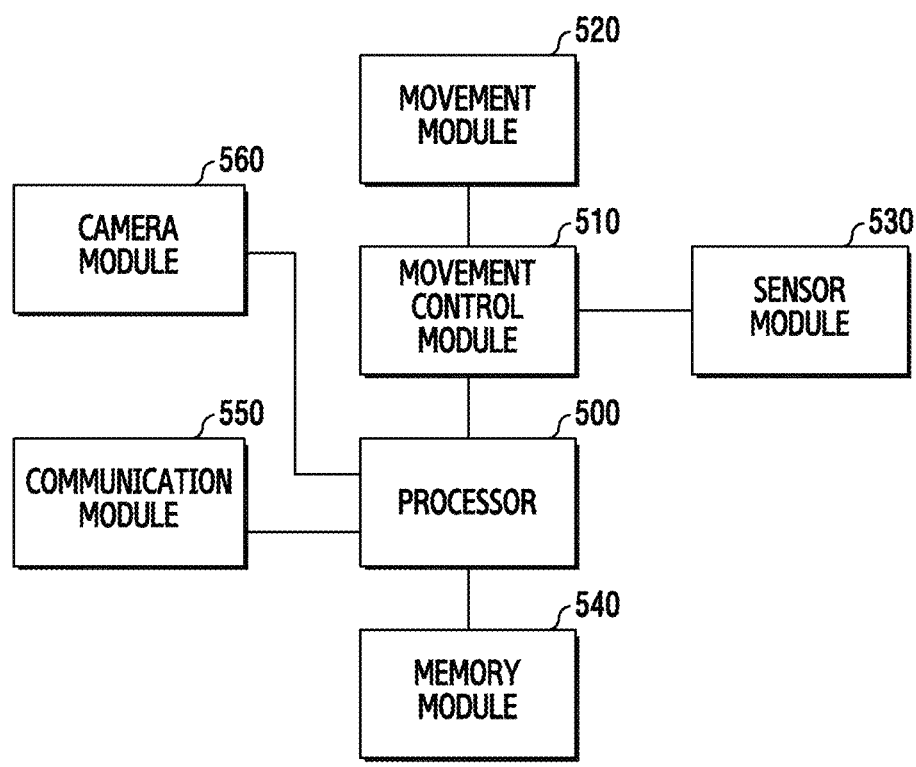
FIG. 5 is a block diagram of an unmanned photographing device according to an embodiment of the present disclosure.

FIG. 5 is a block diagram of an unmanned photographing device according to an embodiment of the present disclosure.

Referring to FIG. 5, the unmanned photographing device includes a processor 500, a movement control module 510, a movement module 520, a sensor module 530, a memory module 540, a communication module 550, and a camera module 560. The unmanned photographing device according to an embodiment of the present disclosure may include a structure corresponding to the input unit 440 and/or the display 450 of the electronic device.

The processor 500 may process operations or data to control one or more other components of the unmanned photographing device and/or application execution. The processor 500 may set image composition information which determines a photographing position by analyzing the photographing information received from the electronic device. Next, the processor 500 may automatically execute a photographing application. The photographing application may control the movement control module 510 to automatically move (e.g., autonomously fly a UAV), automatically capture an image of a subject when moving to a position of the set composition, and control the unmanned photographing device to return to an original position when the photographing is completed. The processor 500 may send the photographing information including the captured image and the image photographing information to the electronic device.

The movement control module 510 may control movement of the unmanned photographing device using position and attitude information of the unmanned photographing device. The movement control module 510 may control the flight and the attitude of the unmanned photographing device. The movement control module 510 may obtain attitude information and/or position information of the unmanned photographing device through a GPS module of the communication module 550 and the sensor module 530.

When the unmanned photographing device is a UAV, the movement control module 510 may control roll, pitch, yaw, and throttle of the UAV according to the position and attitude information. The movement control module 510 may control a hovering operation, and automatically fly the unmanned photographing device to a target point based on the photographing position information provided to the processor 500.

The movement module 520 may move the unmanned photographing device under the control of the movement control module 510. When the unmanned photographing device is a drone, the movement module 520 may include propellers and motors controlling the propellers.

According to an embodiment of the present disclosure, the movement control module 510 and the movement module 520 may be a navigation device.

The sensor module 530 may measure a physical amount or detect an operation state of the unmanned photographing device, and convert the measured or detected information to an electric signal. The sensor module 530 may include all or part of an acceleration sensor, a gyro sensor, a barometer, a terrestrial magnetism sensor (or a compass sensor), an ultrasonic sensor, an optical flow sensor for detecting movement using images, a temperature-humidity sensor, an illuminance sensor, a UV sensor, and a gesture sensor.

The sensor module 530, according to an embodiment of the present disclosure, may include sensors for controlling (or calculating) the attitude of the unmanned photographing device. The sensors for controlling (or calculating) the attitude of the unmanned photographing device may include the gyro sensor and the acceleration sensor. To calculate an azimuth and to prevent drift of the gyro sensor, the sensor module 530 may combine an output of the terrestrial magnetism sensor/compass sensor.

The memory module 540 may include a volatile memory and/or a non-volatile memory. The memory module 540 may store commands or data of at least one other component of the unmanned photographing device. The memory module 540 may store software and/or programs. The programs may include a kernel, a middleware, an API, and/or an application program (or application). At least part of the kernel, the middle, or the API may be referred to as an operating system (OS).

The memory module 540, according to an embodiment of the present disclosure, may include a composition database. The composition database may store multiple instances of composition information. The composition information may include subject type information, image resolution or size (XY ratio) information, composition information about subject position, size, and orientation, and composition region information. The memory module 540 may store the photographing information received from the electronic device. The photographing information may include target composition information and/or camera control information of the automatic photography. The target composition information may include object size and position information in the image.

According to an embodiment of the present disclosure, the memory module 540 may store instructions for executing on the processor 500. The instructions may change the orientation of the camera module 560 based on at least part of data (e.g., the photographing information) of the processor 500.

The communication module 550 may include at least one of a wireless communication module and a wired communication module. The wireless communication module may include a cellular communication module and a short-range communication module. The communication module 550 may include a GPS module.

The cellular communication module may use at least one of LTE, LTE-A, CDMA, WCDMA, UMTS, WiBro, and GSM.

The short-range communication module may include at least one of Wi-Fi, Bluetooth™, NFC, and GNSS or GPS. The GNSS may include, for example, at least one of GPS, global navigation satellite system (GLONASS), Beidou navigation satellite system (Beidou), or Galileo (the European global satellite-based navigation system), according to its use area or bandwidth. Hereafter, the term GNSS of the communication module 550 may be interchangeably used with the term GPS.

The wired communication module may include, for example, at least one of USB, HDMI, and RS-232.

The GPS module, according to an embodiment of the present disclosure, may output position information such as longitude, latitude, altitude, GPS speed, and GPS heading information of the UAV during the movement of the unmanned photographing device. The position information may calculate the position by measuring accurate time and distance using the GPS module. The GPS module may acquire not only the longitude, the latitude, and the altitude, but also the three-dimensional velocity information and the accurate time.

The communication module 550 may transmit information for checking real-time movement of the unmanned photographing device. The communication module 550 may receive photographing information from the electronic device. The communication module 550 may transmit the image taken by the unmanned photographing device and the photographing information, to the electronic device.

The camera module 560 may capture an image of a subject in the photographing mode. The camera module 560 may include a lens, an image sensor, an image signal processor, and a camera controller. The image signal processor may be included in an application processor.

The lens may focus using straightness and refraction of light, and zoom in/out on a subject.

The image sensor may have a structure of a complementary metal oxide semiconductor (CMOS) or a charge coupled device (CCD). The image sensor may include a pixel array and elements for control (e.g., row control) and readout of the pixel array. The pixel array may include a micro lens array, a color filter array, and a light-sensitive element arrays. For example, color filters of the color filter array may be arranged in a Bayer pattern. The image sensor may be controlled using a global shutter or a rolling shutter. Analog pixel signals read out from the pixel array of the image sensor may be converted to digital data through an analog to digital converter (ADC). The converted digital data may be output to outside (e.g., the image signal processor) through an external interface such as mobile industry processor interface (MIPI) via a digital block of the image sensor.

The image signal processor may include the image preprocessor and the image postprocessor. The image preprocessor may conduct auto white balance (AWB), auto exposure (AE), auto focusing (AF) extraction and processing, lens shading correction, dead pixel correction, and knee correction on subframe images. The image postprocessor may include a color interpolator, an image processing chain (IPC), and a color converter. The color interpolator may interpolate color of the image-preprocessed subframe images. The IPC may cancel noise and correct color of the color-interpolated images. The color convertor may convert red, green, blue (RGB) data to luminance (Y), blue-luminance (U), red-luminance (V) (YUV) data.

The image signal processor may include an encoder for encoding the processed images and a decoder for decoding the encoded image. The encoder and the decoder may include a still image codec for encoding and decoding a still image and/or a moving image codec for encoding and decoding a moving (video) image.

The image signal processor may scale (e.g., resize) the processed high-resolution image into an adequate resolution (e.g., a display resolution) and output the image on a display. Using the image processing result, the image signal processor may control (e.g., AF, AE, AWB, IPC, face detection, object tracking, etc.) of the camera module and/or the image signal processor including the image sensor.

The camera controller may include a lens controller for controlling the lens, and a direction controller for controlling a camera direction (up, down, left, and/or right directions). The lens controller may zoom, focus, and control an iris diaphragm by controlling the lens. The direction controller may control an angle for vertical and horizontal directions of the camera so as to face a subject.

The camera module 560 may be a gimbal camera. The gimbal camera may include a gimbal and a camera. The gimbal may stabilize the unmanned photographing device without vibration and shake of the unmanned photographing device. Upon arriving at a target position, the camera may automatically take a picture in the photographing mode under the control of the processor 500. Based on camera control information output from the processor 500 in the photographing mode, the camera may adjust the camera angle such that the camera lens faces a subject.

The processor 500 may establish a wireless connection with an external electronic device including a display using the communication module 550. Through the wireless connection, the processor 550 may receive the first signal (e.g., the photographing information) from the external electronic device at a first 3D position. The first signal may include data about the first image including the first object.

The processor 500 may determine a second 3D position based on at least part of the data of the first signal and the first 3D position, and control the navigation device to fly the unmanned photographing device to or near the second 3D position. The processor 500 during the flight may track the second object corresponding to the first object using the camera module 560, and capture the second image including the second object at or near the second 3D position so that the second image taken by the unmanned photographing device corresponds to the first image. The processor 500 may send the captured second image to the external electronic device through the wireless connection.

Figure 6:
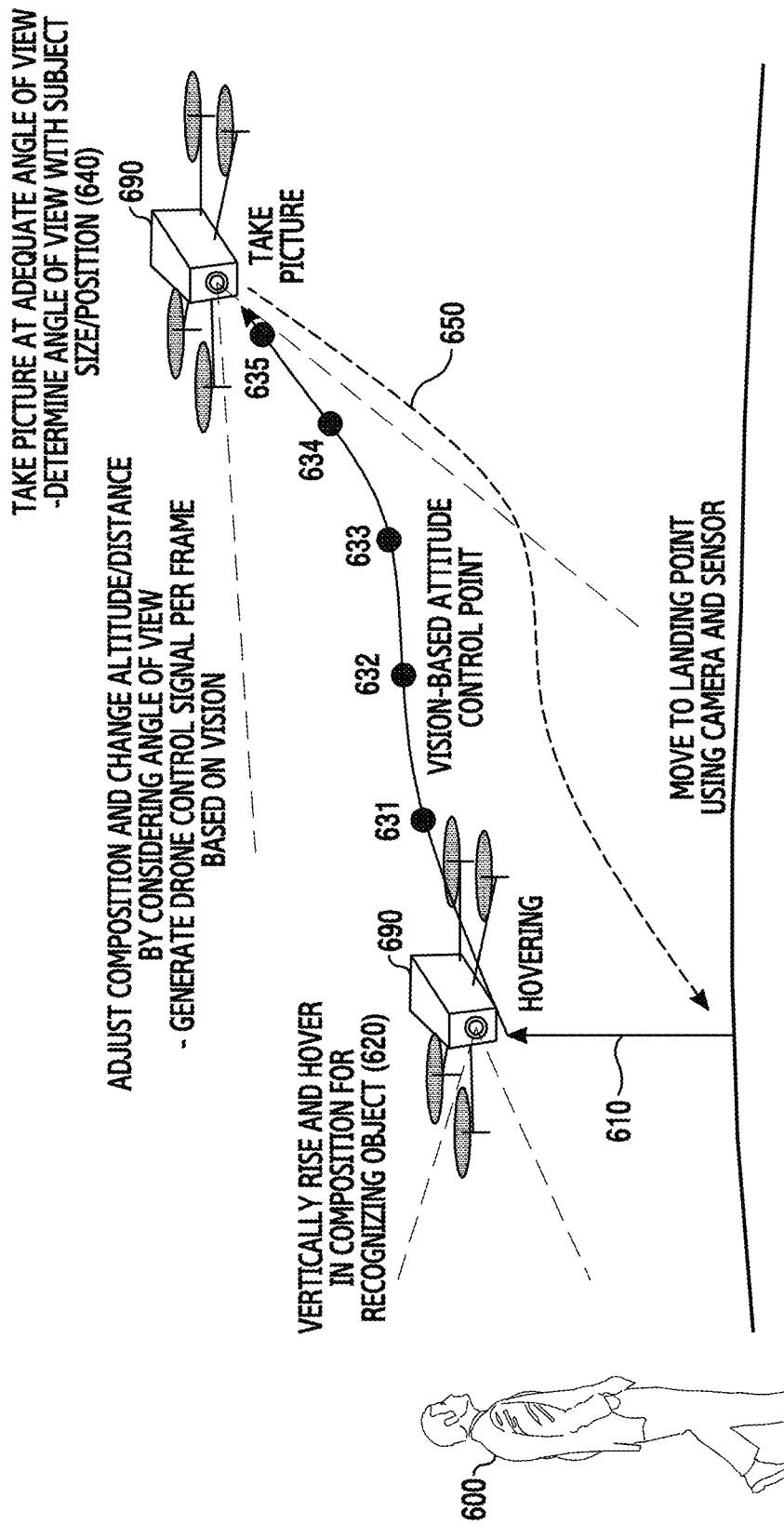
FIG. 6 is a diagram of automatic photographing of an unmanned photographing device according to an embodiment of the present disclosure.

FIG. 6 is a diagram of automatic photographing of an unmanned photographing device according to an embodiment of the present disclosure.

Referring to FIG. 6, the unmanned photographing device 690 may autonomously take a picture without a user's direct control. The unmanned photographing device 690 may be a UAV. When receiving photographing information including target composition from an electronic device, the unmanned photographing device 690 may generate a movement control signal based on the received photographing information and image object information (e.g., preview image) received through the camera module 560, and autonomously fly based on the movement control signal. The unmanned photographing device 690 may move to an adequate composition position for capturing an image of the target composition based on the photographing information, and then automatically take a picture. The photographing information received from the electronic device may include object composition information of the image. In the present disclosure, the subject and the object may be used in the same meaning. The composition information may include position information of a main object and/or at least one background object in the image, relative positions of the objects, and object size information. The main object may be a person and/or a thing. When the main object is a person, the composition information may include information about a body part (e.g., a face) or an index (e.g., position and size of the body part) in the image.

The unmanned photographing device 690 receiving the photographing information from the electronic device may enter a photographing mode. The photographing mode may be set by the electronic device or by the unmanned photographing device 690. For example, upon receiving the photographing information, the unmanned photographing device 690 may enter the photographing mode and take a picture by autonomously flying based on the received photographing information and the image composition information acquired through the camera module.

In the photographing mode, the unmanned photographing device 690 may take off (e.g., rise vertically) to capture an image of a subject 600 in step 610. When arriving at a position for recognizing the subject 600 after the takeoff, the unmanned photographing device 690 may hover and recognize the subject 600 in step 620. The position and size of the subject 600 initially recognized after takeoff may be different from the position information and the size information of the subject in the photographing information. According to an embodiment of the present disclosure, after recognizing the subject 600, the unmanned photographing device 690 may autonomously fly to a position for capturing an image of the target composition based on the photographing information received from the electronic device and the composition information of the image acquired by the camera module.

In steps 631 through 635, the unmanned photographing device 690 may change its altitude and distance by adjusting the photographing composition in consideration of the angle of view, and generate a flight control signal per captured image frame based on vision. Steps 631 through 635 may provide vision-based attitude control points. The unmanned photographing device 690 may calculate subject (e.g., a main subject and/or a background subject) composition information of the image (e.g., a preview image) acquired by the camera module 560. The unmanned photographing device 690 may compare and analyze the calculated composition information and the target composition information received from the electronic device, and autonomously fly to the determined photographing location (a position of the target composition).

When autonomously flying to the position which matches the target composition of the photographing information, the unmanned photographing device 690 may capture the image of the photographing composition including a subject 600 in step 640. When recognizing the same composition (the subject size/position obtained through the camera module 560) as the composition of the subject size and position of the photographing information, the unmanned photographing device 690 may determine the angle of view with the subject size/position and automatically take a picture in step 640. In step 650, the unmanned photographing device 690 may move (autonomously fly) to its original position (e.g., its takeoff point) and land. The unmanned photographing device 690 may send the captured image to the electronic device through the communication module 550.

According to an embodiment of the present disclosure, the electronic device may configure the unmanned photographing device 690 to automatically capture an image of the subject 600, and send the photographing information to the unmanned photographing device 690. The electronic device may send the photographing information, and the unmanned photographing device 690 may enter the photographing mode based on the received photographing information. Upon receiving the photographing information including the target composition information, the unmanned photographing device 690 may hover, identify the subject 600, and autonomously fly to the photographing position of the target composition. When moving to the photographing position of the target composition, the unmanned photographing device 690 may take a picture of the determined composition including the subject. Next, the unmanned photographing device 690 may send the captured image to the electronic device.

The unmanned photographing device 690 may be a UAV, an unmanned vehicle, and/or a robot. Hereafter, the UAV is explained by way of example.

The UAV may be piloted by ground control without a pilot aboard or autonomously fly according to a pre-input program or by recognizing a surrounding environment (e.g., obstacle, path, etc.). The UAV may include a movement control module, and the movement control module may perform autonomous flight control and attitude control of the UAV.

According to an embodiment of the present disclosure, the unmanned photographing device 690 may include a display or a button, and receive the photographing information including the target composition through the display of the unmanned photographing device 690, rather than the electronic device. The unmanned photographing device 690 may obtain and store the photographing information through the display, and capture an image of the subject by autonomously flying to the photographing position based on the stored photographing information.

According to an embodiment of the present disclosure, when obtaining the photographing information from the user, the unmanned photographing device 690 may generate a movement control signal based on the received photographing information and the object information (e.g., preview image) of the image received through the camera module, and autonomously fly according to the movement control signal. The unmanned photographing device 690 may move to an adequate composition position for capturing an image of the target composition based on the photographing information, and then automatically take a picture. The photographing information may include object composition information of the image. The composition information may include position information of a main object and/or at least one background object in the image, relative positions of the objects, and object size information.

The unmanned photographing device 690 receiving the photographing information from the user may enter the photographing mode. The photographing mode may be set by the electronic device or by the unmanned photographing device 690. For example, upon receiving the photographing information, the unmanned photographing device 690 may enter the photographing mode and take a picture by autonomously flying based on the received photographing information and the image composition information acquired through the camera module.

In the photographing mode, the unmanned photographing device 690 may take off (e.g., elevate vertically) to capture an image of the subject 600. When arriving at a position for recognizing the subject 600 after the takeoff, the unmanned photographing device 690 may hover and recognize the subject 600. The position and size of the subject 600 initially recognized after takeoff may be different from the subject position information and size information in the photographing information. According to an embodiment of the present disclosure, after recognizing the subject 600, the unmanned photographing device 690 may autonomously fly to a position for capturing an image of the target composition based on the photographing information and the acquired image composition information.

When autonomously flying to the position which matches the target composition of the photographing information, the unmanned photographing device 690 may capture the image of the photographing composition including the subject 600. When recognizing the same composition (the subject size/position obtained through the camera module 560) as the composition of the subject size and position of the photographing information, the unmanned photographing device 690 may automatically take a picture by determining the angle of view with the subject size/position. Next, the unmanned photographing device 690 may move (autonomously fly) to its original position (e.g., its takeoff point) and land. The unmanned photographing device 690 may send the captured image to the electronic device through the communication module 550.

Figure 7:
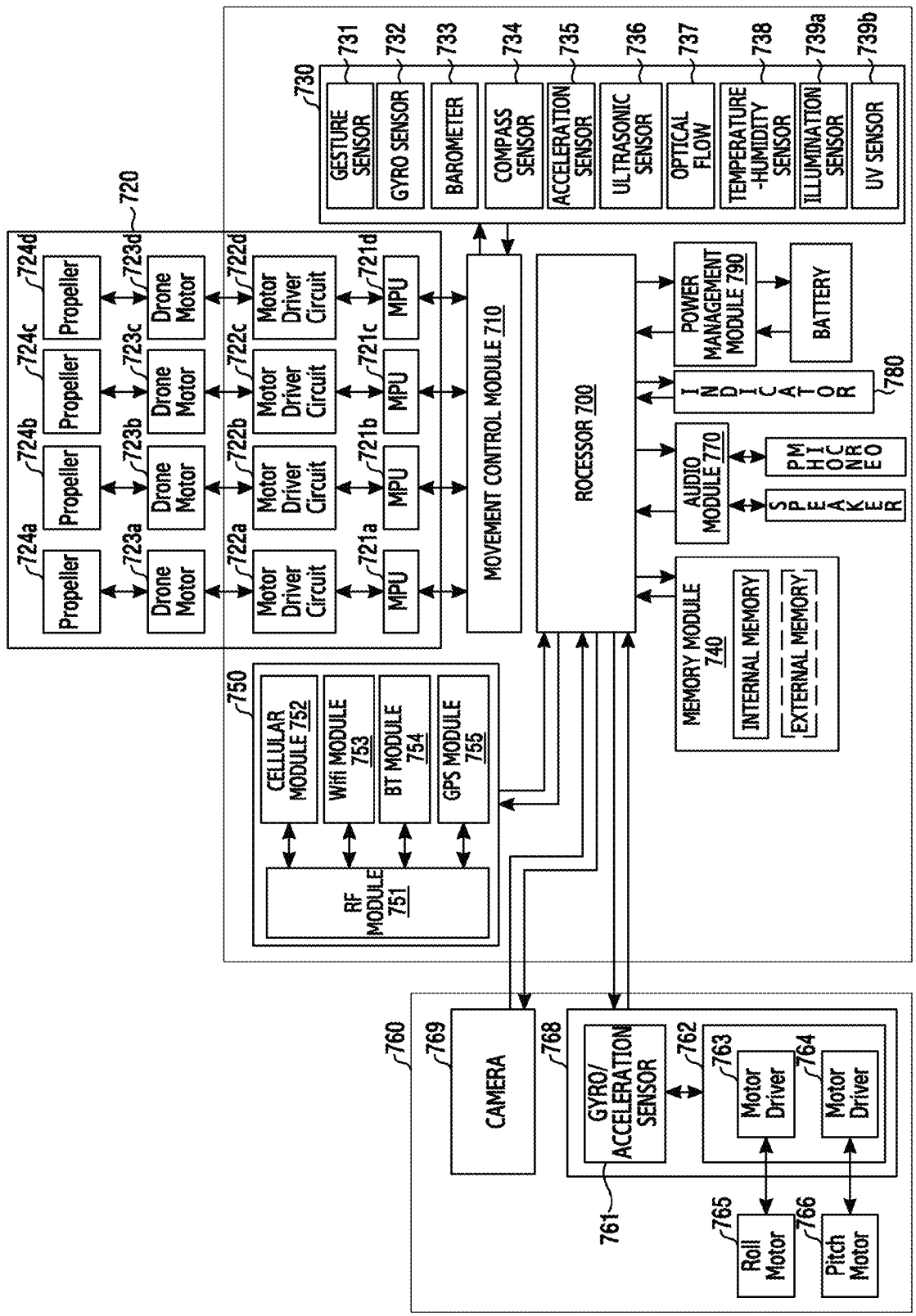
FIG. 7 is a block diagram of an unmanned photographing device according to another embodiment of the present disclosure.

FIG. 7 is a block diagram of an unmanned photographing device according to an embodiment of the present disclosure. In FIG. 7, the unmanned photographing device may be a quadcopter.

The processor 700 may automatically capture an image of a subject based on the received photographing information. The photographing information may include object position and size information. When the object is a person, the photographing information may include body index information (e.g., face size and coordinate information). In a figure shot, the subject of the photographing information (image) and the subject of the photographing target (preview image) may be or may not be the same. Regardless of the same subject figure, the position and size information of the figure may be determined by relative position and size.

The processor 700 may compare and analyze object composition information acquired through a camera and object composition information based on the photographing information. According to the comparison, the processor 700 may generate a distance movement command by calculating a relative distance between the photographing device and the subject, generate an attitude movement command of the unmanned photographing device with a vertical coordinate of the subject, and generate horizon and azimuth commands of the unmanned photographing device with a horizontal command of the subject.

The movement control module 710 may control the movement of the unmanned photographing device using position and attitude information of the unmanned photographing device. When the unmanned photographing device is a UAV, the movement control module 710 may control roll, pitch, yaw, and throttle of the UAV according to position and attitude information acquired. The movement control module 710 may control hovering, and generate a movement control command to automatically fly the unmanned photographing device to a target point based on an autonomous flight command (distance movement, altitude movement and azimuth commands) received from the processor 700.

The movement module 720 may be the movement module 520 of FIG. 5. In the quadcopter, the movement module 720 includes microprocessor units (MPUs) 721*a* through 721*d*, motor drivers 722*a* through 722*d*, motors 723*a* through 723*d*, and propellers 724*a* through 742*d*. The MPUs 721*a* through 721*d* may output control data for rotating the corresponding propellers 724*a* through 742*d* based on the photographing position information output from the movement control module 710. The motor drivers 722*a* through 722*d* may convert the motor control data output from the MPUs 721*a* through 721*d* to motor driving signals. The motors 723*a* through 723*d* may control the corresponding propellers 724*a* through 742*d* to rotate based on the motor driving signals of the motor drivers 722*a* through 722*d*.

According to an embodiment of the present disclosure, the movement module 720 in the photographing mode may autonomously fly the unmanned photographing device to the photographing position based on the control of the movement control module 710.

The sensor module 730 includes all or some of a gesture sensor 731 for detecting a motion and/or a gesture of a subject, a gyro sensor 732 for measuring an angular velocity of the flying unmanned photographing device, a barometer 733 for measuring a pressure change and/or an atmospheric pressure of the air, a terrestrial magnetism sensor (or compass sensor) 734 for measuring terrestrial magnetism, an acceleration sensor 735 for measuring acceleration of the flying unmanned photographing device, an ultrasonic sensor 736 for measuring a distance by outputting ultrasonic waves and detecting a signal reflected by an object, an optical flow sensor 737 for calculating a position by detecting geographical features or patterns on the ground using the camera module 760, a temperature-humidity sensor 738 for measuring temperature and humidity, an illuminance sensor 739*a* for measuring illuminance, and a UV sensor 739*b* for measuring ultra-violet light.

The sensor module 730 may calculate the attitude of the unmanned photographing device. The sensor for calculating the attitude of the unmanned photographing device may be the gyro sensor 732 and the acceleration sensor 735. To calculate an azimuth and to prevent drift of the gyro sensor 732, the output of the terrestrial magnetism sensor/compass sensor 734 may be combined.

A memory module 740 may include an internal memory and an external memory. The memory module 740 may store commands or data of at least one other component of the unmanned photographing device. The memory module 740 may store software and/or program. The program may include a kernel, middleware, an API, and/or application program (or application).

The memory module 740 may store the photographing information including the size and position information of the subject to capture in the photographing mode.

The communication module 750 may include at least one of a wireless communication module and a wired communication module. The communication module 750 includes an RF module 751, a cellular module 752, Wi-Fi module 753, a BT module 754, and a GPS module 755.

The communication module 750 may receive the photographing information from the electronic device. The communication module 750 may send the image captured by the unmanned photographing device and the photographing information, to the electronic device.

The GPS module 755 may output position information such as longitude, latitude, altitude, GPS speed, and GPS heading information of the UAV during the movement of the unmanned photographing device. The position information may calculate the position by measuring accurate time and distance using the GPS module 755. The GPS module 755 may acquire not only the longitude, the latitude, and the altitude, but also the three-dimensional velocity information and the accurate time.

According to an embodiment of the present disclosure, the unmanned photographing device may send information for checking its real-time movement to the electronic device through the communication module 750.

A camera module 760 includes a camera 769 and a gimbal 768. The gimbal 768 may include a gimbal controller 762, a sensor 761, motor drivers 763 and 764, and motors 765 and 766.

The camera 769 may take a picture in the photographing mode. The camera module 760 may include a lens, an image sensor, an image signal processor, and a camera controller. The camera controller may control composition and/or a camera angle (photographing angle) of a subject by adjusting vertical and horizontal angles of the camera lens based on the composition information and/or the camera control information output from the processor 700.

The camera 769 may be affected by the movement of the unmanned photographing device. The gimbal 768 may take a stable image at a fixed angle of the camera 769 regardless of the movement of the unmanned photographing device.

In the operations of the gimbal 768, the sensor 761 may include a gyro sensor and an acceleration sensor. The gimbal controller 762 may recognize the movement of the unmanned photographing device by analyzing a measurement value of the sensor 761 including the gyro sensor and the acceleration sensor. The gimbal controller 762 may generate compensation data according to the movement of the unmanned photographing device. The compensation data may control at least part of the pitch and the roll of the camera module 760. The gimbal 768 may send the roll compensation data to the motor driver 763, and the motor driver 763 may convert the roll compensation data to a motor driving signal and send the motor driving signal to the roll motor 765. The gimbal 768 may send the pitch compensation data to the motor driver 764, and the motor driver 764 may convert the pitch compensation data to a motor driving signal and send the motor driving signal to the pitch motor 766. The roll motor 765 and the pitch motor 766 may correct the roll and the pitch of the camera module 760 according to the movement of the unmanned photographing device. The camera 769 may balance the rotation (e.g., the pitch and the roll) of the unmanned photographing device (e.g., a multicopter) by means of the gimbal 768 and stabilize the camera 769.

Figure 8A:
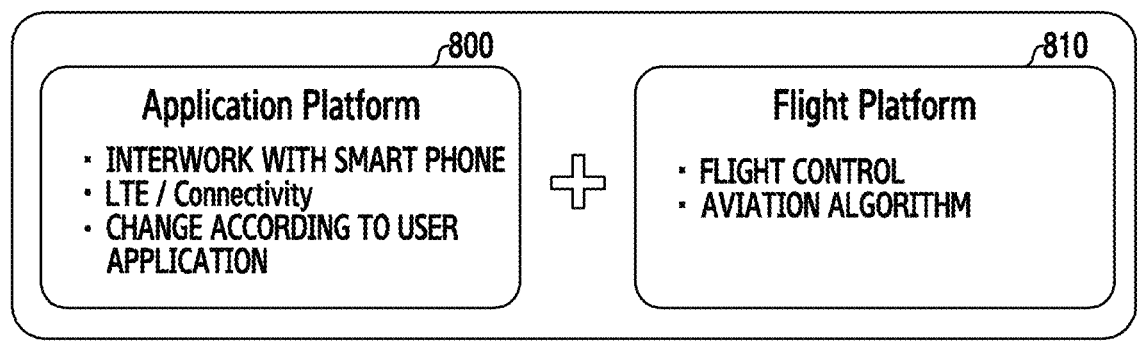
FIGS. 8A and 8B are diagrams of a platform structure of an unmanned photographing device according to an embodiment of the present disclosure.
Figure 8B:
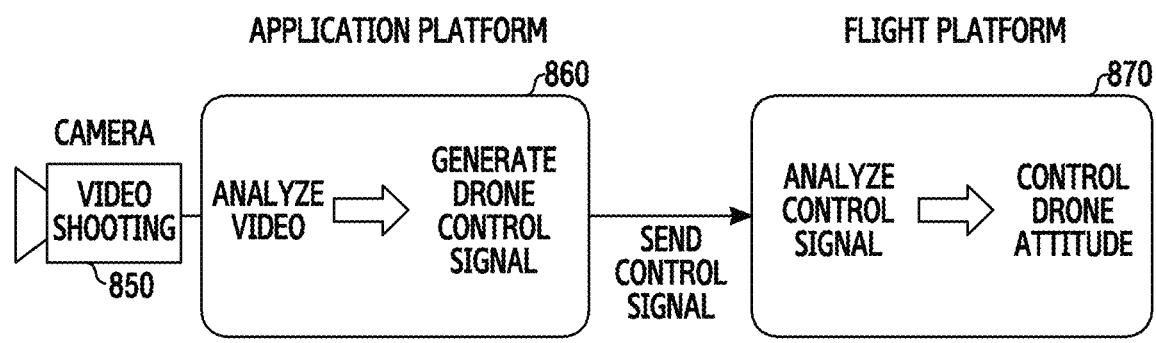

FIGS. 8A and 8B are diagrams of a platform structure of an unmanned photographing device according to an embodiment of the present disclosure. The unmanned photographing device may be a drone.

The unmanned photographing device may fly using a plurality of propellers. The propeller may turn by a force of a motor to create thrust. Depending on the number of rotors (the number of propellers), a drone with four rotors may be referred to as a quadcopter, a drone with six rotors may be referred to as a hexacopter, and a drone with eight rotors may be referred to as an octocopter.

Referring to FIG. 8A, the drone may include an application platform 800 and a flight platform 810. The application platform 800 may interwork with the electronic device, connect communication with the electronic device, and change an operation according to a user application. The application platform 800 may be executed by the processors 500 and 700. The flight platform 810 may execute flight control and aviation algorithms. The flight platform 810 may be executed by the movement control modules 510 and 710. The unmanned photographing device may include at least one of the application platform for driving the UAV and providing a service by receiving a control signal using the wireless link with the electronic device, and the flight platform for controlling the flight according to the aviation algorithm.

Referring to FIG. 8B, the unmanned photographing device in the photographing mode may analyze an image (e.g., a preview image) taken by a camera module 850 and autonomously fly to a target photographing position. When the camera module 850 takes an image including a subject, a processor 860 may analyze the acquired image and generate a command for controlling the unmanned photographing device. By analyzing object size information, the processor 860 may generate a distance movement command by calculating a relative distance between the unmanned photographing device and the subject, generate an altitude movement command of the unmanned photographing device with a vertical coordinate of the subject, and generate horizon and azimuth command of the unmanned photographing device with a horizontal coordinate of the subject. Such commands may be the control signals for controlling the unmanned photographing device.

A movement control module 870 may analyze the control signal fed from the processor 860 and autonomously fly the unmanned photographing device (control the attitude of the unmanned photographing device) by controlling the movement module 720 based on the analyzed control signal.

The unmanned photographing device may be a UAV, and the UAV may include the movement control module 870 and a GPS module 755. The movement control module 870 may measure the flight attitude, the angular velocity, and the acceleration of the unmanned photographing device through a sensor module 730. The GPS module may measure the position of the unmanned photographing device. Such output information of the sensor module and the GPS module may be used as basic information for the aviation/automatic control of the unmanned photographing device.

The movement control module 870 may be the sensor for calculating the attitude, such as roll and pitch, of the unmanned photographing device, and may use a gyro sensor 732 and an acceleration sensor 735 of the sensor module. The attitude of the unmanned photographing device may be calculated by measuring the angular velocity of the unmanned photographing device using the gyro sensor and integrating the measured angular velocity. In so doing, a small error component in the output of the gyro sensor may increase an attitude error in the integration. The movement control module 870 may correct the attitude calculation of the unmanned photographing device using the acceleration sensor. In addition, a yaw angle of the unmanned photographing device may be corrected using the output of the terrestrial magnetism sensor/compass sensor. In a stationary state, the movement control module 870 may calculate roll and pitch angles using the output of the acceleration sensor. To calculate the azimuth and to prevent drift of the gyro sensor, the output of the terrestrial magnetism sensor/compass sensor 734 may be combined.

The sensor module may include a barometer 733 for measuring the altitude using pressure difference based on the flight of the unmanned photographing device, and an ultrasonic sensor 736 for finely measuring the altitude at a low altitude.

The drone (multicopter) may take a picture/video of a subject. The drone may fly using the principles of lift and torque. A helicopter uses a tail propeller to counteract rotation of a main wing, whereas the drone may rotate half of the multi-propellers clockwise (CW) and the other half counterclockwise (CCW). 3D coordinates of the drone flight may be defined using pitch (Y), roll (X) and yaw (Z).

The drone may fly by tilting back, forth and horizontally. When the drone is tilted, an air flow direction into the rotor may change. When the drone is leaned forward, the air may flow over and under the drone and out in a backward direction. Thus, as the air is pushed backward, the drone may fly forward according to the principle of action/reaction. The drone may be tilted by decreasing the speed of the front of the corresponding direction and increasing the speed of the back. Since this method is applied to any direction, the drone may be tilted and moved merely by controlling the rotor speed.

In the photographing mode, the camera angle may be adjusted according to the position (height, altitude) of the unmanned photographing device. An eye level may be an angle at which a subject is captured at a user's eye level in a horizontal direction. Since the eye level is similar to a vision of daily life, it may be recognized naturally and no particular distortion or manipulation may be exhibited. A high angle may be used to show the entire environment. The high angle may be a camera angle which looks on a subject down from above. Contrary to the high angle, a low angle may be taken from below a subject (elevation shot).

In an embodiment of the present disclosure, the unmanned photographing device may control the camera to face the subject according to the position or the composition of the subject.

FIGS. 9A, 9B, 9C and 9D are diagrams of a structure and driving operations of a drone according to an embodiment of the present disclosure.

Figure 9A:
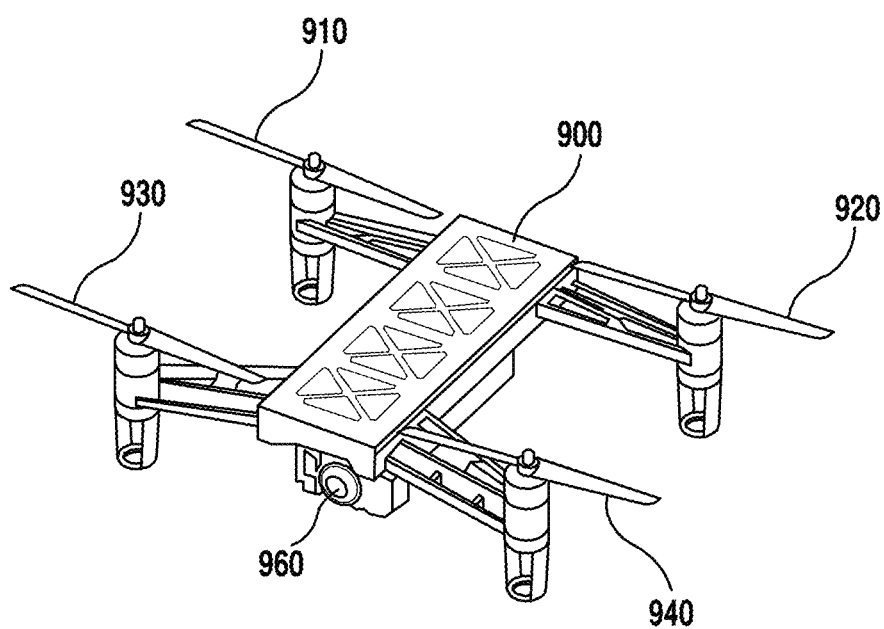
FIGS. 9A, 9B, 9C and 9D are diagrams of a structure and driving operations of an unmanned photographing device according to an embodiment of the present disclosure.

In FIG. 9A, the drone is a quadcopter. The drone of FIG. 9A includes a main board 900, a gimbal camera 960, and propellers 910 through 940 constructed as shown in FIG. 7. As shown in FIG. 9A, the drone may mount the camera 960 below it and take a picture using the camera during flight.

Figure 9B:
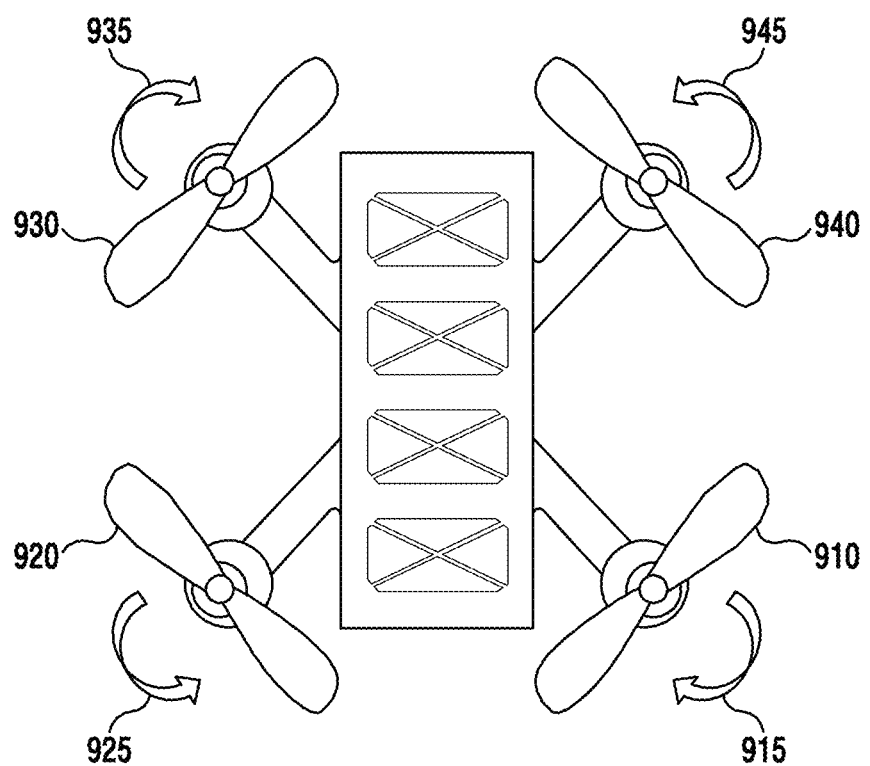

FIG. 9B depicts operations of the drone. In the drone, opposite propellers may spin in the same direction, and neighboring propellers may spin in opposite directions. In the quadcopter, two propellers 910 and 930 of the four propellers 910 through 940 may spin clockwise 915 and 935, and the two propellers 920 and 940 may spin counterclockwise 925 and 945. The propellers may spin in the different directions for momentum conservation. When the four propellers spin in the same direction, the unmanned photographing device may keep turning in one direction according to the principle of conservation of momentum. The direction change by controlling the rotation speed of the propellers of the drone may also utilize the principle of conservation of momentum.

According to an embodiment of the present disclosure, a movement control module 710 may control the attitude and the flight of the drone. The movement control module may analyze information collected by a sensor module 730 and recognize a current state of the drone. The movement control module may utilize the entire or some of a gyro sensor for measuring angular momentum of the drone, an acceleration sensor for measuring angular velocity momentum of the drone, a terrestrial magnetism sensor (or a compass sensori for measuring terrestrial magnetism of the earth, a barometer for measuring the altitude, and a GPS module 755 for outputting 3D position information of the drone. Based on the measurement information output from the sensor module and the GPS module, the movement control module may control the rotation of the propellers 910 through 940 so that the drone may fly in balance.

The movement control module may analyze the measurement results of the sensor module and the GPS module and stably control the flight of the drone. The drone may move in any direction by increasing the rotational speed of the propeller on the opposite side of the intended direction, which achieves the same effect by lowering the propeller rotational speed of the intended direction. To turn the drone, the movement control module may adjust the rotational speed of two facing propellers, that is, two propellers spinning in the same direction. When the momentum of the propeller spinning in any one direction is predominant, the balance is disrupted and the drone may turn in the opposite direction. When the movement control module increases the rotational speed of the propellers 910 and 930 spinning clockwise, the drone may turn counterclockwise. Also, when the movement control module lowers the rotational speed of all of the propellers, the drone may descend. By increasing the rotational speed, the drone may ascend.

The drone may change the direction and move vertically and horizontally in a multidimensional (e.g., 3D) space. A quadcopter drone may control operation of ascend, descend, left direction change, right direction change, forward movement, backward movement left movement and right movement by controlling the rotation of the propellers 910 through 940. That is, the drone may control throttle, yaw, pitch, and roll by controlling the rotation of the propellers 910 through 940. The drone may control its movement using four commands as shown in Table 1.

TABLE 1

| Ascend, Descend | Throttle |
|---|---|
| Left direction change, right direction change | Yaw |
| Forward movement, backward movement | Pitch |
| Left movement, right movement | Roll |

Figure 9C:
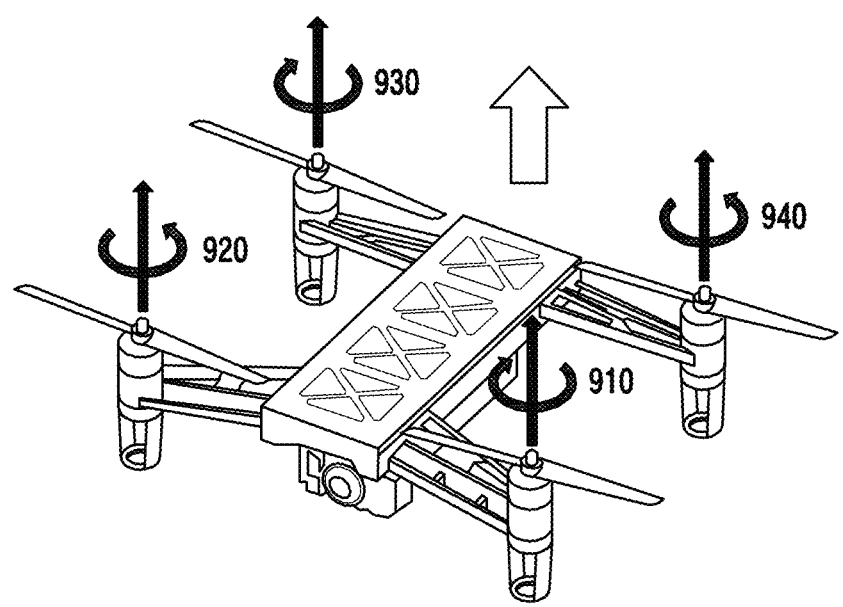
Figure 9D:
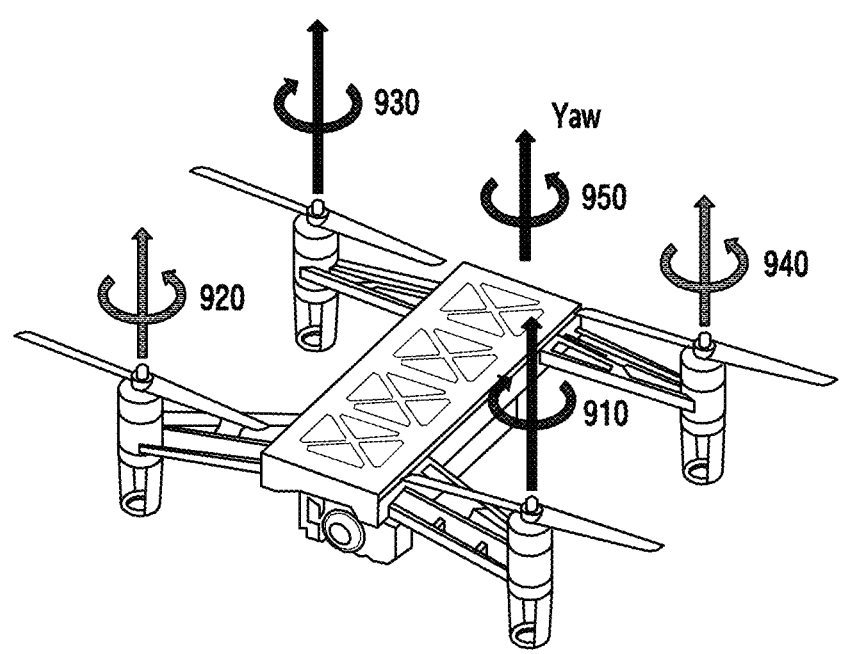

FIGS. 9C and 9D depict examples of movement control of a drone. The drone may be a quadcopter. The quadcopter may control its flight direction and movement by combining the rotation intensity of the four propellers 910 through 940. When a revolution per minute (RPM) of the four propellers 910 through 940 is increased simultaneously as shown in FIG. 9C, the drone may ascend. When the RPM is decreased at the same time, the drone may descend. Likewise, the drone may move forward by increasing the RPM of the propellers 910 and 920, move backward by increasing the RPM of the propellers 930 and 940, move to the left by increasing the RPM of the propellers 910 and 940, and move to the right by increasing the RPM of the propellers 920 and 930. When the opposite propellers 910 and 930 or 920 and 940 are rotated faster than the other two propellers as shown in FIG. 9D, the drone may change direction to the left or the right.

Figure 10A:
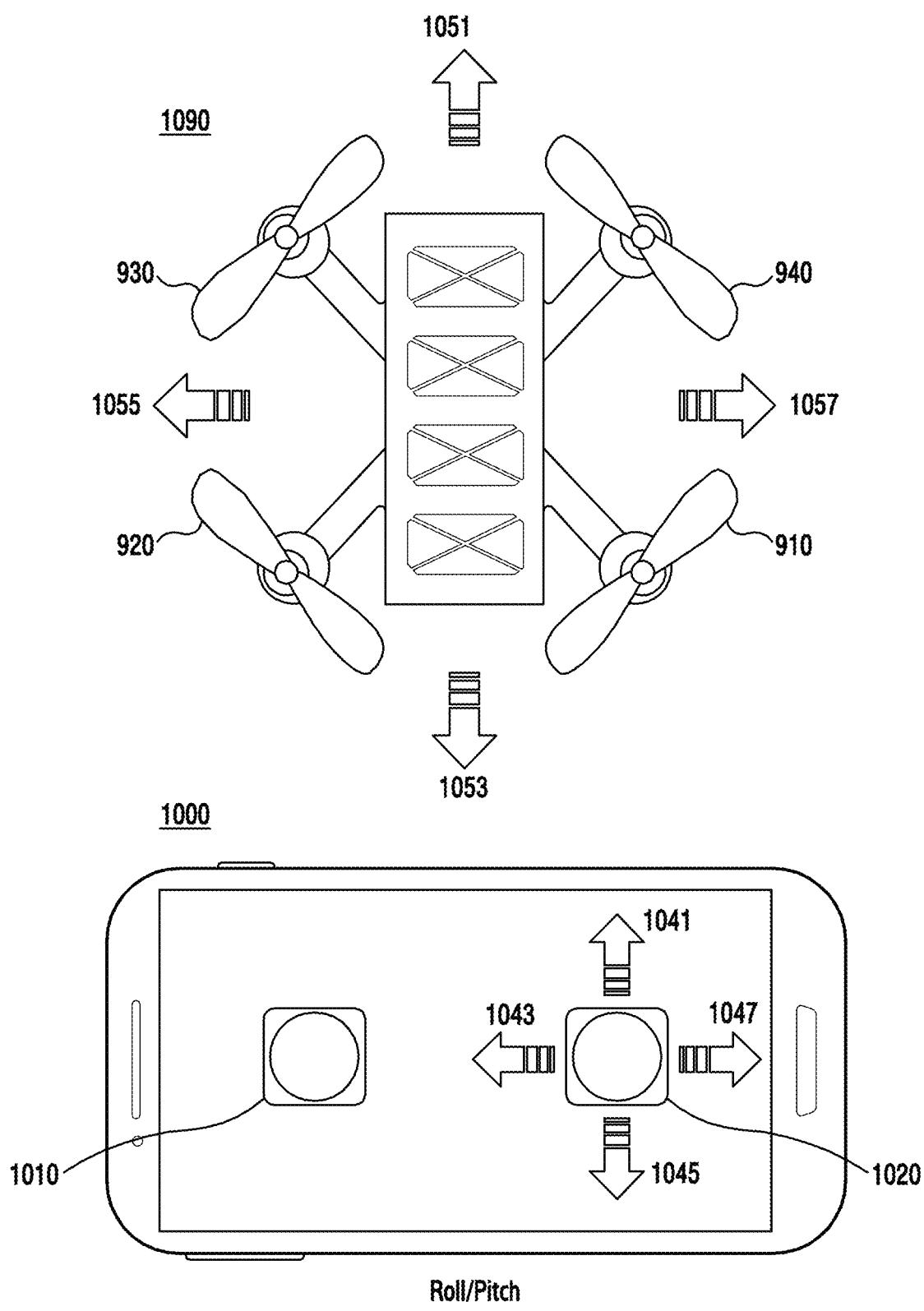
FIGS. 10A, 10B, and 10C are diagrams of movement control of an unmanned photographing device using an electronic device according to an embodiment of the present disclosure.
Figure 10B:
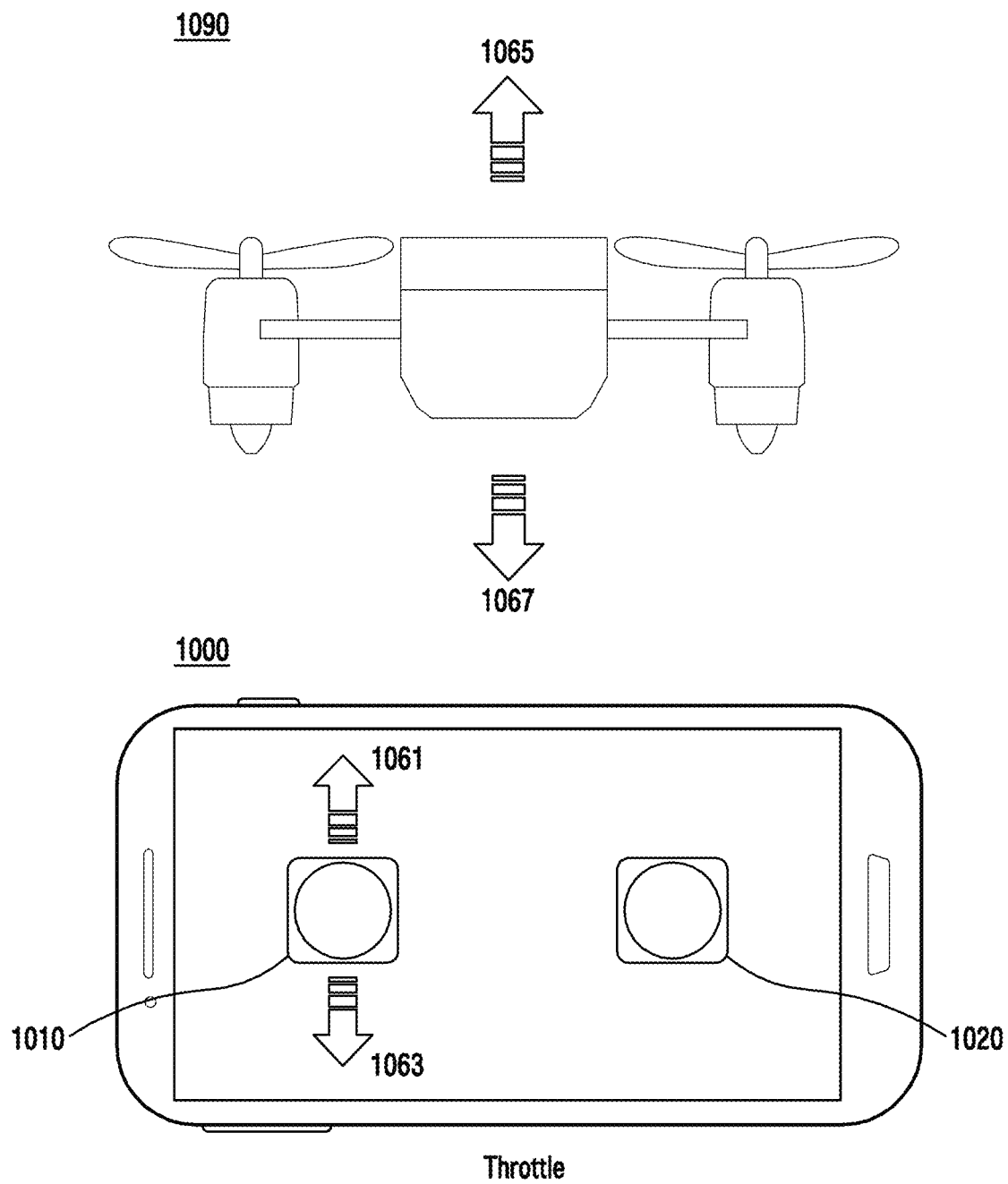
Figure 10C:
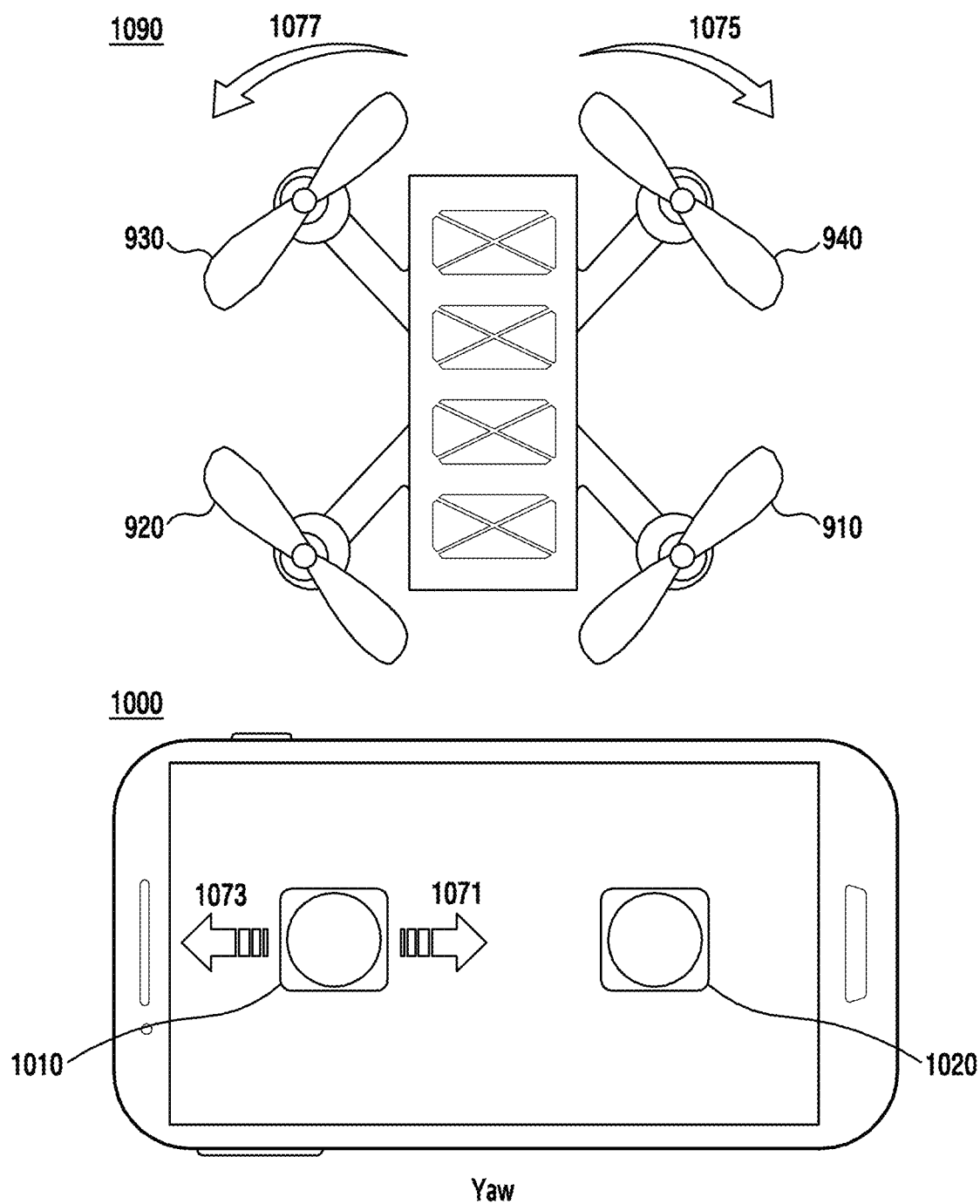

FIGS. 10A, 10B, and 10C illustrate movement control of an unmanned photographing device using an electronic device according to an embodiment of the present disclosure. The unmanned photographing device may be a drone.

Referring to FIG. 10A, the unmanned photographing device 1090 may include a movement control module 710 and a movement module 720 for controlling attitude and flight, and an application processing module for controlling an application of the unmanned photographing device 1090. The movement control module, which is a platform hub of the unmanned photographing device 1090, may be connected to various hardware and sensors of the unmanned photographing device 1090 to achieve autonomous flight. The application processing module, which is an application core, may include an OS and provide an application for driving hardware and software by providing an API. The application processing module and the movement control module may include the platform of FIG. 8A, and control the flight in the photographing mode as shown in FIG. 8B.

To move the unmanned photographing device 1090 to a particular position (e.g., a position with composition of an image taken by a camera module 760, a photographing position), the movement control module may obtain information through the application processing module and control the unmanned photographing device 1090 to move to a corresponding destination based on the obtained information.

The unmanned photographing device 1090 may be remotely controlled by an electronic device 1000 (e.g., a smart phone).

As shown in FIGS. 10A, 10B, and 10C, the electronic device 1000 may display on the screen a first jog button 1010 and a second jog button 1020 for controlling the movement of the unmanned photographing device 1090. The first jog button 1010 and the second jog button 1020 may be activated by a user touch, and the electronic device 1000 may send a command for controlling the movement of the unmanned photographing device 1090 to the unmanned photographing device 1090 according to a touch-and-drag direction. The application processing module of the unmanned photographing device 1090 may forward the command from the electronic device 1000 to the movement control module, and the movement control module may control the movement of the unmanned photographing device 1090 by controlling the movement module. The first jog button 1010 of the electronic device 1000 may issue throttle and yaw commands, and the second jog button 1020 may issue pitch and roll commands.

FIG. 10A depicts pitch and roll control of the unmanned photographing device 1090. The pitch may indicate the forward and backward movement of the unmanned photographing device 1090, and the roll may indicate the left and right movement of the unmanned photographing device 1090. When the user drags the second jog button 1020 in a direction 1041, the electronic device 1000 may analyze a drag direction and a drag distance and send information about forward movement and movement velocity to the unmanned photographing device 1090. Next, the movement control module of the unmanned photographing device 1090 may control the propellers 910 and 920 to rotate at a greater RPM than the propellers 930 and 940 according to the velocity information. The unmanned photographing device 1090 may move forward in a direction 1051. When the user touches and drags the second jog button 1020 in a direction 1045, the unmanned photographing device 1090 may rotate the propellers 930 and 940 faster than the propellers 910 and 920 and move backward in a direction 1053.

When the user touches and drags the second jog button 1020 in a direction 1043, the unmanned photographing device 1090 may rotate the propellers 910 and 940 faster than the propellers 920 and 930 and roll to the left in a direction 1055. When the user touches and drags the second jog button 1020 in a direction 1047, the unmanned photographing device 1090 may roll to the right in a direction 1057 by rotating the propellers 920 and 930 faster than the propellers 910 and 940.

FIG. 10B depicts vertical movement (throttle) control of the unmanned photographing device 1090. When the user drags the first jog button 1010 in a direction 1061, the electronic device 1000 may analyze a drag direction and a drag distance and send information about upward movement and movement velocity to the unmanned photographing device 1090. Next, the unmanned photographing device 1090 may elevate by increasing the RPM of the propellers 910 through 940 at the same time according to the velocity information of the unmanned photographing device 1090. When the user touches and drags the first jog button 1010 in a direction 1063, the unmanned photographing device 1090 may drop by reducing the RPM of the propellers 910 through 940.

FIG. 10C depicts yaw control. The yaw may indicate the direction change of the unmanned photographing device 1090. The unmanned photographing device 1090 may differently control the rotation direction of the propellers 910 and 930 and the propellers 920 and 940 as shown in FIG. 9B. When the user drags the first jog button 1010 in a direction 1071, the unmanned photographing device 1090 may turn to the right by controlling to spin the propellers 910 and 930 clockwise faster in RPM than the propellers 920 and 940 which are spinning counterclockwise. When the user drags the first jog button 1010 in a direction 1073, the unmanned photographing device 1090 may turn to the left by controlling to spin the propellers 920 and 940 counterclockwise faster in RPM than the propellers 910 and 930 which are spinning clockwise.

Flight of the unmanned photographing device 1090 may be controlled by the user using the first jog button 1010 or the second jog button 1020 of the electronic device 1000.

According to an embodiment of the present disclosure, the unmanned photographing device 1090 may autonomously fly. The unmanned photographing device 1090 may enter the auto photographing mode. In the auto photographing mode, the unmanned photographing device 1090 may autonomously fly based on photographing information received from the electronic device 1000 as shown in FIG. 6. The unmanned photographing device 1090 may autonomously fly to a target photographing position by controlling the throttle, the pitch, the roll, and/or the yaw as shown in FIGS. 10A, 10B, and 10C.

The electronic device 1000, according to an embodiment of the present disclosure, may generate the photographing information using the image including at least part of the photographing information (e.g., composition, position, height, distance, etc.) of the unmanned photographing device 1090, and then send the generated information to the unmanned photographing device 1090. The unmanned photographing device 1090 may obtain the composition of the preview image by autonomously flying based on the photographing information received from the electronic device 1000, and automatically take a picture at a position substantially matching the received photographing information of the preview image.

The electronic device 1000, according to an embodiment of the present disclosure, may send an image stored therein or received from another device, to the unmanned photographing device 1090. The unmanned photographing device 1090 may recognize a subject in the received image, and automatically take a picture at a position where the image of the set composition is recognized during the autonomous flight. When the electronic device 1000 sends an image, the transmitted information may increase according to image resolution and accordingly the electronic device 1000 may send at least partially processed image (e.g., resolution, size, etc.) to the unmanned photographing device 1090. The unmanned photographing device 1090 may determine the position and the size of the subject by analyzing the received image, and determine composition for capturing an image which substantially matches the received image.

According to an embodiment of the present disclosure, the electronic device 1000 may recognize an object by analyzing an image selected by the user, generate image composition information by extracting information of the recognized object, generate photographing information including composition information, and send the photographing information to the unmanned photographing device 1090. The object information may include object size and position information in the image. The image composition information may include object information and aspect ratio information of the image. The unmanned photographing device 1090 receiving the photographing information may recognize the object, autonomously fly to a position where the recognized object matches the image composition information, and automatically take a picture at the recognized position. The electronic device 1000 may generate and send photographing information of small amount to the unmanned photographing device 1090, and the unmanned photographing device 1090 may autonomously fly to the position corresponding to the set image composition based on the photographing information and automatically take a picture.

An unmanned photographing device, according to an embodiment of the present disclosure, may include a housing, a navigation device attached to or integrated with the housing and flying an electronic device to a 3D position, at least one wireless communication device, a camera attached to or integrated with the housing, a processor electrically connected to the navigation device, the communication device, and a memory electrically connected to the processor and storing instructions which cause the processor to execute. The processor may establish a wireless connection with an external electronic device comprising a display using the communication device, receive a first signal at a first 3D position from the external electronic device through the wireless connection, the first signal comprising data associated with a first image comprising a first object, determine a second 3D position based on at least part of the data and the first 3D position, control the navigation device to fly the unmanned photographing device to or near the second 3D position, track a second object corresponding to the first object using the camera, capture a second image comprising the second object at or near the second 3D position such that the second image corresponds to the first image, and send the second image to the external electronic device through the wireless connection.

The navigation device of the unmanned photographing device may include at least one propeller and a controller for controlling the propeller. The data may include composition of the first image. The data may include a relative position of the first object in the first image. The first object may include a face of a person. The instructions may cause the processor to change an orientation of the camera based on at least part of the data.

An electronic device, according to an embodiment of the present disclosure, may include a housing, at least one wireless communication device, a camera attached to or integrated with the housing, a display, a processor electrically connected to the communication device and the camera, and a memory electrically connected to the processor and storing instructions which cause the processor to execute. The processor may establish wireless connection with an unmanned photographing device using the communication device, send a first signal to the unmanned photographing device through the wireless connection, the first signal comprising data associated with a first image comprising a first object, and receive a second image from the unmanned photographing device through the wireless connection.

The data may include composition of the first image. The data may include a relative position of the first object in the first image. The first object may include a face of a person.

Figure 11:
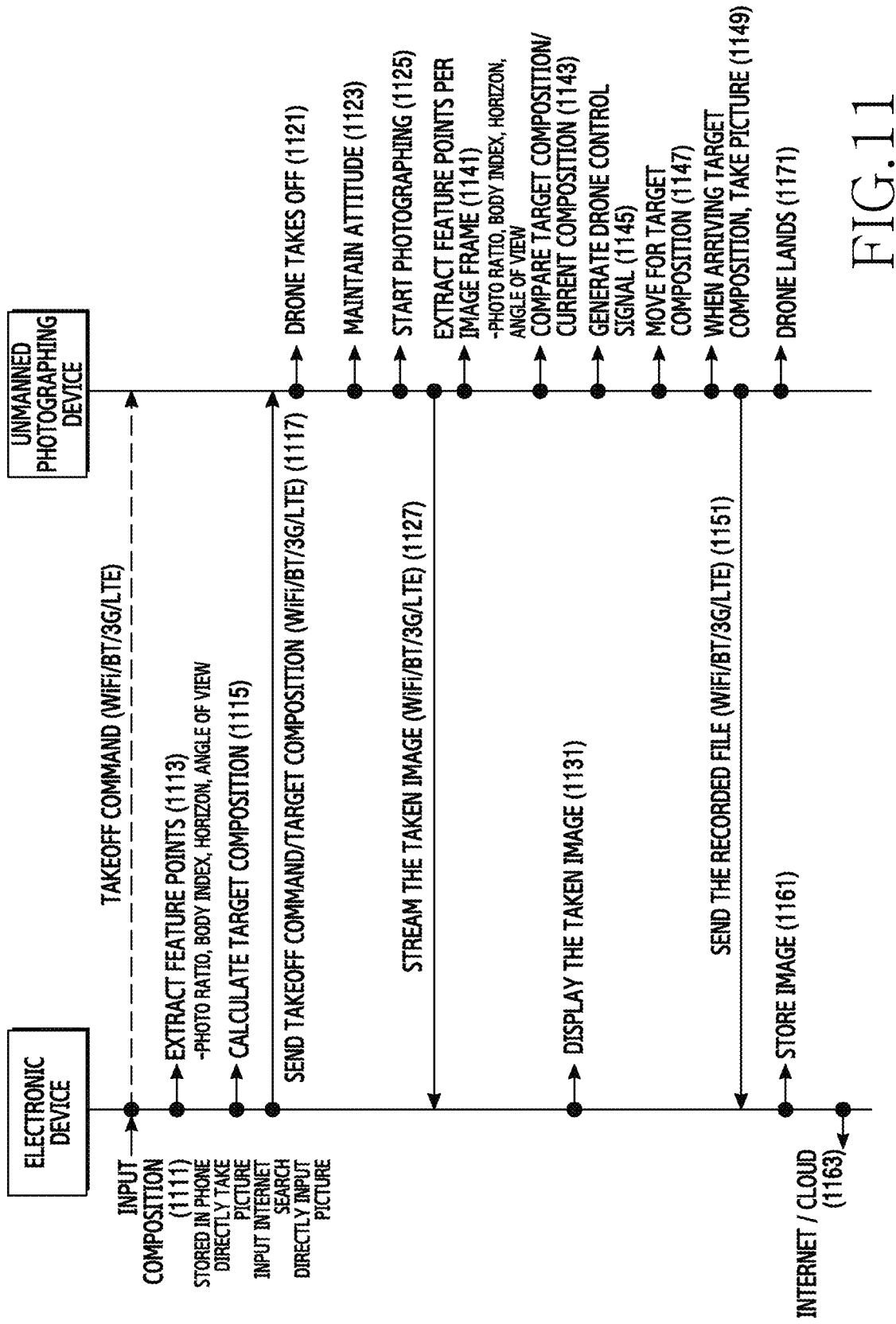
FIG. 11 is a flow diagram of photographing operations of an unmanned photographing device according to an embodiment of the present disclosure.

FIG. 11 is a flow diagram of photographing operations of an electronic device and an unmanned photographing device according to an embodiment of the present disclosure.

Referring to FIG. 11, the electronic device may set an image for generating photographing information in step 1111. The image may be set by selecting a photo stored in the electronic device (e.g., a gallery, an album, etc.), by directly taking and selecting a picture through the camera unit 430, by browsing the Internet and downloading a photo, or by directly inputting composition information. The electronic device may extract composition information of the selected image and generate photographing information for the unmanned photographing device to take a picture.

In step 1113, the electronic device extracts selected image feature points. Image feature points may include a size and a position (e.g., center coordinates of a subject in an image) of a subject (object) in the image. The feature points may include an image ratio (e.g., an aspect ratio or number of pixels) and angle of view. When the subject is a person, the feature points may include a size and a position of a body part. When the image includes a feature such as horizon, the feature points may include horizon position information in the image.

In step 1115, the electronic device sets target composition based on the extracted feature points. The determined target composition may be included in the photographing information.

In step 1117, the electronic device sends the generated photographing information to the unmanned photographing device through the communication unit 420. In step 1117, the electronic device may also send a photographing command of the unmanned photographing device.

The unmanned photographing device receives the photographing information in step 1117. The unmanned photographing device receiving the photographing information may enter a photographing mode. The unmanned photographing device may receive the photographing information and a photographing command together in step 1117. The unmanned photographing device may enter the photographing mode according to the photographing command received from the electronic device. The photographing information may include the image composition information including the subject size and position information.

In the photographing mode, the unmanned photographing device may initiate movement to capture an image of the subject based on the photographing information in step 1121. When the unmanned photographing device is a drone, the unmanned photographing device may take off. When arriving at a position for recognizing the subject after the takeoff, the unmanned photographing device may hover and recognize a subject image through the camera module 560.

The unmanned photographing device maintains attitude in step 1123 and takes an image through the camera module 560 in step 1125. In so doing, the captured image may be a preview image. According to an embodiment of the present disclosure, the unmanned photographing device sends a video stream of the captured image to the electronic device in step 1127.

In step 1141, the unmanned photographing device extracts feature points (e.g., photo ratio, body index, horizon, and/or angle of view) of the captured image. The unmanned photographing device compares the image composition analyzed from the feature points of the captured image with the composition of the photographing information in step 1143, and controls the movement (autonomous flight) based on difference of two images in step 1145.

In step 1147, the unmanned photographing device compares the composition of the captured image with the composition of the image of the photographing information and moves to a position where the composition of the two images matches (until target composition is attained).

In step 1149, when moving to the target composition, the unmanned photographing device automatically captures the subject at the corresponding position. The unmanned photographing device sends the captured image to the electronic device in step 1151 and autonomously flies to and lands at its original position (the takeoff position) in step 1171.

The electronic device receives the image taken by the unmanned photographing device at the target composition position in step 1151, and stores the received image in the storage unit 410 in step 1161.

In step 1163, the electronic device sends the image received from the unmanned photographing device to Internet or a cloud network. According to an embodiment of the present disclosure, the unmanned photographing device may directly send the captured image to Internet or the cloud network. The unmanned photographing device may be wirelessly connected with the electronic device or an external network (e.g., Internet or the cloud network) and communicate data and/or images. The unmanned photographing device may include a communication module 750. The unmanned photographing device may be wirelessly connected with the electronic device or the external network through a cellular module (e.g., LTE, 3G). The unmanned photographing device may be wirelessly connected with the electronic device or the external network through a BT module or a Wi-Fi module. The unmanned photographing device may be wirelessly connected with the electronic device or the external network to receive the photographing information and send the captured image to the electronic device or the external network.

Figure 12:
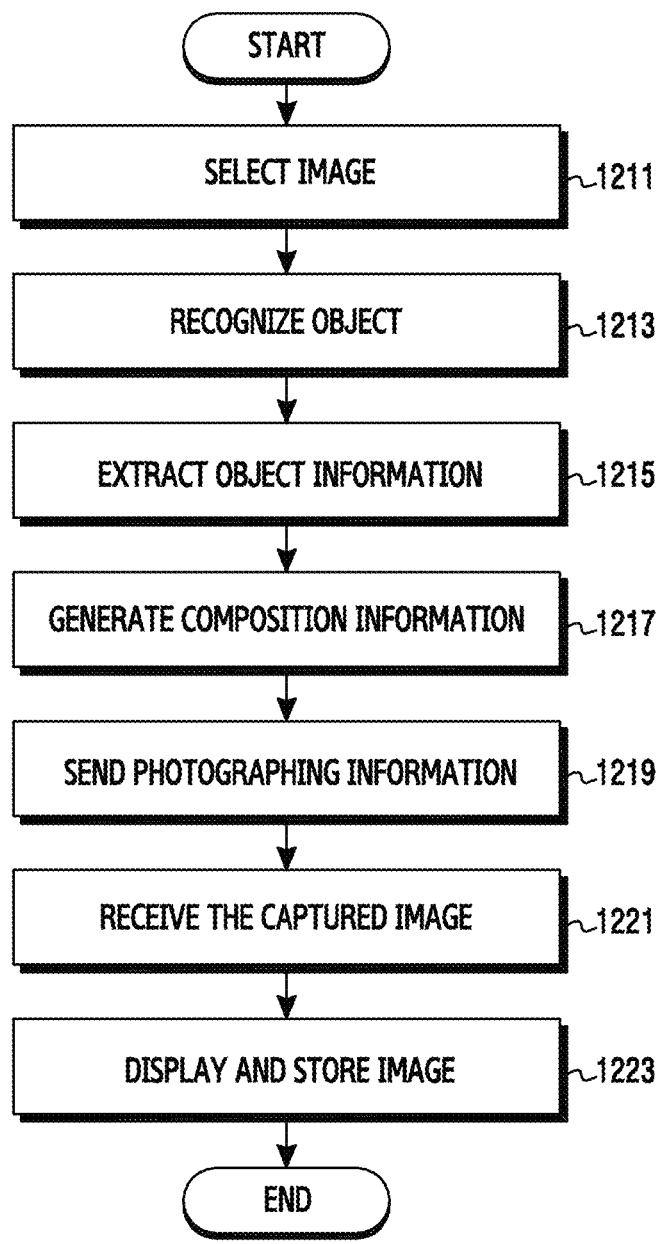
FIG. 12 is a flowchart of a method for generating photographing information in an image in an electronic device according to an embodiment of the present disclosure.

FIG. 12 is a flowchart of a method for generating photographing information in an image in an electronic device according to an embodiment of the present disclosure.

According to an embodiment of the present disclosure, the electronic device (e.g., the processor 400 of FIG. 4) may generate photographing information by analyzing composition of a selected image. The image may be selected from images stored in the electronic device, taken by the camera unit 430, or selected over the Internet or a cloud network.

Referring to FIG. 12, when selecting the image in step 1211, the electronic device recognizes an object in the image by analyzing the selected image in step 1213. The object may be a person or a thing. According to an embodiment of the present disclosure, one object may be extracted from the image, or two or more objects may be extracted. The object may be one person and one thing (e.g., horizon). The object may be a subject or part of the subject. The object may be the entire person or part (e.g., a head including a face) of the person.

In step 1215, the electronic device extracts information of the recognized object. The electronic device may extract position and size information of a head, a hand, a foot, and/or a body part.

In step 1217, the electronic device generates composition information of the image including the object. The composition information may be composition information of the image including the object. The composition information of a person may include the position and the size of the object in the image, and may further include feature points (e.g., horizon, sun, etc.) besides the object. Based on the composition information, the electronic device may generate photographing information.

In step 1219, the electronic device sends the photographing information to the unmanned photographing device through the communication unit 420.

After capturing the image based on the photographing information received from the electronic device, the unmanned photographing device may send the captured image to the electronic device. The electronic device receives the captured image from the unmanned photographing device in step 1221. In step 1223, the electronic device displays the image on the display 450 and stores the image in the storage unit 410. According to an embodiment of the present disclosure, the electronic device may send the captured image to the Internet or the cloud network.

Figure 13A:
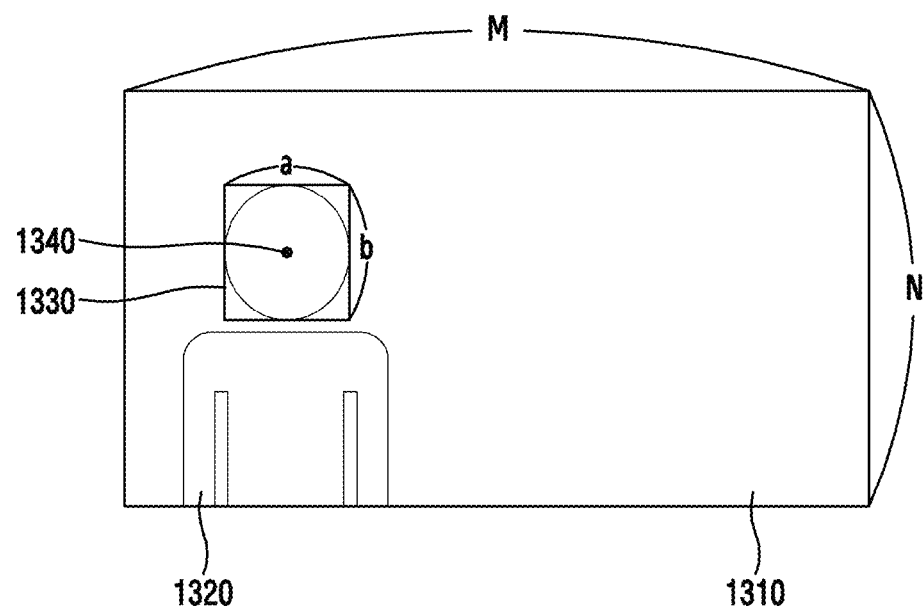
FIGS. 13A and 13B are diagrams of an electronic device which generates photographing information by extracting image composition information according to an embodiment of the present disclosure.
Figure 13B:
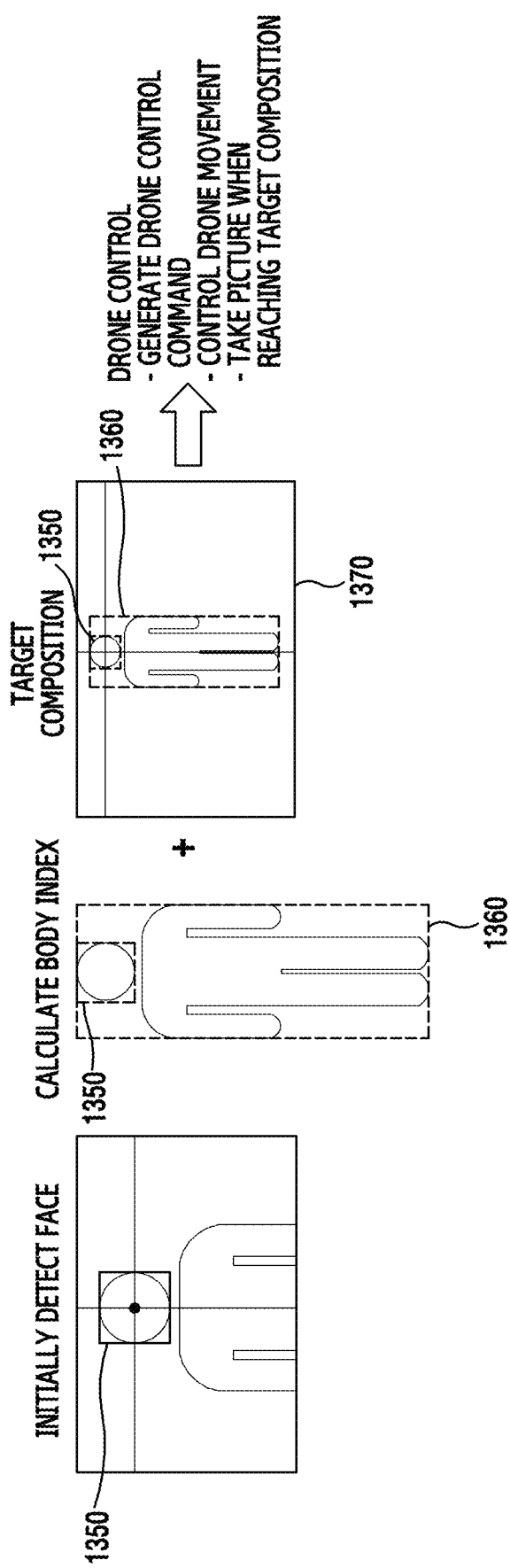

FIGS. 13A and 13B are diagrams of an electronic device which generates photographing information by extracting image composition information according to an embodiment of the present disclosure.

Referring to FIG. 13A, an image 1310 includes a person 1320. The aspect ratio of the image 1310 may be M:N (width:height). The aspect ratio may include 3:2, 4:3, 16:9, and so on. When the resolution of the image 1310 is M*N, the resolution (e.g., standard definition (SD), high definition (HD), full HD, ultra HD (UHD)) may be used as the aspect ratio information. A particular body part of the person may be set as an object to generate the photographing information. When the particular body part is a face, the processor 400 of the electronic device and the processor 500 (e.g., the application processing module) of the unmanned photographing device may run a face recognition algorithm or program. When generating the photographing information, the electronic device may recognize a facial region 1330 of the person in the image and extract center point information 1340 of the facial region 1330. After recognizing the facial region 1330, the electronic device may set the size a*b of the facial region 1330 and determine the center point 1340 of the facial region 1330 as coordinates (x, y) on the image. When the aspect ratio of the image is M (the width):N (the height), the electronic device may recognize the facial region 1330, determine the size (a: the width of the facial region 1330 in the image, b: the height of the facial region 1330 in the image) of the facial region 1330, and determine the center point position (a horizontal position x and a vertical position y in the image) of the facial region 1330.

When the image of the person subject is selected, the electronic device may recognize the aspect ratio and the facial region as shown in FIG. 13A, extract the size and the center point information of the facial region, generate the composition information including the aspect ratio and the size and the center point information of the facial region (e.g., the center point information of the facial region), and generate the photographing information using the generated composition information.

Referring to FIG. 13B, photographing information of a person may include subject composition information in the image. In a photograph, the main subject may be a person. The user may set the background before taking a picture and then place the person. The person may be placed according to the rule of thirds. The person may be placed at the left ⅓ or the right ⅓ of the photo.

In the image, the unmanned photographing device may first recognize the face of the person, autonomously fly to a position based on the photographing composition information, and capture an image of the person when the person is placed at the target composition position.

In an image including a person, the electronic device may recognize a facial region 1350 and extract position information (e.g., center coordinates of the facial region) of the facial region 1350. After extracting the information of the facial region 1350, the electronic device may calculate a body index 1360 of the person based on the information of the facial region 1350. The body index 1360 may be a size of the body part according to a height and a gender of the person. After setting the information of the facial region 1350 and the body index 1360, the electronic device may set target composition 1370 of the image including the information of the facial region 1350 and the body index 1360, and generate photographing information with the target composition information 1370. The unmanned photographing device may autonomously fly while generating a movement control command based on the photographing information received from the electronic device. When arriving at a position (the target photographing position) for capturing an image of the target composition 1370 after the autonomous flight, the unmanned photographing device may automatically capture the image.

According to an embodiment of the present disclosure, the electronic device may extract information of the facial region 1350 from the image, calculate the body index 1360 based on at least part of the information of the facial region 1350, and determine the target composition 1370 including the information of the facial region 1350 and the body index 1360.

When the photo of the person is selected (or when the captured image is selected), the electronic device may generate the photographing information required for the movement of the unmanned photographing device based on the body information (e.g., size, coordinates, body index of the face) of the subject in the selected image as shown in FIG. 13B. The unmanned photographing device may generate a distance movement command by calculating a relative distance between the unmanned photographing device and the subject based on object size information (e.g., body size information, face size information) acquired through the camera module 560, generate an altitude movement command of the unmanned photographing device based on a vertical coordinate of the body, and generate horizon and azimuth control commands of the unmanned photographing device with a horizontal coordinate of the body. The body index of the subject may be determined using any part of the body such as face or silhouette, and may include feature points of clothes or an object on the person. In an embodiment of the present disclosure explain the body index information extraction based on the face of the person in the image by way of example.

Figure 14:
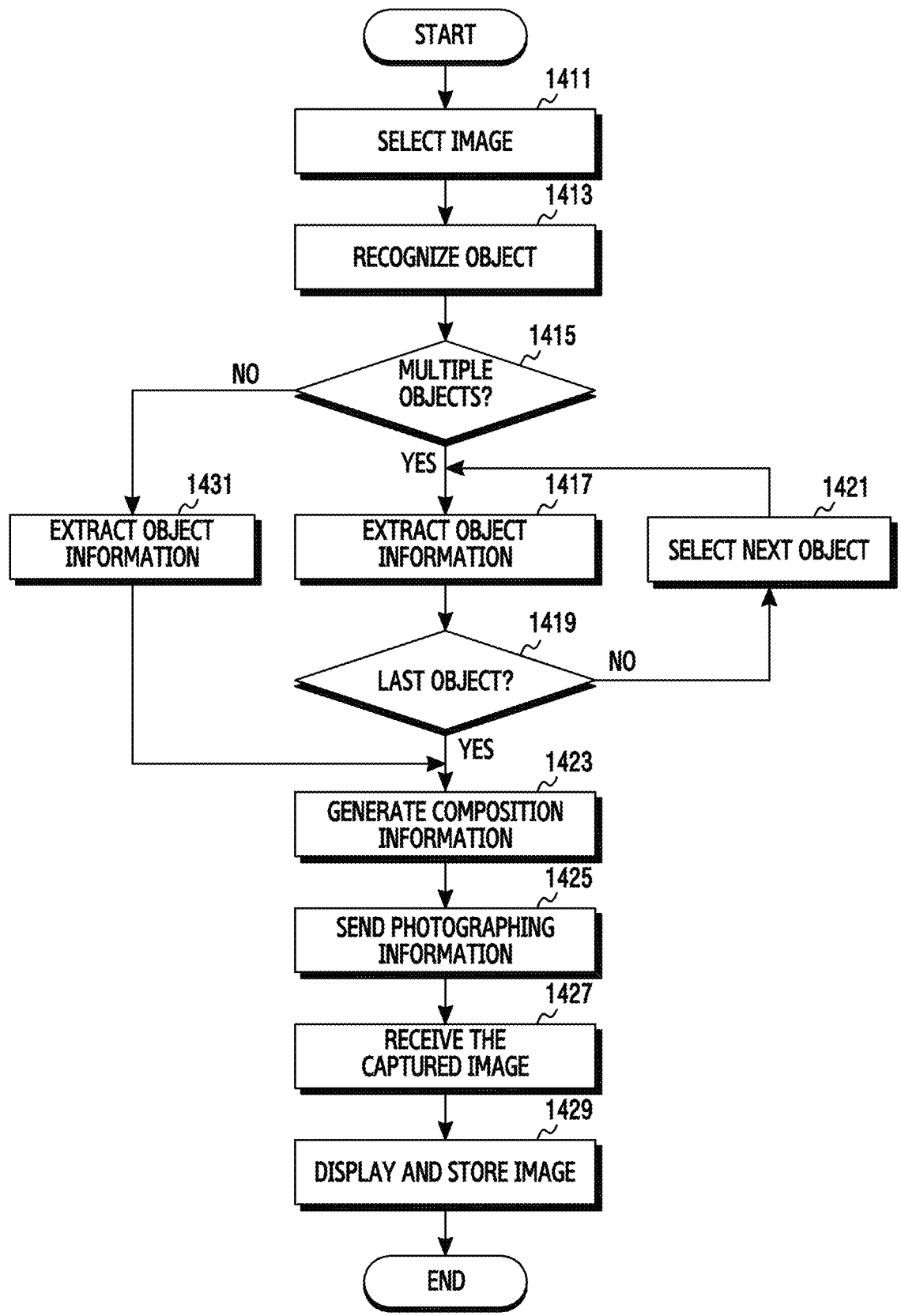
FIG. 14 is a flowchart of a method for generating photographing information by analyzing a selected image in an electronic device according to an embodiment of the present disclosure.

FIG. 14 is a flowchart of a method for generating photographing information by analyzing a selected image in an electronic device according to an embodiment of the present disclosure.

Referring to FIG. 14, the electronic device may generate photographing information by analyzing a composition of a selected image.

In step 1411, the electronic device recognizes the image selection of user. In step 1413, the electronic device recognizes an object in the selected image. The object may be a person, a thing, or both in the image. One object or two or more objects may be extracted from the image. The object may include two persons, or a person and a thing (e.g., horizon, sun, etc.).

In step 1415, the electronic device determines whether the recognized object is a plurality of objects by analyzing the recognized object. For a single object, the electronic device may extract object information in step 1431. The object information may include size and position information of the object. Next, the electronic device may proceed to step 1423.

For multiple objects recognized in step 1415, the electronic device extracts information of the first object in step 1417. The extracted object information may include object size information and object position information in the image. In step 1419, the electronic device determines whether a next object exists. When determining the next object, the electronic device recognizes the next object in step 1419 and selects the next object in step 1421. Next, the electronic device extracts information of the selected object in step 1417. When extracting the last object information, the electronic device recognizes the last object information extraction in step 1419 and proceeds to step 1423.

In step 1423, the electronic device generates composition information of the image including the object information. The composition information may be composition information of the image including the object. The composition information of a person may include object position and size in the image, and may further include feature points (e.g., horizon, sun, etc.) besides the object. The electronic device may generate photographing information based on the composition information. Next, the electronic device wirelessly connects with the unmanned photographing device through the communication unit 420 in step 1425 and sends the photographing information over the wireless connection.

After capturing the image based on the photographing information, the unmanned photographing device may send the captured image to the electronic device. The electronic device receives the image from the unmanned photographing device in step 1427. In step 1429, the electronic device displays the received image on the display 450 or stores the received image in the storage unit 410. According to an embodiment of the present disclosure, the electronic device may send the image to the Internet or a cloud network.

FIGS. 15A to 15H are diagrams of an electronic device which extracts information of objects in an image according to an embodiment of the present disclosure.

Figure 15A:
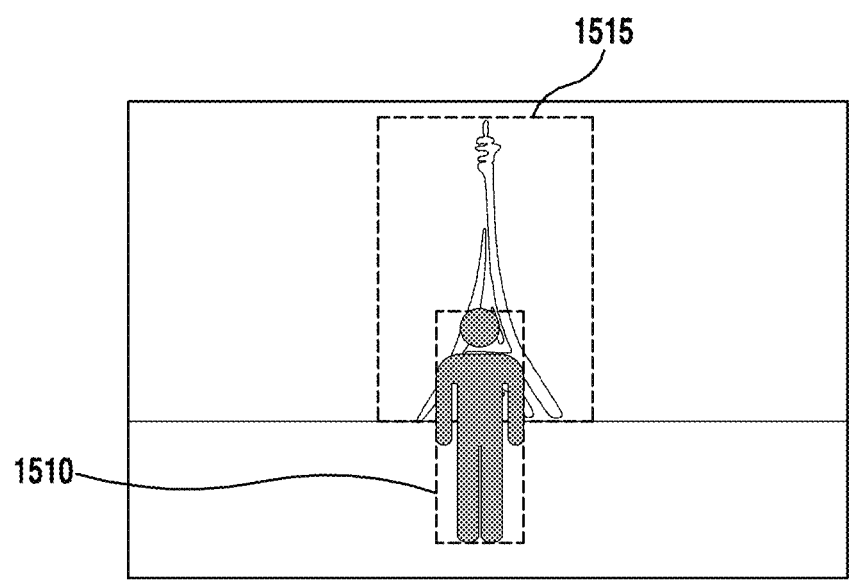
FIGS. 15A to 15H are diagrams of an electronic device which extracts information of objects in an image according to an embodiment of the present disclosure.

Referring to FIG. 15A, objects in a selected image include a person object 1510 and a thing object 1515. The electronic device may extract information about the person object 1510 (e.g., person object information, first object information). The person object 1510 may include the entire or part (e.g., a face) of the person. The person object information may include the size information and the position information of the person in the image.

The electronic device extracts information about the thing object 1515 (e.g., thing object information, second object information). The thing object information may be extracted in the same manner as the extraction of the person object information. The thing object information may include size information and position information of the thing object 1515 in the image. The position information may include center point coordinates of the object based on the aspect ratio of the image. The thing object 1515 may not include the size information (e.g., horizon) and the center point coordinates (e.g., a river, a road). When the thing object cannot be represented with the size and/or position information, the electronic device may extract edge information of the thing object as the object information.

Figure 15B:
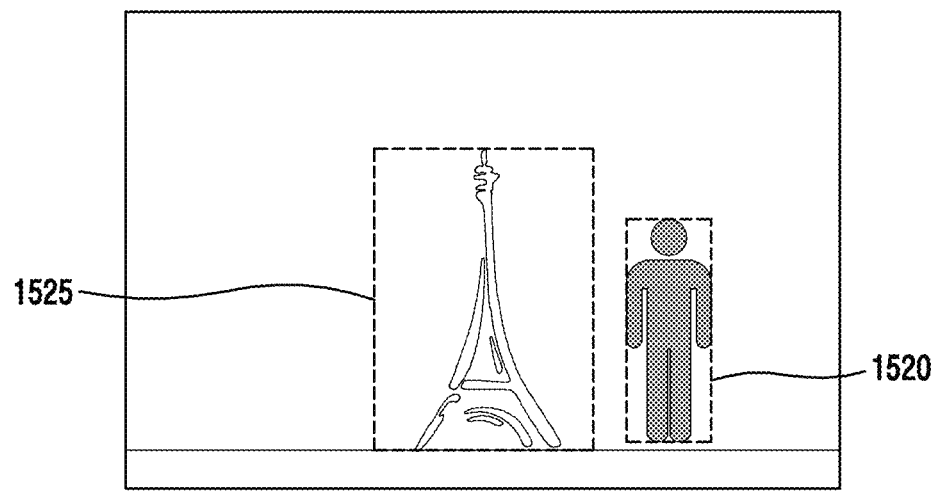

In the image including multiple objects, the first object (e.g., the person object 1510) and the second object (e.g., the thing object 1515) may overlap in a certain area as shown in FIG. 15A, and may be placed in a non-overlapping area as shown in FIG. 15B. When the objects overlap in the certain area as shown in FIG. 15A, the unmanned photographing device may recognize the overlapping of the objects based on the size and position information of the objects.

Images including the multiple objects may include a main object and a background object. The main object may be a person (or an animal) and/or a thing. The background object may be a stationary object such as the horizon, a mountain, the sun, clouds, the surface of sea, a bridge, a building, or a tree. When capturing an image using the unmanned photographing device, the electronic device may generate composition information including the position of the background object.

Figure 15C:
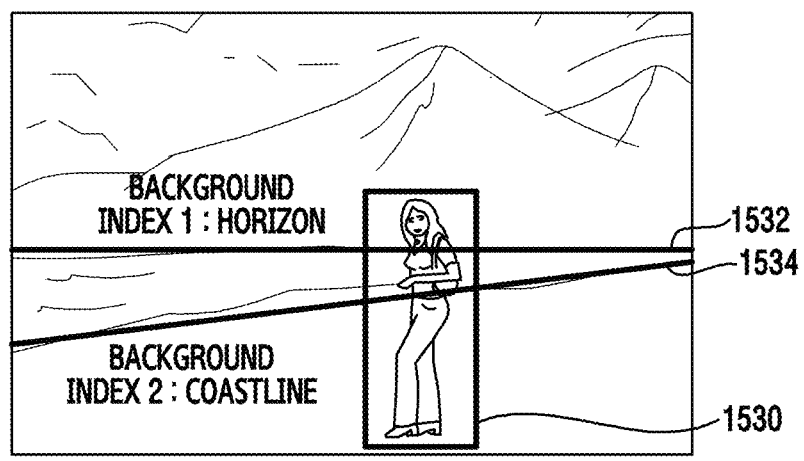

FIG. 15C illustrates an example in which an image includes a person object 1530 which is the main object and two background objects 1532 and 1534. The background objects may include a horizon 1532 and a boundary 1534 of a seaside and a sandy beach.

Figure 15D:
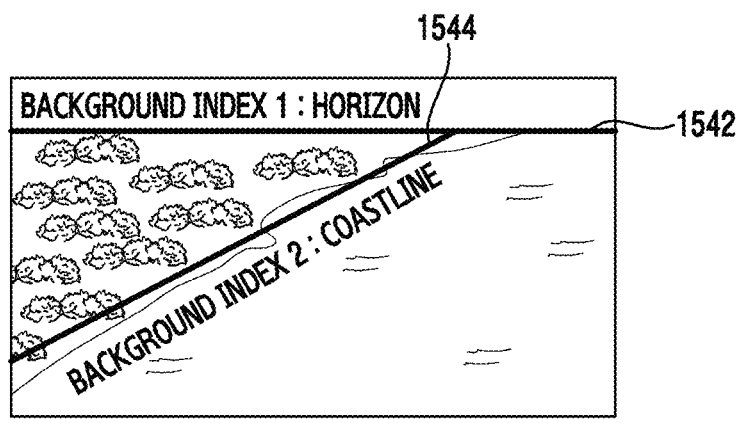

FIG. 15D illustrates an example of photographing a scenery image. The electronic device may set target composition with composition information including a horizon 1542 and a boundary 1544 of sea and land in the image of FIG. 15D.

Figure 15E:
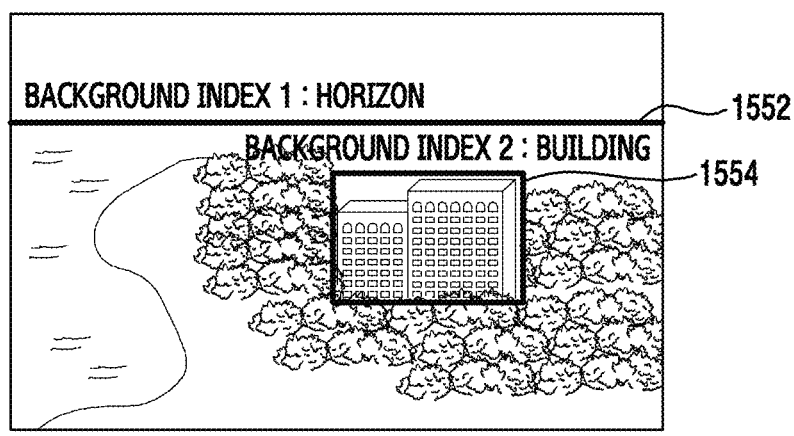

In FIG. 15E, another scenery image is captured. The electronic device may set target composition with composition information including a horizon 1552 and a building 1554 in the image of FIG. 15E.

Figure 15F:
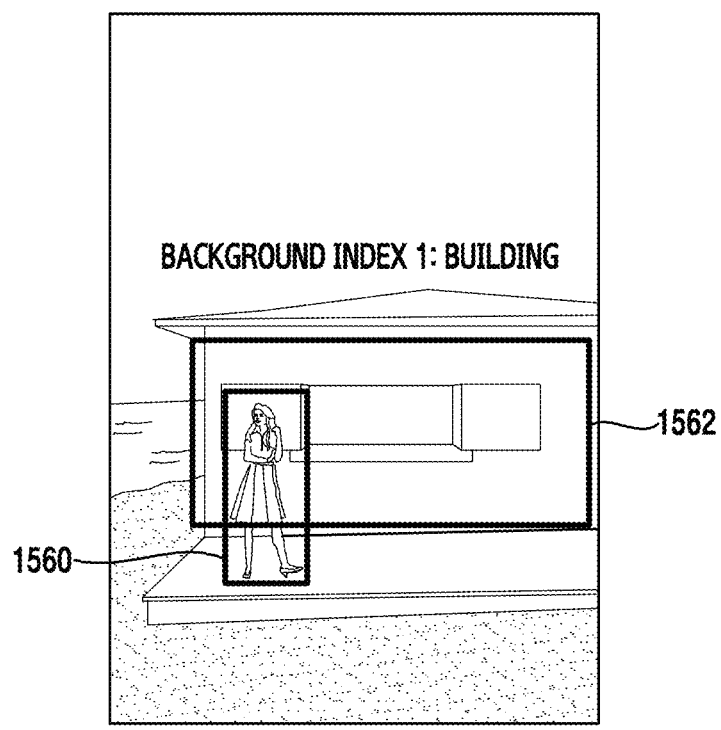

FIG. 15F illustrates an example in which an image includes a person object 1560 which is the main object and one background object 1562. The background object 1562 may be a structure.

Figure 15G:
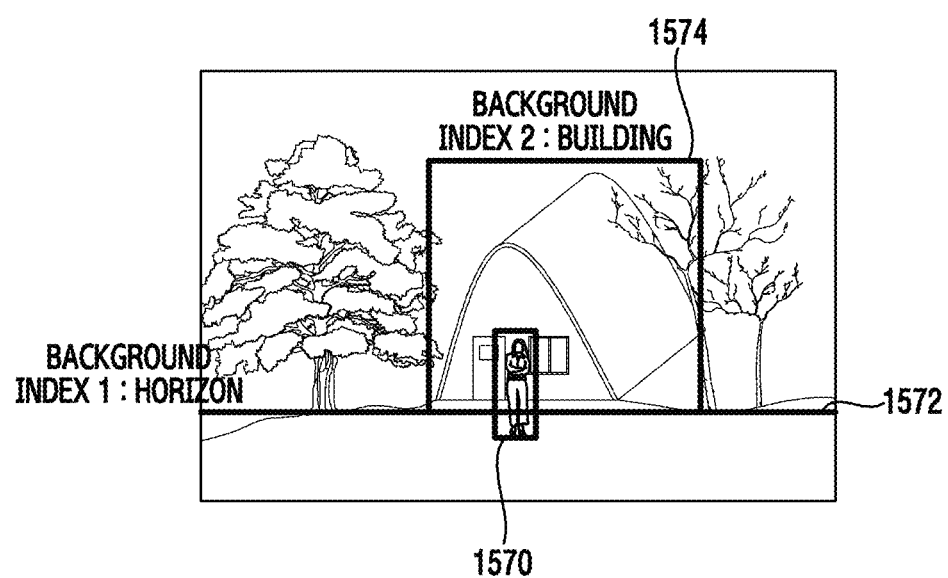

FIG. 15G illustrates an example in which an image includes a person object 1570 which is the main object and two background objects 1572 and 1574. The background objects may include a horizon 1572 and a structure 1574.

Figure 15H:
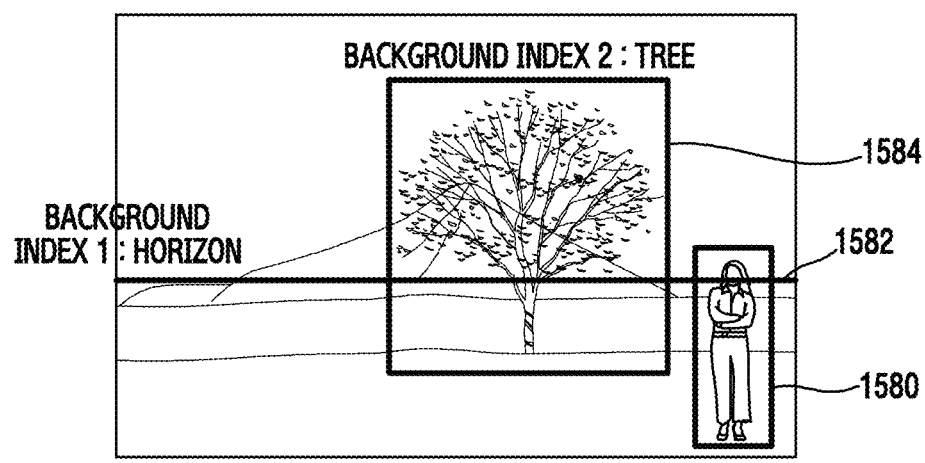

FIG. 15H illustrates an image includes a person object 1580 which is the main object and two background objects 1582 and 1584. The background objects may include a horizon 1582 and a tree 1584.

When capturing the images of FIGS. 15A through 15H using the unmanned photographing device, the electronic device may generate the composition information including the aspect ratio, the position (coordinate) information of the main object and at least one background object in the screen, and the size of the objects. The unmanned photographing device may set the composition based on the position and the size of the main object, and the composition of the main object and the background objects. When the composition information of the main object and the composition information of the main object and the background objects received from the electronic device and the composition information of the captured objects match, the unmanned photographing device may capture an image at a corresponding position.

FIGS. 16A to 16E are screenshots of selecting an image in an electronic device according to an embodiment of the present disclosure.

Figure 16A:
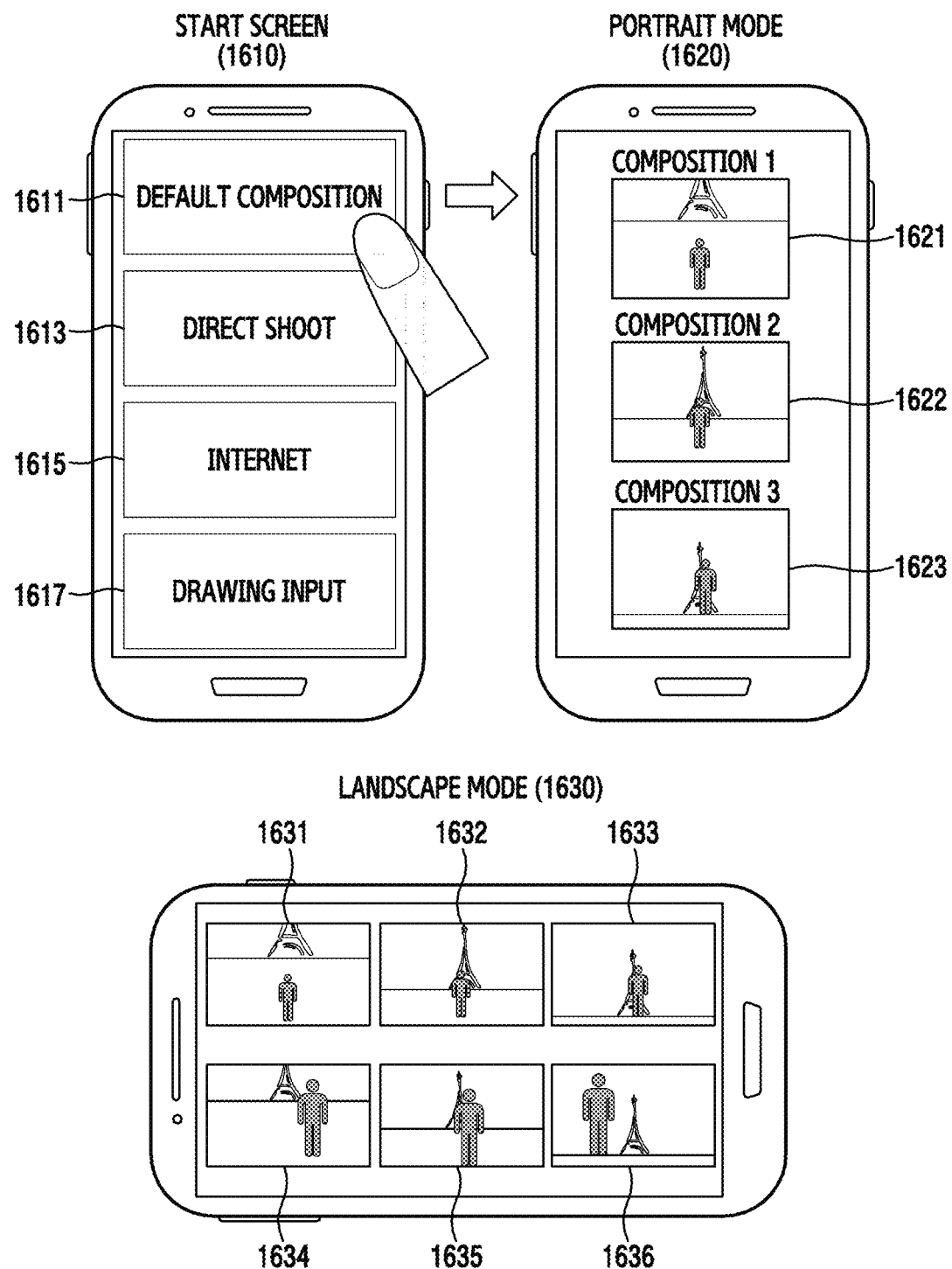
FIGS. 16A to 16E are screenshots of selecting an image in an electronic device according to an embodiment of the present disclosure.

Referring to FIG. 16A, in an auto photographing mode using an unmanned photographing device, the electronic device may display a start screen 1610 on a display 450. The start screen 1610 includes items of default composition 1611, direct shoot 1613, Internet 1615, and drawing input 1617.

When selecting the default composition 1611, the electronic device may display images stored in a storage unit 410. The images may be stored in an album and/or a gallery. In a portrait mode 1620, the electronic device displays images 1621, 1622, and 1623. In a landscape mode 1630, the electronic device displays images 1631 through 1636. When one of the displayed images is selected in the portrait mode 1620 or the landscape mode 1630, the electronic device may generate photographing information based on the selected image. The electronic device may extract feature points (e.g., photo ratio, body index, horizon, angle of view, etc.) of the selected image and generate the photographing information including target composition based on the extracted feature points.

Figure 16B:
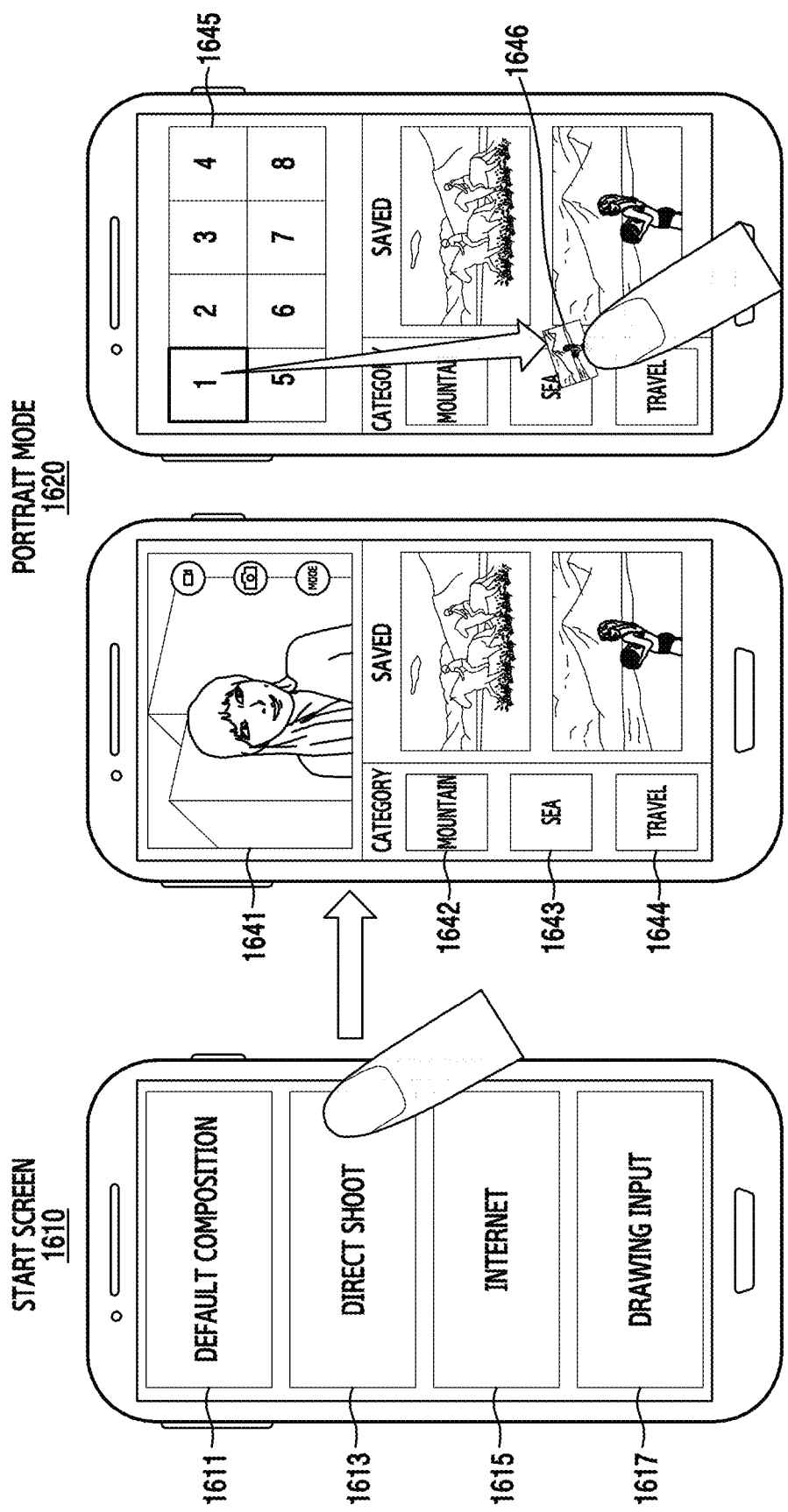

Referring to FIG. 16B, when selecting the direct capture 1613 in the start screen 1610, the electronic device may take a picture according to the portrait mode 1620 or the landscape mode 1630. If the photographing mode is performed in the portrait mode 1620, the electronic device may display a captured photo 1641 on the display. In so doing, the display may display the captured photo 1641 and category folders 1642, 1643, and 1644 which store images. Captured photos may be displayed as thumbnail images 1645, and the electronic device may generate photographing information based on an image 1646 selected (e.g., touched, dragged and dropped) from the thumbnail images 1645.

Figure 16C:
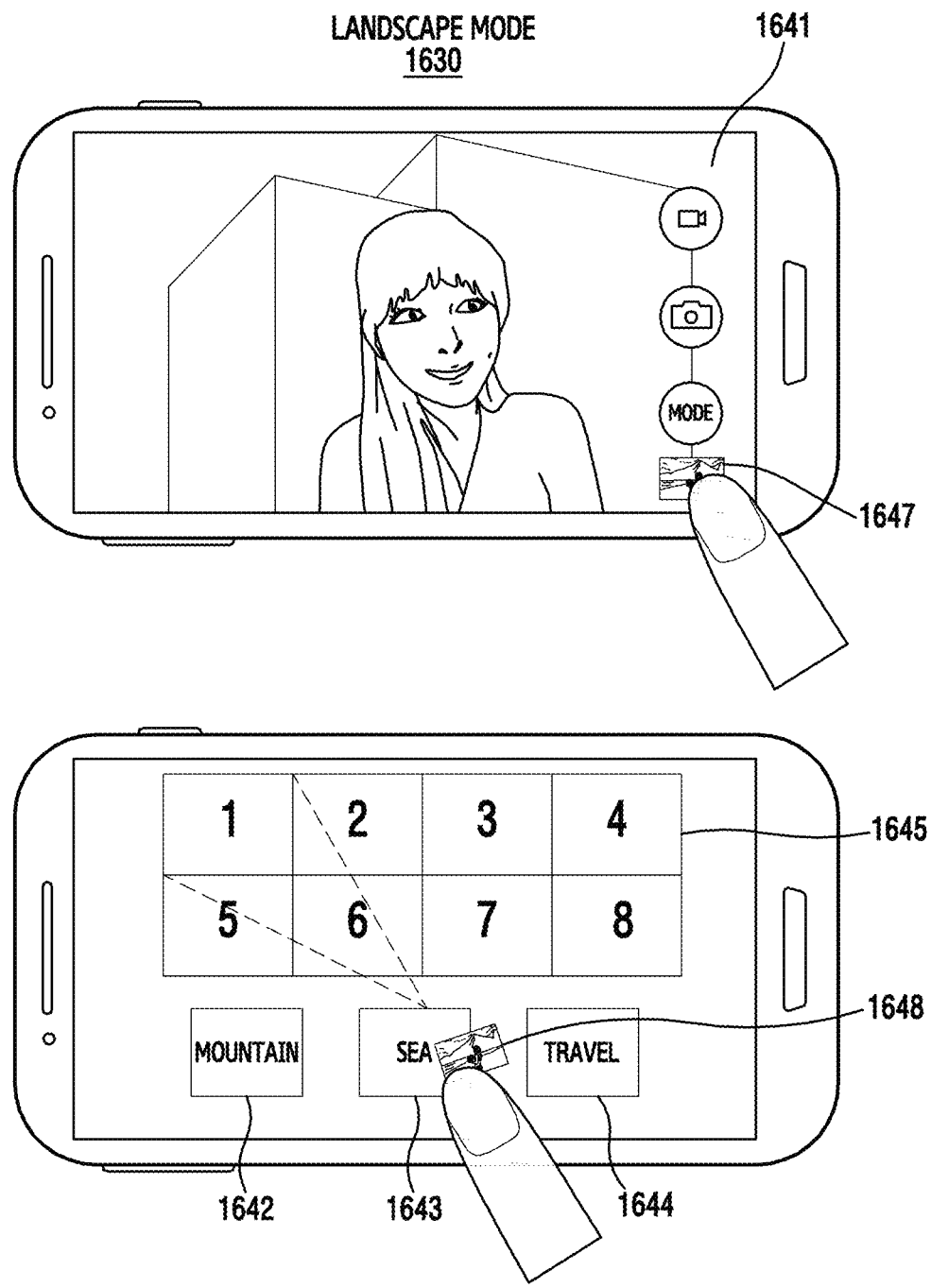

Referring to FIG. 16C, in the landscape mode 1630, the electronic device may display an image 1641 taken by a camera unit 430 on the display in the landscape mode 1630. When the user selects a thumbnail image button 1647, the electronic device may display thumbnail images 1645. In the thumbnail images 1645, numbers 1 through 8 may indicate the thumbnail images, and a number 8 of the thumbnail images 1645 may indicate more thumbnail images. When the more thumbnail images is selected, the electronic device may display the next thumbnail images. The user may select a thumbnail image 1648 to generate photographing information in the thumbnail image 1645. The electronic device may generate photographing information based on an image of the thumbnail image 1648 selected by the user.

Figure 16D:
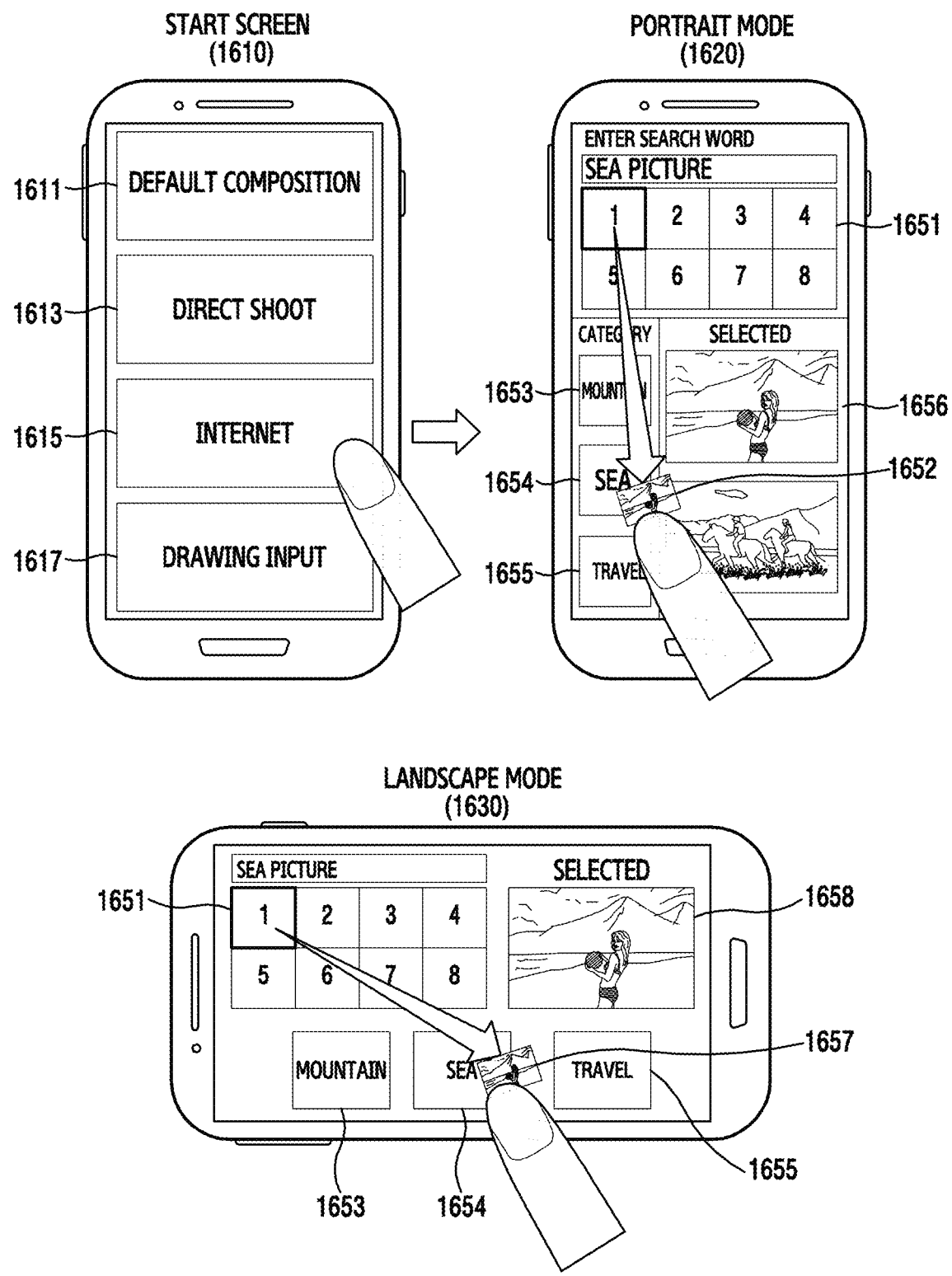

Referring to FIG. 16D, when the Internet 1615 is selected in the start screen 1610, the electronic device may be connected to the Internet and select an image according to the mode (e.g., the portrait mode 1620, the landscape mode 1630). When the Internet 1615 is selected in the portrait mode 1620, the electronic device may display thumbnail images 1651 of images browsed in the Internet. The electronic device may display folders 1653, 1654, and 1655 for storing the downloaded pictures on the display. Numbers 1 through 8 in the thumbnail images 1651 may indicate areas in which respective thumbnail images are displayed. When an area of a number 8 is selected in the thumbnail images 1651, the electronic device may display the next thumbnail images. The user may select a thumbnail image 1652 from the thumbnail images 1651 to generate photographing information. The electronic device may display the thumbnail image 1652 selected by the user as a selected screen 1656, and generate photographing information based on an image of the selected thumbnail image 1652.

When the Internet 1615 is selected in the landscape mode 1630, the electronic device may display the thumbnail images 1651 of images browsed on the Internet by the user. The user may select a thumbnail image 1657 from the thumbnail images 1651 to generate photographing information. The electronic device displays the thumbnail image 1657 selected by the user as a selected screen 1658, and generates photographing information based on an image of the selected thumbnail image 1657.

Figure 16E:
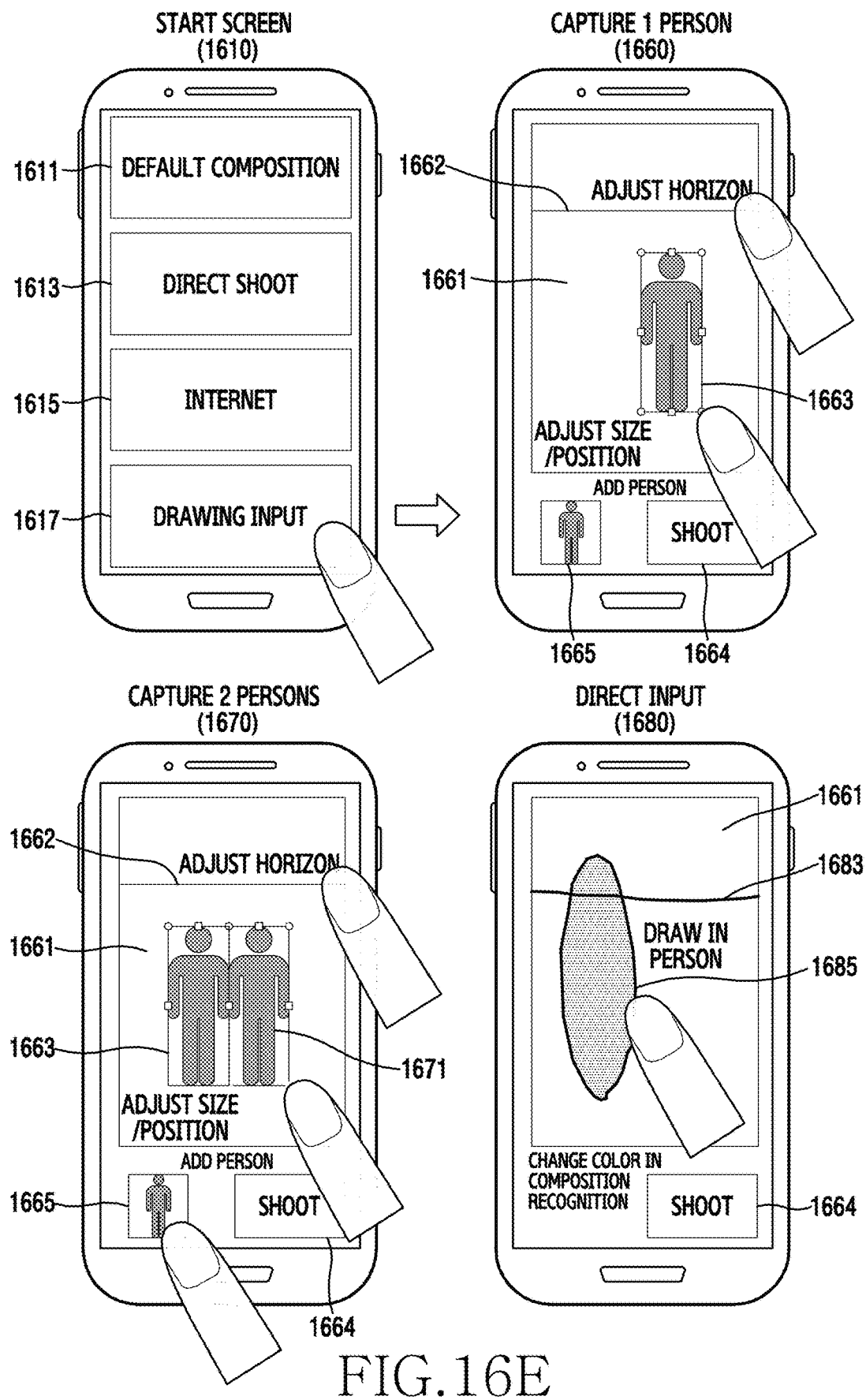

Referring to FIG. 16E, when the drawing input 1617 is selected in the start screen 1610, the electronic device may display a drawing region 1661 on the display 450 according to the mode (e.g., the portrait mode 1620, or the landscape mode 1630). When the drawing input 1617 is selected, the electronic device may display the drawing region 1661, a person add button 1665, and a camera button 1664. Objects displayed in the drawing region 1661 may include a person 1663 and a horizon 1662 for adjusting the horizon.

When capturing a single person, the electronic device may display the person 1663 in the drawing region 1661. The electronic device may display a single person shot screen 1660 associated with capturing the single person. When the user drags a display region of the person 1663, the electronic device may adjust a size and/or a position of the display region of the person 1663. When the user drags the horizon 1662 in the drawing region 1661, a position of the displayed horizon 1662 may be adjusted. When the drawing input ends, the electronic device may generate photographing information based on the drawing screen.

When displaying the screen for the drawing input, the electronic device may display the person add button 1665. When the user selects the person add button 1665, the electronic device may display a two person shot screen 1670.

When the person add button 1665 is selected, the electronic device may display the two person shot screen 1670 which shows an added person 1671 on the single person shot screen 1660. The two person shot screen 1670 displays the added person 1671 on the right of the person 1663 in the drawing region 1661. When detecting a drag on the display region of the person 1663 or the person 1671, or the display region of the horizon 1662, the electronic device may change the display region or position according to a drag direction. The change of the display region may enlarge or reduce the region. When the add button 1665 is selected again in the two person shot 1670, the electronic device may add a person and display a three person shot screen. When the drawing input ends, the electronic device may generate photographing information based on the drawing screen.

The user may directly draw a subject and composition of his/her intended picture in the drawing region 1661. In a direct input screen 1680, the user may directly draw subjects 1683 and 1685 in the drawing region 1661 to set the photographing composition. The user may directly draw a size and a position of a main subject 1685 (e.g., a person) in the drawing region 1611, and directly draw a guide line 1683 (e.g., horizon). When the drawing input ends, the electronic device may generate photographing information based on the drawing information in the drawing region 1611.

As shown in FIGS. 16A through 16E, the electronic device, according to an embodiment of the present disclosure, may generate the photographing information based on the photo image. The electronic device may select a photo from the stored photos to generate the photographing information. The electronic device may take a picture to generate the photographing information through a camera unit 430. The electronic device may select a photo to generate the photographing information by browsing Internet. The electronic device may generate the photographing information with the image directly drawn by the user.

When the photo image or the drawing image is determined, the electronic device may generate the photographing information for the unmanned photographing device to take a picture. The electronic device may extract feature points of the image. The extracted feature points may include a size and a position (e.g., center point coordinates of a subject in an image) of a subject (object) in the image. The feature points may include an image ratio (e.g., aspect ratio) and/or the angle of view. When the subject is a person, the feature points may include a size and position of a body. When the image includes a feature such as the horizon, the feature points may include position information of the horizon in the image. After extracting the feature points of the image, the electronic device may set target composition based on the extracted feature points. The determined target composition may be included in the photographing information.

FIGS. 17A to 17E are diagrams of an electronic device which sends photographing information to an unmanned photographing device according to an embodiment of the present disclosure.

Figure 17A:
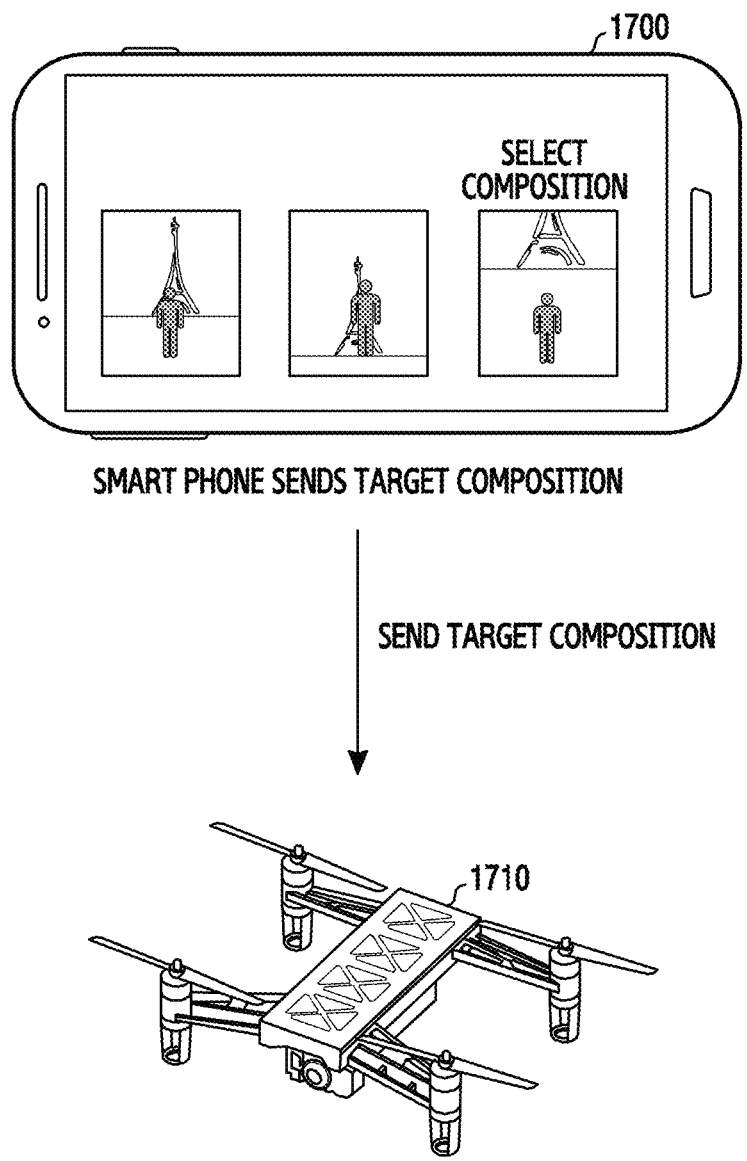
FIGS. 17A to 17E are diagrams of an electronic device which sends photographing information to an unmanned photographing device according to an embodiment of the present disclosure.

Referring to FIG. 17A, the electronic device 1700 may be a smart phone. The electronic device 1700 may generate photographing information by extracting object information from a selected image. The electronic device 1700 may wirelessly connect with an unmanned photographing device 1710 and send photographing information as target photographing composition to the unmanned photographing device 1710. The unmanned photographing device 1710 may autonomously fly to a position of the target photographing position based on the received photographing information and take a picture at the composition position.

Figure 17B:
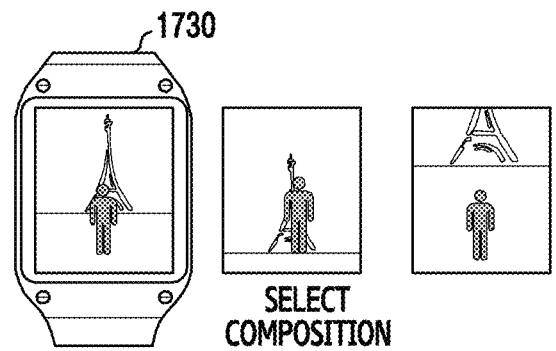
Figure 17B:
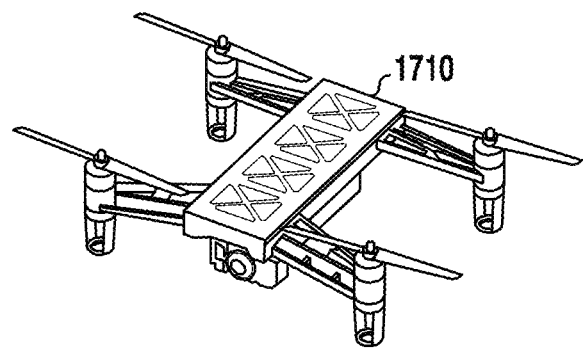

Referring to FIG. 17B, an electronic device 1730 may be a wearable device (e.g., a watch phone). The electronic device 1730 may generate photographing information by extracting object information from a selected image and send the photographing information as target photographing composition to the unmanned photographing device 1710. The unmanned photographing device 1710 may autonomously fly to a position of the target photographing position based on the received photographing information and take a picture at the composition position.

Figure 17C:
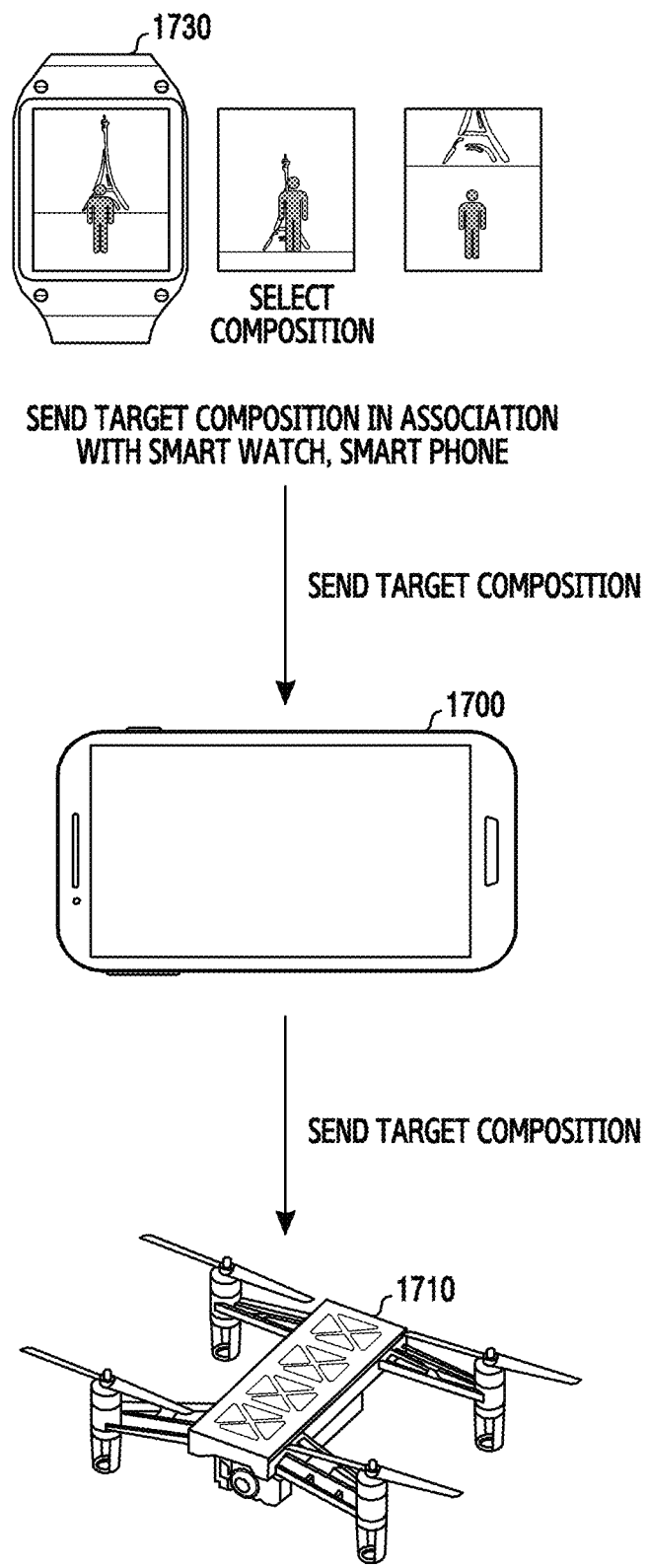

Referring to FIG. 17C, the wearable device 1730 may include at least one of a cellular communication module and a BT communication module. The wearable device 1730 may be connected with external electronic devices via the electronic device 1700 such as a smart phone. The wearable device 1730 may have a smaller display than the electronic device 1700 such as a smart phone, and have smaller battery capacity. When the wearable device 1730 is far from the unmanned photographing device 1710, they cannot communicate with each other. When a data communication activity between the wearable device 1730 and the unmanned photographing device 1710 increases (e.g., transmission of the photographing information, reception of the captured image), their power consumption may increase.

The wearable device 1730 may generate photographing information by extracting object information from a selected image, and send the photographing information to the electronic device 1700 which is the smart phone. The electronic device 1700 which is the smart phone may send the received photographing information as the target photographing composition, to the unmanned photographing device 1710. The unmanned photographing device 1710 may autonomously fly to a position of the target photographing position based on the received photographing information and take a picture at the composition position.

Figure 17D:
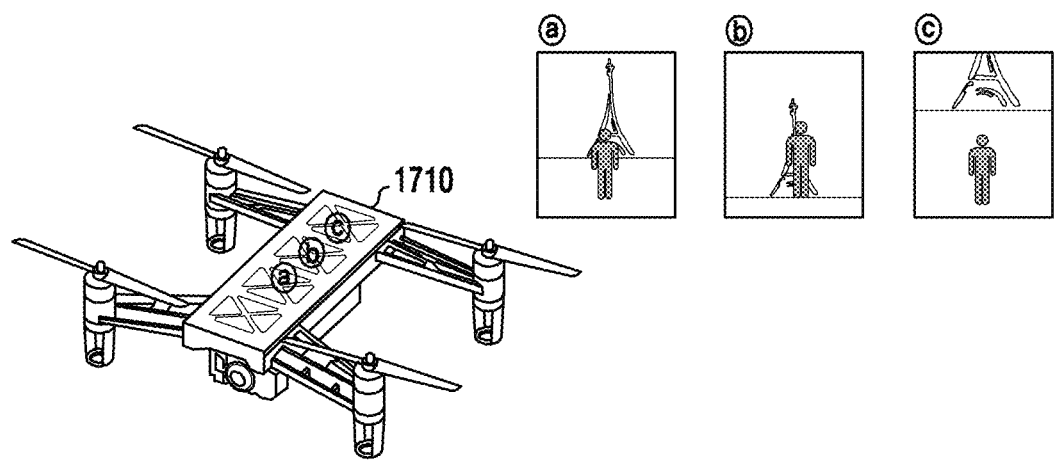

Referring to FIG. 17D, the unmanned photographing device 1710 may autonomously fly to its own target composition position and take a picture. When photographing compositions a, b, and c are set, the unmanned photographing device 1710 may autonomously fly to a position of the target composition based on the stored photographing information and take a picture at the composition position.

Figure 17E:
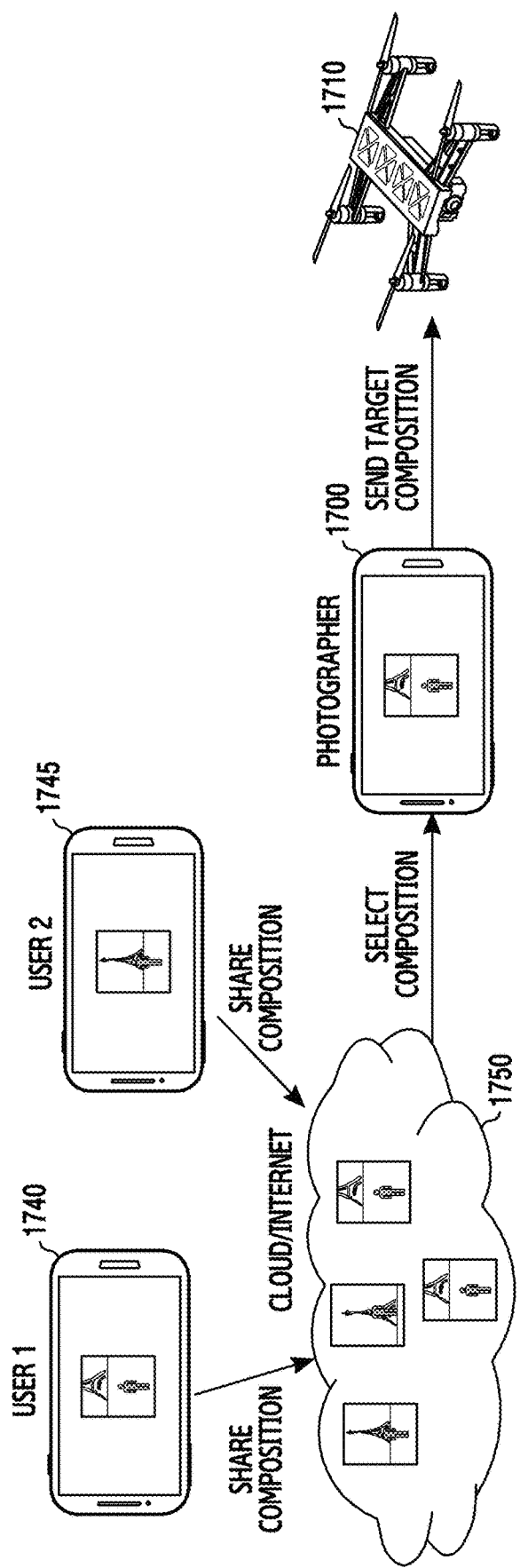

Referring to FIG. 17E, the electronic device 1700 may select an image of intended composition over a cloud/Internet 1750. The cloud/Internet 1750 may connect a plurality of external electronic devices (e.g., an electronic device 1740 of a first user, an electronic device 1745 of a second user), and the external electronic devices 1740 and 1745 may upload pictures of various compositions to the cloud/Internet 1750. The electronic device 1700 may select an image of the intended composition by accessing the cloud/Internet 1750. Next, the electronic device 1700 may generate photographing information by extracting object information from the selected image, wirelessly connect to the electronic device 1710, and send the photographing information as the photographing target composition. The unmanned photographing device 1710 may autonomously fly to the position of the photographing target composition based on the received photographing information, and take a picture at the composition position.

Figure 18:
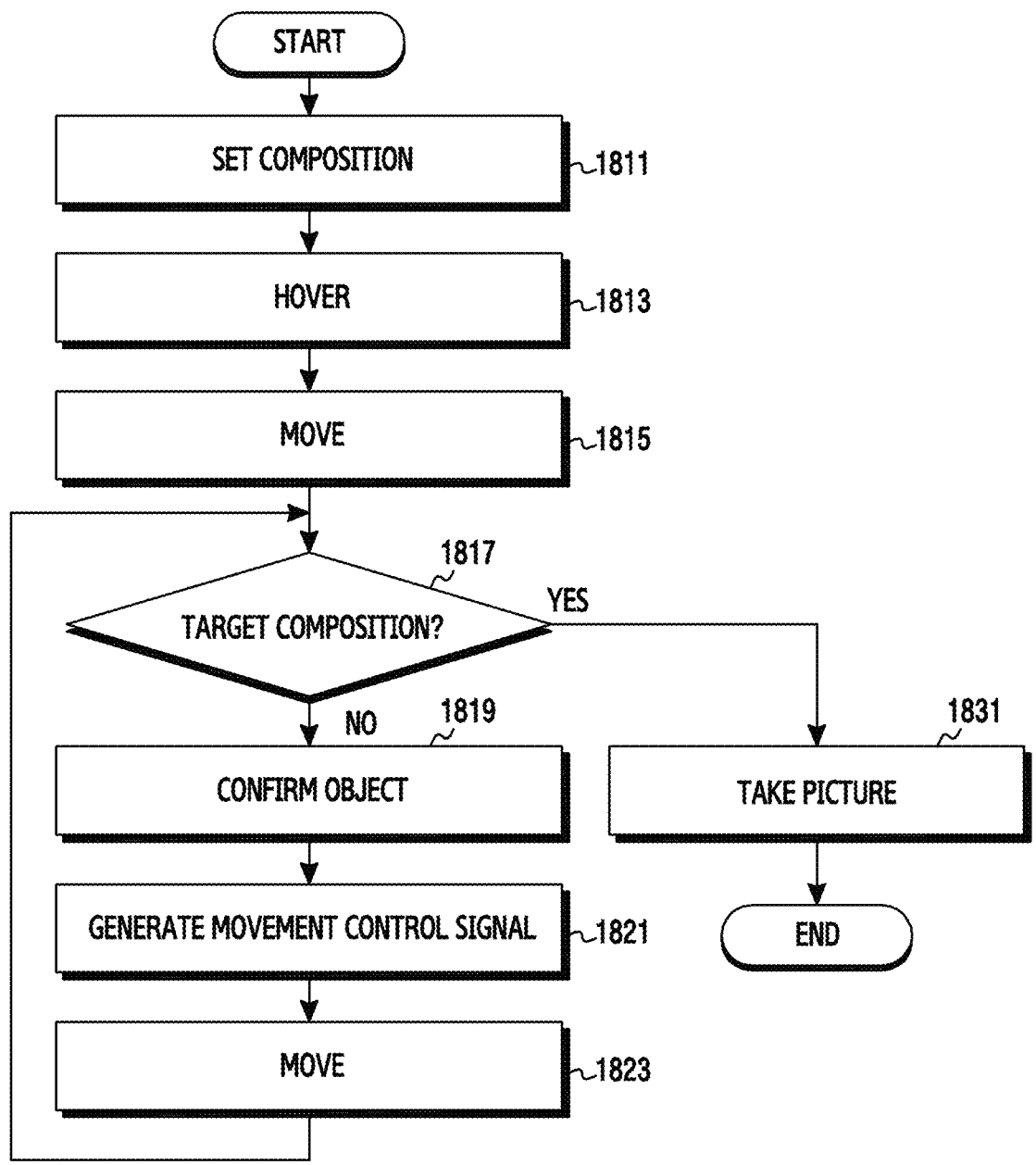
FIG. 18 is a flowchart of a method for automatically photographing using an unmanned photographing device according to an embodiment of the present disclosure.

FIG. 18 is a flowchart of a method for automatically photographing using an unmanned photographing device according to an embodiment of the present disclosure.

According to an embodiment of the present disclosure, the unmanned photographing device may take a picture based on photographing information. The photographing information may include object information in an image. The object information may include the entire or part of a subject in the image. When receiving the photographing information from the electronic device, the unmanned photographing device may enter a photographing mode. When entering the photographing mode, the unmanned photographing device may take a picture based on the stored photographing information. In the photographing mode, the unmanned photographing device may automatically take a picture based on the stored photographing information. The photographing mode may be set under control of the electronic device, through an external button of the unmanned photographing device.

Referring to FIG. 18, in the photographing mode, the unmanned photographing device sets the target composition of an image to capture by analyzing the photographing information in step 1811. In step 1813, the unmanned photographing device moves. When the unmanned photographing device is a UAV, the unmanned photographing device may take off and hover to detect an object in step 1813. The unmanned photographing device may hover and recognize an object to automatically capture. When automatically capturing a person, the object may be a face of the person. The unmanned photographing device may confirm the target composition of the image to capture, automatically take off (e.g., vertically take off), and search for an object. Upon recognizing the object, the unmanned photographing device may hover and confirm the composition. When recognizing the object, the unmanned photographing device moves in step 1815. The unmanned photographing device may obtain the photographing information, locate the object, and move to a target photographing position.

In step 1817, the unmanned photographing device checks the target composition. When determining that the composition of the image captured by the camera module 560 does not match the target composition in step 1817, the unmanned photographing device compares and analyzes an image taken by the camera module 560 and the target composition of the photographing information in step 1819. The unmanned photographing device compares and analyzes an object of the image taken by the camera module 560 and the object of the target composition of the photographing information, and generates a movement control signal according to the analysis in step 1821. In step 1823, the unmanned photographing device autonomously flies based on the movement control signal. When determining that the composition of the image captured by the camera module 560 does not match the target composition in step 1817, the unmanned photographing device repeats steps 1819 through 1823.

The unmanned photographing device may autonomously fly to a position which makes the image taken by the camera module 560 the same as, or similar to, the image of the set target composition. When the image composition taken by the camera module 560 matches the target composition in step 1817, the unmanned photographing device automatically captures the image in step 1831.

Figure 19A:
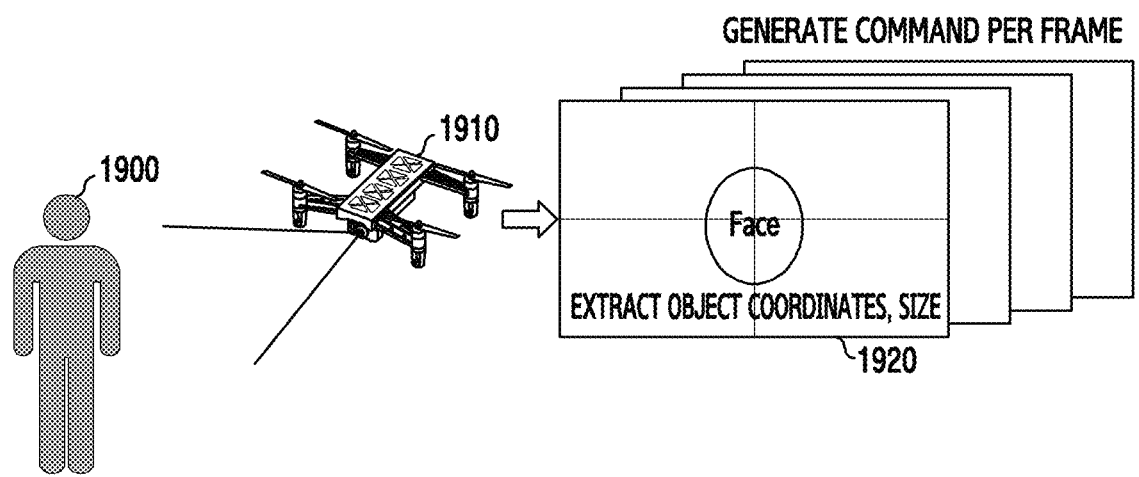
FIGS. 19A and 19B are diagrams of an unmanned photographing device which autonomously flies to a position to attain a target composition according to an embodiment of the present disclosure.
Figure 19B:
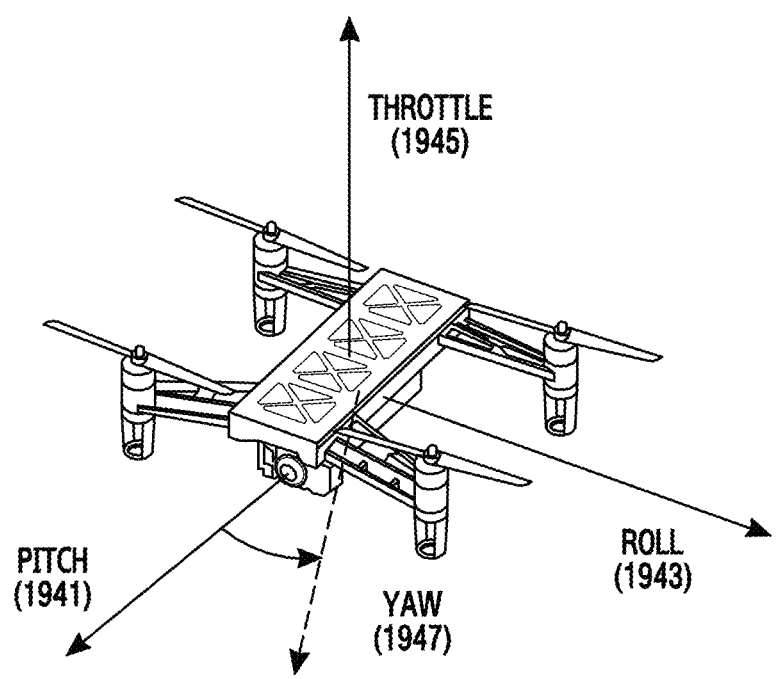

FIGS. 19A and 19B are diagrams of an unmanned photographing device which autonomously flies to a position to attain a target composition according to an embodiment of the present disclosure.

Referring to FIG. 19A, the unmanned photographing device 1910 in a photographing mode may set an image composition based on photographing information received from an electronic device. The image composition information may include at least one object information, and the object information may include position and size information of the entire or part of a subject. When the subject 1900 is a person, the object may be a face.

The unmanned photographing device 1910 in the photographing mode may extract object information from an image taken by the camera module 560. The object information may be generated with a command per captured image frame as shown in frame images 1920, and the frame image may be taken based on a preset time unit. The frame image 1920 may include the face of the subject 1900, and the unmanned photographing device may extract position and size of the face which is the object. The position information may include a center point position of the face in the entire image area, and the size may be a facial region. The unmanned photographing device may extract the facial region every time the frame image 1920 is taken, and determine whether the object is the determined size at the set position by comparing and analyzing the position and size of the facial region with the position and size of the object of the photographing information. When the position and size of the object of the image taken by the camera module 560 is different from the size and position of the set object, the unmanned photographing device may generate a movement control signal to autonomously fly to the position of the target composition according to the difference value of the position and the size of the two objects.

Referring to FIG. 19B, the unmanned photographing device may perform forward/backward movement (e.g., pitch 1941), left/right movement (e.g., roll 1943), ascend/descend (e.g., throttle 1945), and left/right rotation (e.g., yaw 1947) as described in FIGS. 9A through 9D and FIGS. 10A through 10C.

The unmanned photographing device may compare and analyze the object information of the image taken by the camera module 560 and the object information of the photographing composition received from the electronic device in step 1817, generate the movement control signal in step 1821 when the target composition is not confirmed, and autonomously fly to the target composition based on the generated movement control signal in step 1823.

In step 1821, the unmanned photographing device generates the movement control signal based on the analyzed object information. The unmanned photographing device may generate a distance movement command (e.g., pitch movement) by calculating a relative distance between the unmanned photographing device and the subject based on the acquired object size information. When the acquired object size is smaller than the object size of the target composition, the unmanned photographing device may generate a movement control signal for moving forward to the subject.

The unmanned photographing device may control a movement speed according to a size change of the object. The unmanned photographing device may generate an altitude movement (e.g., throttle) command based on the vertical coordinate of the object. The unmanned photographing device may vertically move to place the object within the desired view angle. The unmanned photographing device may generate a horizontal movement (e.g., roll) command and an azimuth control (e.g., yaw) command with the horizontal coordinate of the object. The unmanned photographing device may analyze the horizontal coordinate of the object and generate control signals for the horizontal movement and the azimuth rotation so as to place the object inside the angle of view.

Figure 20:
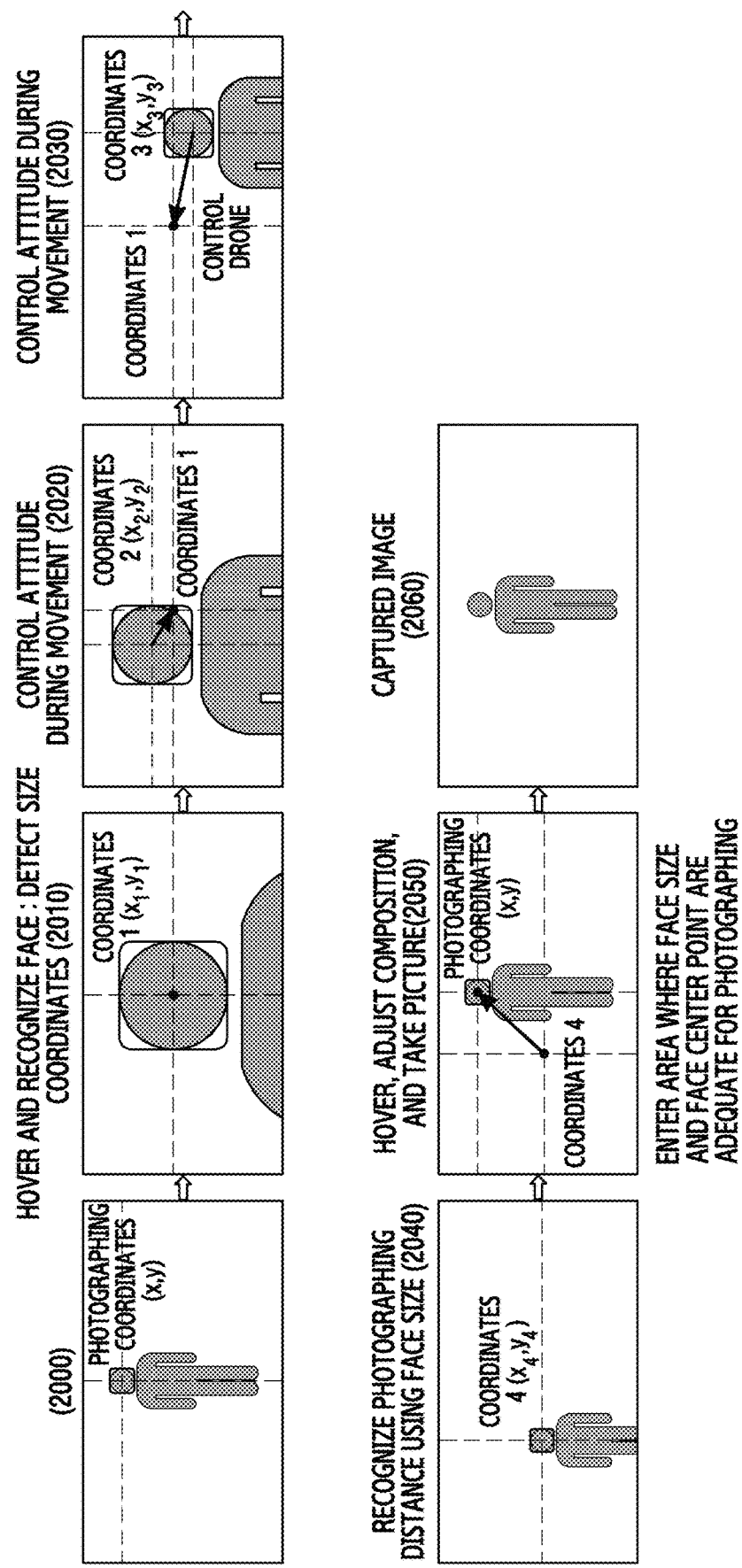
FIG. 20 is a diagram of an electronic device which autonomously flies and sets a composition according to an embodiment of the present disclosure.

FIG. 20 is a diagram of an unmanned photographing device which autonomously flies and sets a composition according to an embodiment of the present disclosure.

Referring to FIG. 20, an electronic device may extract size and position information (e.g., center point coordinates (x, y) of an object in an image) of a face which is the object from a first image 2000. The first image 2000 may be used by the electronic device to extract the object information and to generate photographing information of a target composition. A subject in the first image 2000 may be a person, and the object may be the face of the person. The electronic device may send the photographing information including the object size and position information to the unmanned photographing device through wireless connection.

The unmanned photographing device may receive from the electronic device target composition data (a first signal) extracted from the first image 2000. The unmanned photographing device receiving the target composition data may vertically rise, recognize the object, and capture an image 2010 of the subject through the camera module 560. The unmanned photographing device may compare and analyze the object information between the captured image and the image of the target composition and autonomously fly to a position of the target composition. The unmanned photographing device may fix the position of the object and autonomously fly from the fixed target position to the position where the object of the captured image matches the object size of the image of the target composition.

According to an embodiment of the present disclosure, for the autonomous flight, the unmanned photographing device may take off, hover, recognize the object, autonomously fly until the object size matches the size of the target composition, and autonomously fly to place the object at the original target composition position.

According to an embodiment of the present disclosure, for the autonomous flight, the unmanned photographing device may take off, hover, recognize the object, autonomously fly until the object position matches the position of the target composition, and autonomously fly until the object size matches the size of the target composition.

According to an embodiment of the present disclosure, for the autonomous flight, the unmanned photographing device may take off, hover, recognize the object, compare the size and position of the object with the size and position of the target composition, and autonomously fly until the object matches the size and position of the target composition.

In FIG. 20, upon recognizing the subject, the unmanned photographing device locates the object, autonomously flies over the set position until the object size matches the object size of the target composition, and then autonomously flies to the object position of the target composition. According to an embodiment of the present disclosure, the unmanned photographing device may place the object position (e.g., the center point coordinates) at the center of the image. When the object position is placed at the center of the image, the image object taken by the unmanned photographing device during the autonomous flight may not leave the angle of view.

Images 2010 through 2050 (e.g., second images) in FIG. 20 may be taken by the camera module 560 while the unmanned photographing device autonomously flies. The image 2010 may be taken by the camera module 560 when the unmanned photographing device in the photographing mode vertically takes off. The object in the image 2010 may be the face of which the center point is placed at first coordinates (x1, y1). The unmanned photographing device may analyze the size and the coordinates of the face in the captured image. When the face size of the captured image is different from the face size of the target composition (e.g., when the face size in the captured image is greater than the face size of the target composition), the unmanned photographing device may generate a backward movement control signal to move away from the subject.

When moving backward, the unmanned photographing device may capture the image 2020 through the camera module 560. In the image 2020, the face size reduces and the face position is moved to second coordinates (x2, y2). When the face size of the captured image is different from the face size of the target composition, the unmanned photographing device may autonomously fly to move the face position (e.g., the center point coordinates) from the second coordinates (x2, y2) to the first coordinates (x1, y1). Through the autonomous flight, the face size may decrease to the face size of the target composition, and then the face position may be moved. In the image 2030, the face size reduces and the face position is moved to third coordinates (x3, y3). The unmanned photographing device may autonomously fly to move the face position (e.g., the center point coordinates) from the second coordinates (x2, y2) to the first coordinates (x1, y1).

The unmanned photographing device, when autonomously flying, may capture the image through the camera module 560, analyze the captured image, and continue autonomously flying until the face size equals, or is similar to, the face size of the target composition. The face size may match the face size of the target composition at a certain position in the image 2040. In the image 2040, the face size of the image taken at fourth coordinates (x4, y4) matches the face size of the target composition.

When the face size in the captured image matches the face size of the target composition, the unmanned photographing device may move to place the face at the photographing position of the target composition as shown in the image 2050. When the face size captured at the fourth coordinates (x4, y4) matches the face size of the target composition in the image 2040, the unmanned photographing device may move (autonomously fly) to place the face (e.g., the fourth coordinates of the image 2040) at the position (e.g., the photographing coordinates (x, y)) of the target composition.

When the size and position of the face match the size and position of the face of the target composition, the unmanned photographing device may hover over the corresponding position and capture an image 2060.

According to an embodiment of the present disclosure, the unmanned photographing device may receive from the electronic device the target composition information including the object size and position information as shown in the image 200. Upon receiving the target composition information, the unmanned photographing device may enter the photographing mode, activate the camera module 560, and recognize the subject by vertically lifting and analyzing the image taken by the camera module 560. Next, the unmanned photographing device may recognize the subject or the object which is part of the subject, and determine a position (e.g., first coordinates) for recognizing the object as shown in the image 2020. When autonomously flying and recognizing the object, the unmanned photographing device may determine the position for recognizing the object at or near the center of the screen as shown in the image 1020 so as not to place the object outside the screen. The object size in the image taken during the autonomous flight may be close to the object size of the target composition as shown in the image 2020 and 2030, and the object position may change according to the object size change and the movement.

The unmanned photographing device may control the autonomous flight to place the object image captured by the camera module 560 at the determined position (e.g., to move from the second coordinates to the first coordinates, to move from the third coordinates to the first coordinates). When the object size taken during the autonomous flight matches the object size of the target composition, the unmanned photographing device may move to place the object position at the object position of the target composition and then automatically capture an image of the subject at the photographing position of the target composition.

As shown in FIG. 20, when the object (e.g., the face in the image of the person) reaches the coordinates of the target composition, the unmanned photographing device may fix its vertical and horizontal position and then attain the target composition by changing the distance alone (e.g., moving forward or backward). According to an embodiment of the present disclosure, when the face of the target composition is at a corner, the object (the entire or part of the subject) may leave the angle of view. Accordingly, the unmanned photographing device may move to place the object at the center of the screen until reaching the photographing position of the target composition. At the distance for capturing the object in the size of the target composition information, the unmanned photographing device may move vertically and horizontally and to place the object in the target composition.

Figure 21:
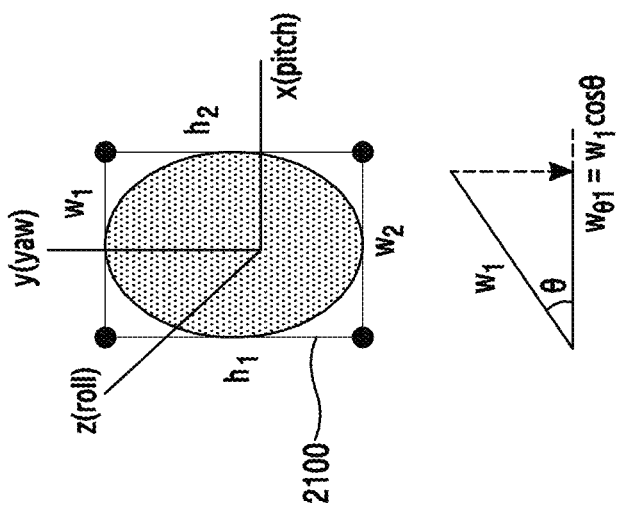
FIG. 21 is a diagram of object position correction of an unmanned photographing device according to an embodiment of the present disclosure.

FIG. 21 is a diagram of object correction of an unmanned photographing device according to an embodiment of the present disclosure.

Referring to FIG. 21, a subject may be mobile (e.g., a person, an animal, or a subject moved or movable by wind). An image taken by an electronic device and an image taken by the unmanned photographing device may be different in a photographing angle (e.g., altitude). According to an embodiment of the present disclosure, the unmanned photographing device may correct a misrecognized object in order to accurately extract a relative distance between the unmanned photographing device and the object.

A face may be corrected by considering its area and length. A face of target composition may be of a size 2100 of FIG. 21. The face size may be recognized differently according to movement of the face. The face may move when a head is lowered, turned, or tilted. When the face size does not match the target face size 2100, the unmanned photographing device may autonomously fly until the face size of the target composition is recognized. In so doing, when the distance from the person which is the subject is at the position of the target composition and the person bends or turns his/her head, the face size which is the object may be recognized smaller than the face size of the target composition. When the subject tilts his/her head, the unmanned photographing device may recognize the face 2100 in a size 2113 at the target composition position. When the subject lowers his/her head, the unmanned photographing device may recognize a size 2123. When the subject turns his/her head, the unmanned photographing device may recognize a size 2133.

As shown in FIG. 21, when the subject lowers his/her head, the face size recognized by the unmanned photographing device may reduce to the size 2123. When recognizing the face size according to the lowered head, the unmanned photographing device may correct the face size with the pitch axis by adding a region 2125 to the region 2123.

When the subject turns his/her head, the face size recognized by the unmanned photographing device may reduce to the size 2133. When recognizing the face size according to the turned head, the unmanned photographing device may correct the face size with the yaw axis by adding a region 2135 to the region 2133.

When the subject tilts his/her head, the face size recognized by the unmanned photographing device may match the face size 2113 of the target composition. Thus, the unmanned photographing device may correct a face size 2115 with the roll axis, without expanding the facial area. The object may be corrected as shown in FIG. 21, and the correction may be applied to subjects other than the face in the same manner.

Figure 22:
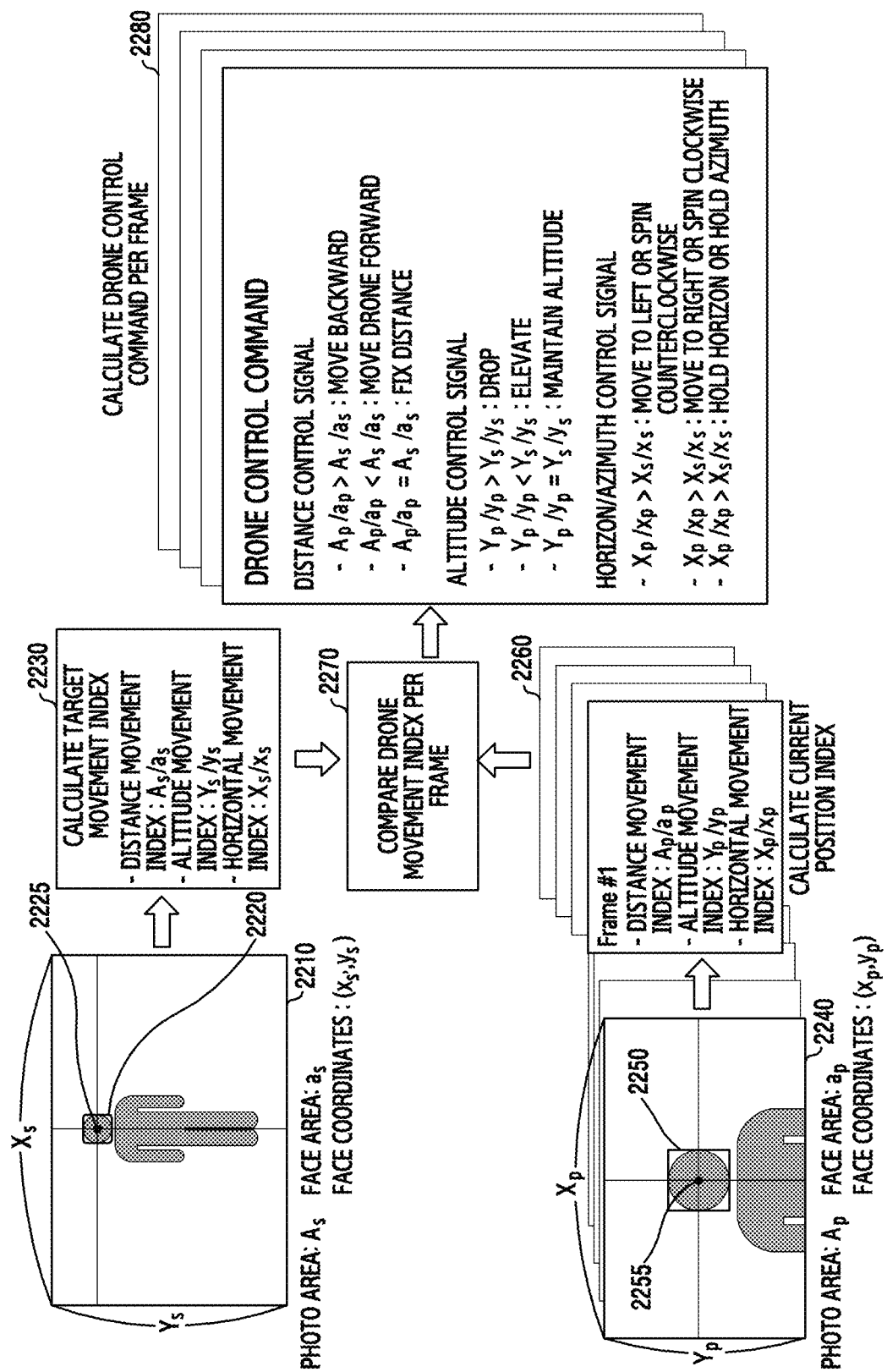
FIG. 22 is a diagram of movement control of an unmanned photographing device according to an embodiment of the present disclosure.

FIG. 22 is a diagram of movement control of an unmanned photographing device according to an embodiment of the present disclosure.

Referring to FIG. 22, the unmanned photographing device may receive photographing information including target composition information from an electronic device. The target composition information may include an image size (e.g., picture area) 2210, an object size (e.g., face area) 2220, and an object position (e.g., center point coordinates of the face) 2225.

When entering a photographing mode, the unmanned photographing device may analyze the target composition information and calculate a movement index 2230 up to a target position. The movement index may include a distance movement index, an altitude movement index, and a horizontal movement index. The distance movement index may be determined by a ratio of a photo area $A_S$ and a face area $a_S$ in the photo image. The altitude movement index may be determined by a ratio of a Y-axis length $Y_S$ (e.g., the height of the photo image) and a Y coordinate value $y_S$ of the center coordinates of the main subject in the photo image. The horizontal movement index may be determined by a ratio of an X-axis length $X_S$ (e.g., the width of the photo image) and an X coordinate value $x_S$ of the center coordinates of the main subject in the photo image.

The unmanned photographing device in the photographing mode may capture an image by driving the camera module 560. A size 2240 of the image taken by the camera module 560 may be different from the size of the image 2210. The aspect ratio and/or the resolution of the image for generating the photographing information in the electronic device may be different from the aspect ratio and/or the resolution of the image taken by the camera module 560 of the unmanned photographing device.

To capture the same image as the target composition information, the unmanned photographing device may match the aspect ratio of the image. The unmanned photographing device may calculate the distance movement index, the altitude movement index, and the horizontal movement index of a corresponding image frame 2260 by analyzing the object of the image taken by the camera module 560. The distance movement index may be determined by a ratio of a photo area $A_P$ and a face area $a_P$ in the image taken by the unmanned photographing device. The altitude movement index may be determined by a ratio of a Y-axis length $Y_P$ (e.g., the height of the photo image) and a Y coordinate value $y_P$ of the center coordinates of the main subject in the image taken by the unmanned photographing device. The horizontal movement index may be determined by a ratio of an X-axis length $X_P$ (e.g., the width of the photo image) and an X coordinate value $x_P$ of the center coordinates of the main subject in the image taken by the unmanned photographing device.

After calculating the movement index of the corresponding frame, the unmanned photographing device may compare the movement index of the corresponding frame with a target movement index 2270 and generate a movement control signal 2280 of the corresponding frame based on the comparison. The movement control may be the autonomous flight of the unmanned photographing device. The movement control of the unmanned photographing device may include distance control, altitude control, and horizon/azimuth control. The distance control may move backward, move forward, or hold the distance according to a difference of the two distance movement indexes. The altitude control may elevate, drop, or maintain the altitude according to a difference of the two altitude movement indexes. The horizon/azimuth control may move to the left or turn counterclockwise, move to the right or turn clockwise, hold the horizon, or hold the azimuth according to a difference of the two horizontal movement indexes.

Figure 23:
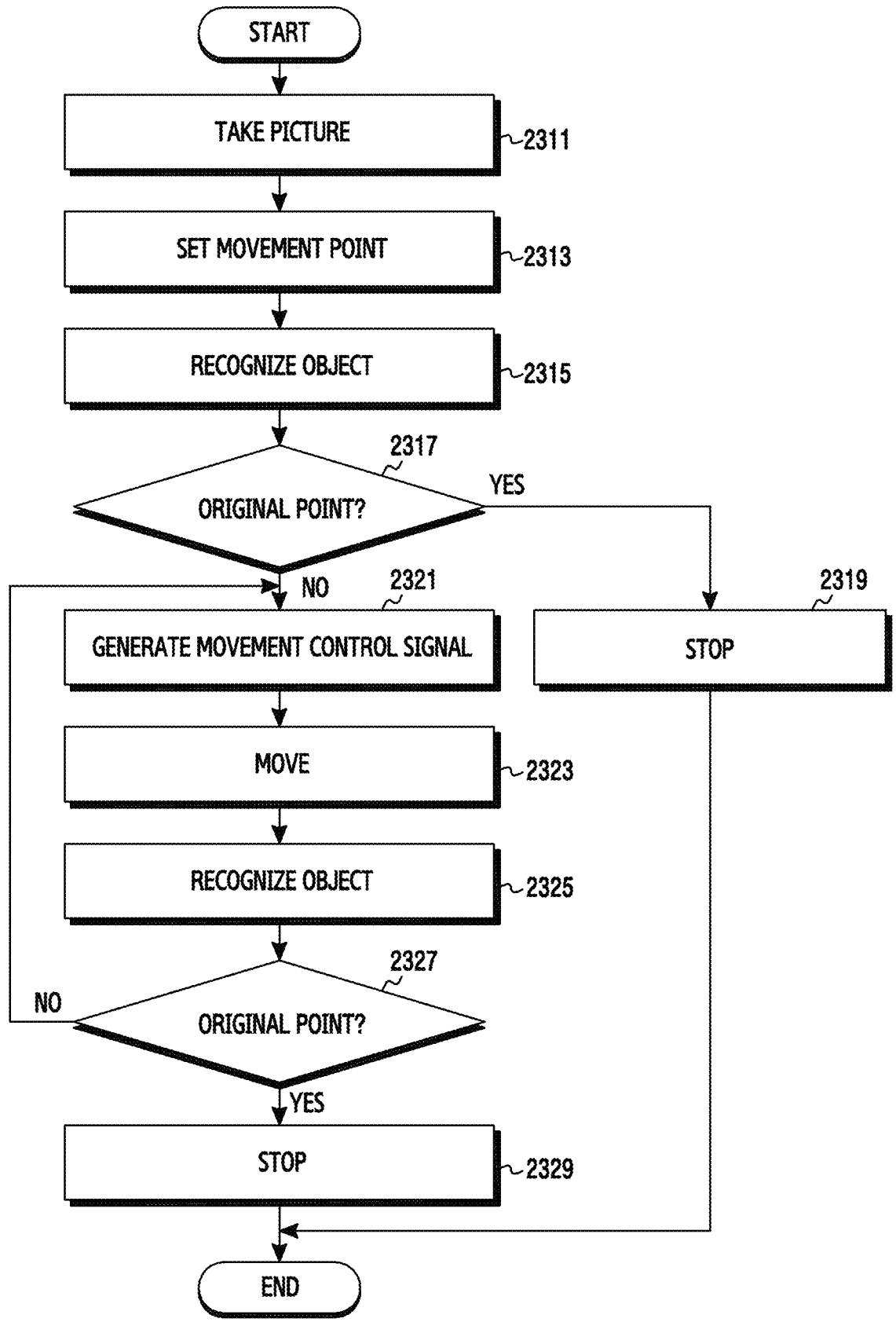
FIG. 23 is a flowchart of a method for terminating photographing in an unmanned photographing device according to an embodiment of the present disclosure.

FIG. 23 is a flowchart of a method for terminating photographing in an unmanned photographing device according to an embodiment of the present disclosure.

Referring to FIG. 23, the unmanned photographing device may autonomously fly in a photographing mode. When arriving at a target composition position, the unmanned photographing device may stop the autonomous flight, hover, and capture an image of a subject in step 2311. The unmanned photographing device may store the captured image in the memory module 540 and send the image to an electronic device through the communication module 550. After terminating the photographing, the unmanned photographing device determines a movement point to return to in step 2313. The movement point to return to may be a departure point. When the unmanned photographing device is a UAV, the movement point may be a takeoff point of the unmanned photographing device.

When terminating the photographing mode and determining to move to the original position, the unmanned photographing device recognizes an object by analyzing the image taken by the camera module 560 during the movement (e.g., after taking the picture, when the unmanned photographing device autonomously flies to land at the original position) in step 2315.

Based on the object recognition, the unmanned photographing device may analyze (determine) the original position. When the object size is a size of the original point, the unmanned photographing device may recognize the original position in step 2317 and stop (e.g., land) its operation in step 2319.

When determining no original position, the unmanned photographing device generates a movement control signal by analyzing the captured image in step 2321 and moves according to the movement control signal in step 2323. In 2325, the unmanned photographing device which is moving captures an image through the camera module 560 and analyzes the original position by analyzing the captured image. When determining the original position, the unmanned photographing device recognizes the original position in step 2327 and stop its movement (e.g., land) in step 2329.

After terminating the photographing, the unmanned photographing device may set the movement point to return to. The movement point to return to may be the takeoff point for the automatic photographing. Upon determining the movement point (e.g., the takeoff point), the unmanned photographing device may recognize the takeoff point by analyzing the image taken by the camera module 560 and then automatically land.

Figure 24A:
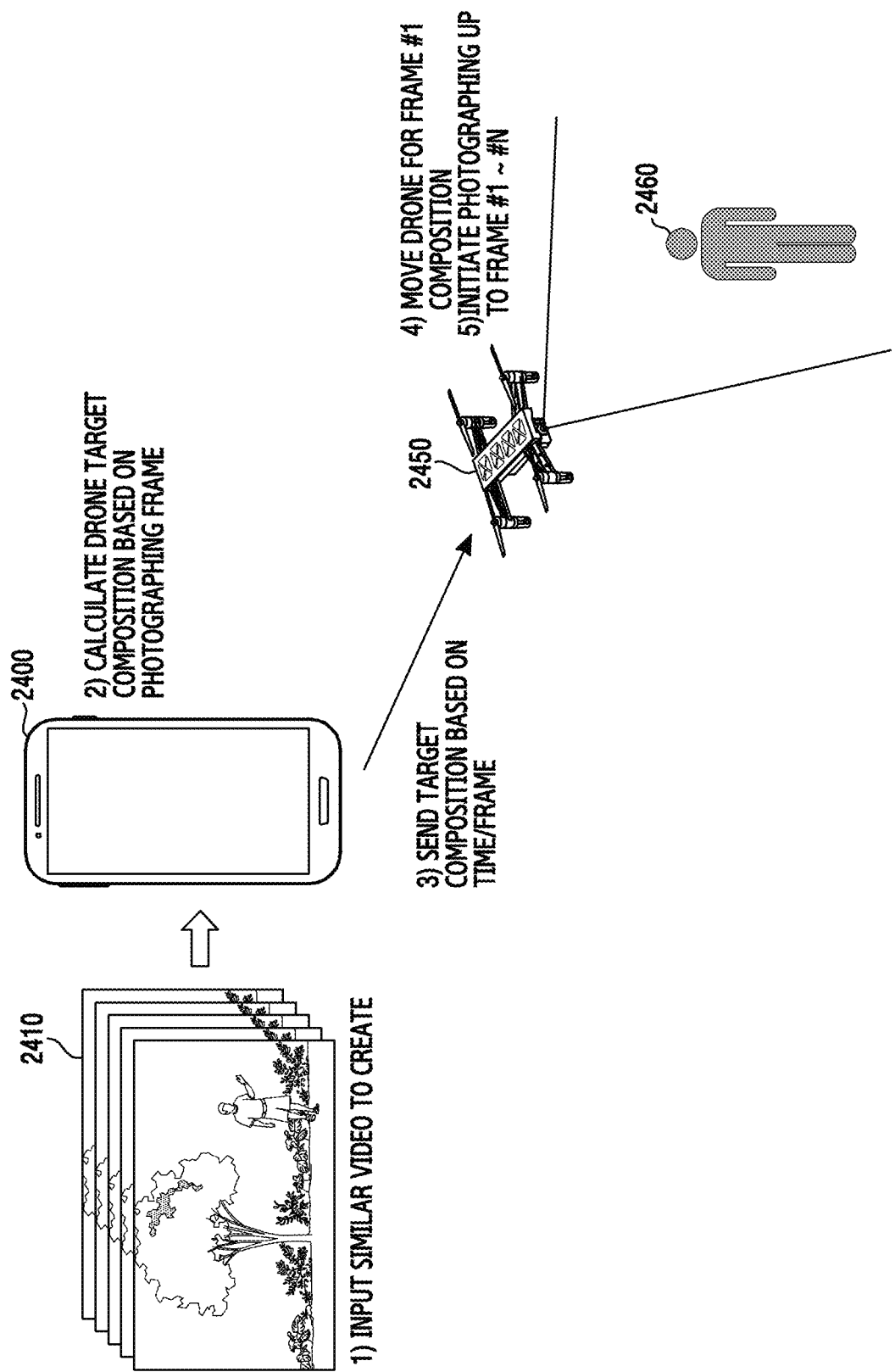
FIGS. 24A and 24B are diagrams of video capture by an unmanned photographing device according to an embodiment of the present disclosure.
Figure 24B:
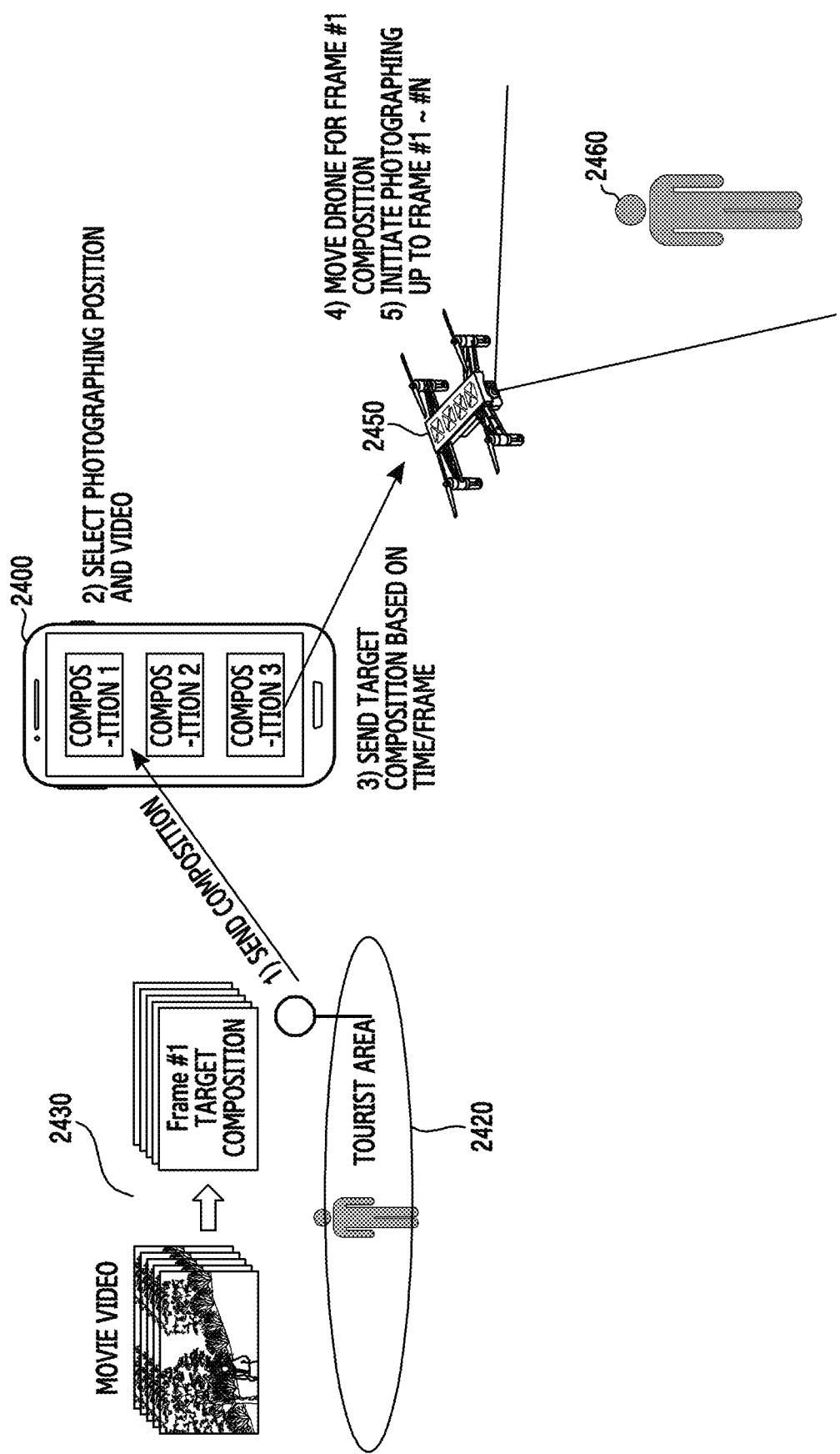

FIGS. 24A and 24B are diagrams of video capture using an unmanned photographing device according to an embodiment of the present disclosure. The unmanned photographing device of FIGS. 24A and 24B may be constructed as shown in FIG. 7.

Referring to FIG. 24A, when creating a video using the unmanned photographing device 2450, an electronic device 2400 may calculate video target composition using a video 2410 which is similar to the video being created. The electronic device 2400 may capture a video of intended composition through a camera, and receive a video of intended composition through a communication module. The electronic device 2400 may calculate the target composition by selecting images at intervals from images of the video. The electronic device 2400 may select images at frame intervals (e.g., 30 fps, 60 fps) or at time intervals (e.g., 1/30 second, 1/10 second, 1/5 second, 1 second).

The electronic device 2400 may calculate the target composition by analyzing composition of objects in the images selected from the video. The object may include at least one main subject and/or a background (e.g., horizon, sun, mountain, etc.). Composition information may include relative position and size information of the subject in the image. When the subject is a person, the composition information may include position and size information of a body part (e.g., face) in the image. The electronic device 2400 may calculate the target composition including the size of the main subject and/or the background and the position of the image (picture). The electronic device 2400 may send photographing information including the calculated target composition information to the unmanned photographing device 2450 through the communication module 420.

Without a user's direct control, the unmanned photographing device 2450 may capture a video based on the target composition information received from the electronic device 2400. Upon receiving the photographing information from the electronic device 2400, the unmanned photographing device 2450 may autonomously fly and capture a video based on the target composition information of the video images in the received photographing information and an image (e.g., preview image) received through the camera module.

When receiving the photographing information from the electronic device 2400, the unmanned photographing device 2450 may enter a photographing mode. The photographing mode may be set by the electronic device 2400 or by the unmanned photographing device 2450. The unmanned photographing device 2450 receiving the photographing information may automatically enter the photographing mode and take a picture by autonomously flying based on the received photographing information.

In the photographing mode, the unmanned photographing device 2450 may take off (e.g., vertically rise, hover) to capture an image of a subject 2460. When arriving at a position for recognizing the subject 2460 after the takeoff, the unmanned photographing device 2450 may check the target composition corresponding to a first image of the video 2410 and autonomously fly based on the target composition of the first image. The unmanned photographing device 2450 may adjust the photographing composition and control its altitude and distance by considering the angle of view, and generate a vision-based flight control signal per captured image frame. The unmanned photographing device 2450 may analyze images (e.g., preview images) taken by the camera module (e.g., the camera module 560 of FIG. 5) at attitude control points, analyze the subject composition in the angle of view, and autonomously fly to the set photographing position.

When autonomously flying to a position matching the composition of the photographing information, the unmanned photographing device 2450 may capture an image of the photographing composition including the subject 2460. Next, the unmanned photographing device 2450 confirms target composition of a next image and moves. When recognizing the same composition (the size/position of the subject captured by the camera module) as the composition of the size and position of the main subject and/or the background of the photographing information, the unmanned photographing device 2450 may take a video. Next, the unmanned photographing device 2450 may move and take the last image (e.g., in a video including frames 1 through N, the frame N image) of the video 2410 when the target composition of the last image is obtained. Next, the unmanned photographing device 2450 may terminate the video capture.

Referring to FIG. 24B, many users may create various videos 2430 in an area 2420 where many people visit, such as a tourist area. The video 2430 may be created in the area 2420 and downloaded over the Internet. The video may be created using the unmanned photographing device 2450 in the area 2420, and the video 2430 may include target composition information per captured image frame. The user may download the video taken in the area 2420 and the target composition information per captured image frame and store them in the electronic device 2400.

After entering the area 2420 with the electronic device 2400, the user may select the photographing position and the video 2430 created at the corresponding position in the area 2420 using the electronic device 2400. The video 2430 may be created using the unmanned photographing device 2450, and the electronic device 2400 may use the target composition information in the video 2430. When the video 2430 does not include the target composition information, the electronic device 2400 may calculate target composition of images of the video based on the photographing times or frames of the images of the video 2430.

The electronic device 2400 may send photographing information including the target composition information of the video to the unmanned photographing device 2450 through the communication module 420. Based on the target composition information of the video 2430, the unmanned photographing device 2450 may autonomously fly and capture a video including the subject 2460.

Figure 25:
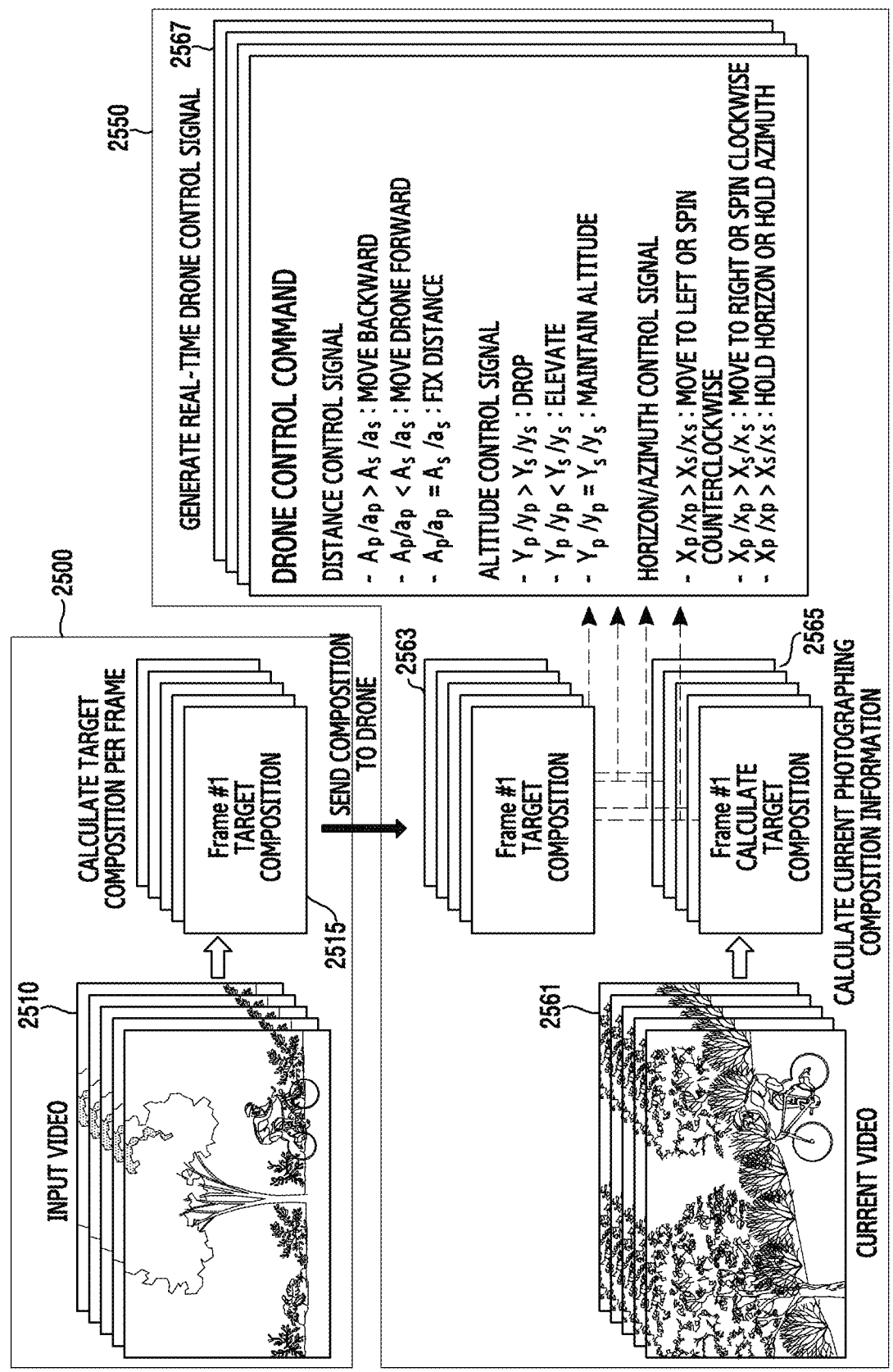
FIG. 25 is a diagram of video capture by an electronic device and an unmanned photographing device according to an embodiment of the present disclosure.

FIG. 25 is a diagram of video capture using an electronic device and an unmanned photographing device according to an embodiment of the present disclosure.

Referring to FIG. 25, a reference video 2510 may be used by an electronic device 2500 to calculate target composition information 2515. The reference video 2510 may be created by the electronic device 2500, or downloaded using a social networking service (SNS) or the Internet. The electronic device 2500 may calculate the target composition 2515 of the images at intervals in the reference video 2510. The interval may be each frame or a plurality of frames. The interval may be each frame. The electronic device 2500 may calculate the target composition for every frame image of the video, and send the calculated target composition information 2515 per captured image frame to the unmanned photographing device 2550 through the communication unit 420.

The unmanned photographing device 2550 may receive the target composition information 2563 per captured image frame from the electronic device 2500 through the communication module 550. The unmanned photographing device 2550 receiving a user input, a command of the electronic device 2500, or the target composition information 2563 per captured image frame may enter a video capture mode.

In the video capture mode, the unmanned photographing device 2550 may capture a video 2561 through the camera module 560. The unmanned photographing device 2550 may calculate target composition information 2565 of the created video by comparing the created video 2561 with the target composition information 2563 per captured image frame. Based on the target composition information 2565 of the created video, the unmanned photographing device 2550 may generate its movement control signal 2567. The movement control signal 2567 may be fed to the movement control module 510 to generate a signal for controlling the flight of the unmanned photographing device 2550 in real time.

Figure 26:
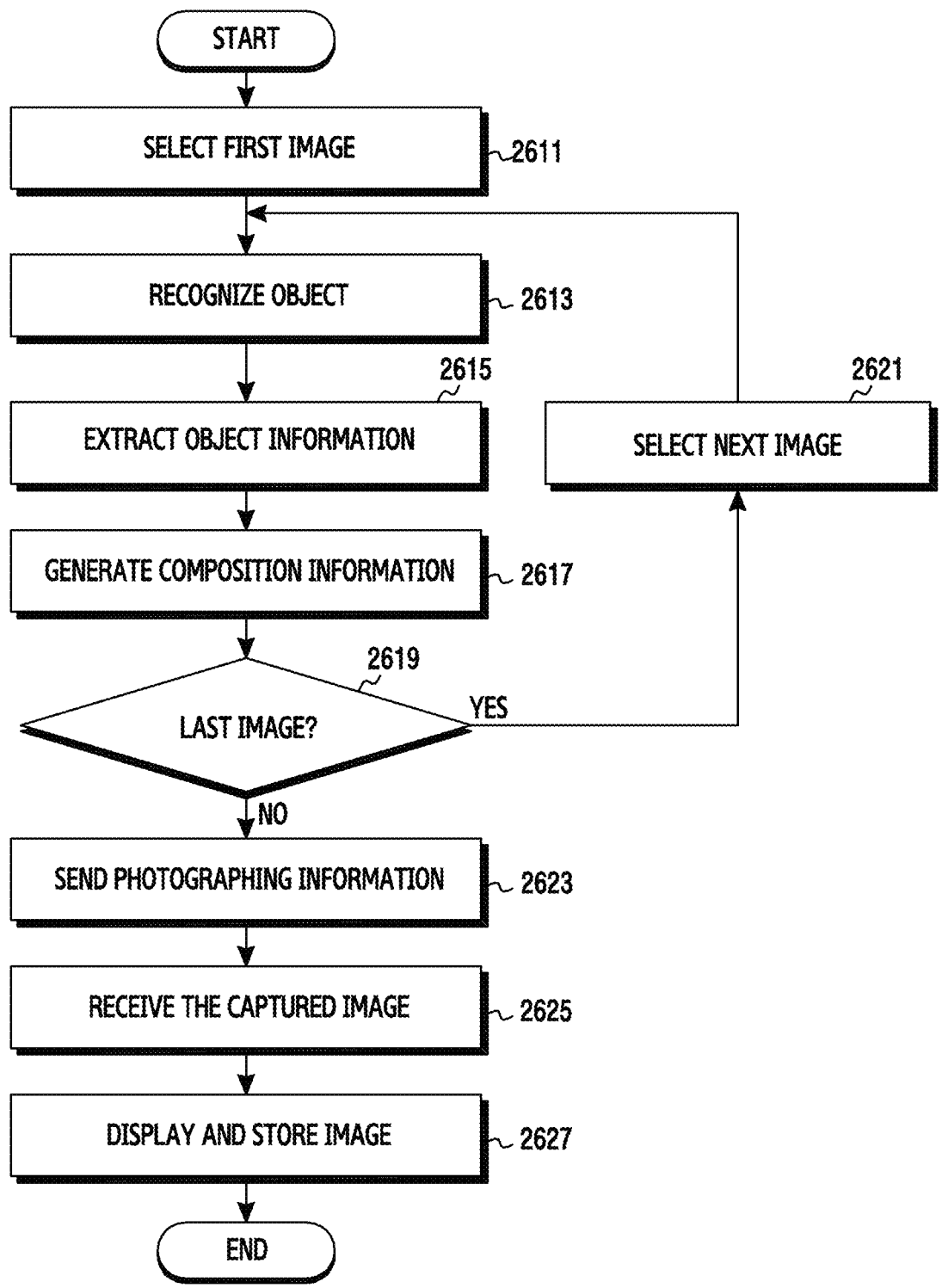
FIG. 26 is a flowchart of a method for controlling video capture by an unmanned photographing device in an electronic device according to an embodiment of the present disclosure.

FIG. 26 is a flowchart of a method for controlling video capture using an unmanned photographing device in an electronic device according to an embodiment of the present disclosure.

According to an embodiment of the present disclosure, the electronic device 400 may generate photographing information by analyzing composition of frame images of a video.

Referring to FIG. 26, in step 2611, the electronic device selects a first image (e.g., the first frame image of the video) of the video. In step 2613, the electronic device recognizes an object in the first image. The object may be a person, a thing, or both in the image.

When extracting the object, the electronic device extracts object information in the image in step 2615, one or two or more objects may be extracted from the image. Objects may include two persons or a person and a thing (e.g., horizon, sun, etc.). The object in the image may include the person as a main subject and a background as a minor subject. When recognizing a plurality of objects, the electronic device may extract information of each object. At least one object information extracted may include size information of a corresponding object and object position information in the image.

In step 2617, the electronic device generates composition information of the image including the object information. The composition information may be composition information of the image including the object. For example, composition information of a person may include object position size in the image, and may further include a background index (e.g., horizon, sun, etc.) beside the object.

In step 2619, the electronic device determines whether the image is the last frame image of the video. When determining no last image, the electronic device selects a next image in step 2621 and calculates composition information of the next image selected in steps 2613 through 2619.

After generating the composition information of the last frame image of the video in step 2619, the electronic device generates photographing information based on the composition information. In step 2623, the electronic device wirelessly connects with the unmanned photographing device through a communication unit and sends the photographing information through the wireless connection.

After capturing an image based on the photographing information, the unmanned photographing device may send the captured image to the electronic device. In step 2625, the electronic device receives the captured image (e.g., video). In step 2627, the electronic device displays the received image on the display 450 or stores the received image in the storage unit 410. According to an embodiment of the present disclosure, the electronic device may send the captured image to the Internet or the cloud network.

Figure 27:
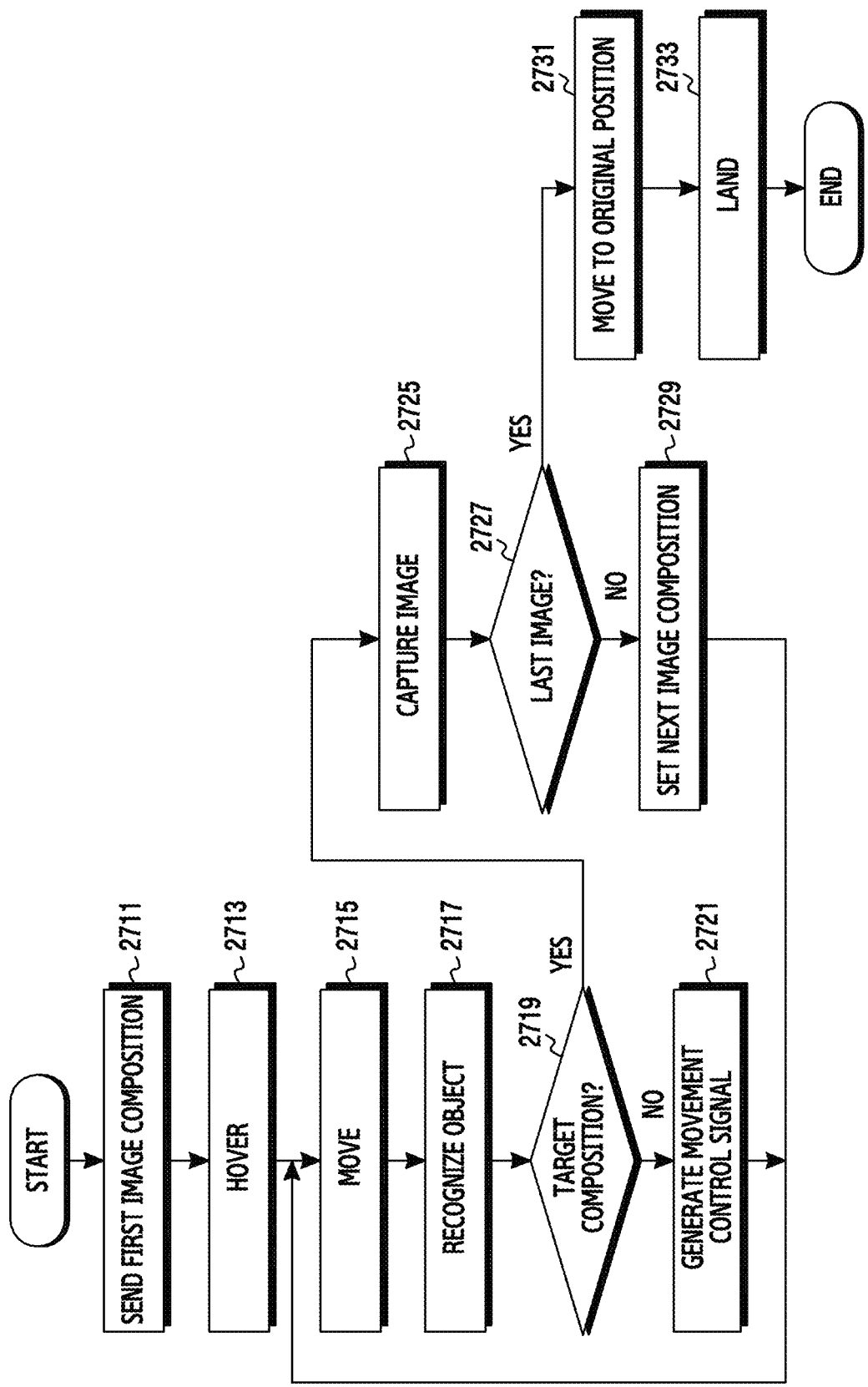
FIG. 27 is a flowchart of a method for capturing a video using an unmanned photographing device according to an embodiment of the present disclosure.

FIG. 27 is a flowchart of a method for capturing a video using an unmanned photographing device according to an embodiment of the present disclosure.

Referring to FIG. 27, the unmanned photographing device may capture a video based on photographing information. The photographing information may include object information in frame images of the video. The object information may include the entire or part of a subject in the image. According to an embodiment of the present disclosure, when receiving video photographing information from the electronic device, the unmanned photographing device may enter a photographing mode. In the photographing mode, the unmanned photographing device may capture a video based on received photographing information. In the photographing mode, the unmanned photographing device may automatically capture a video based on the received photographing information. The photographing mode may be entered under control of the electronic device, or through an external button of the unmanned photographing device.

In the video capture mode, the unmanned photographing device analyzes target composition information of a first image of the video photographing information in step 2711. When the unmanned photographing device is a UAV, the unmanned photographing device takes off and hovers to discover an object in step 2713. The unmanned photographing device hovering may recognize an object to automatically capture. The unmanned photographing device may confirm composition of the first image of the video to create, automatically take off (e.g., vertically take off), and search for an object. When recognizing the object, the unmanned photographing device may hover and check the composition. In step 2715, the unmanned photographing device moves.

In step 2717, the unmanned photographing device captures an image through the camera module 560 and calculates photographing composition by checking an object in the captured image. In step 2719, the unmanned photographing device analyzes whether the photographing composition matches the target composition. When the photographing composition of the image taken by the camera module 560 does not match the target composition in step 2719, the unmanned photographing device generates a movement control signal according to the analysis in step 2721 and autonomously flies based on the movement control signal in step 2715.

When the photographing composition matches the target composition in step 2719, the unmanned photographing device captures an image in step 2725. In step 2727, the unmanned photographing device determines whether the captured image is the last frame image of the video. When determining no last image, the unmanned photographing device sets the target composition of a next image in step 2729 and moves in step 2715.

When capturing the video, the unmanned photographing device may compare and analyze the target composition information per captured image frame of the video received from the electronic device with the images of the video taken by the camera module, when the frame image of the video matches the target composition information, capture and store the corresponding image, and move to capture a next frame image. By repeating such operations, the unmanned photographing device may capture the images based on the target composition information per captured image frame.

When capturing the last frame image of the video in step 2727, the unmanned photographing device moves to an original position (e.g., the takeoff position for the video capture) in step 2731 and lands at the original position in step 2733.

Figure 28:
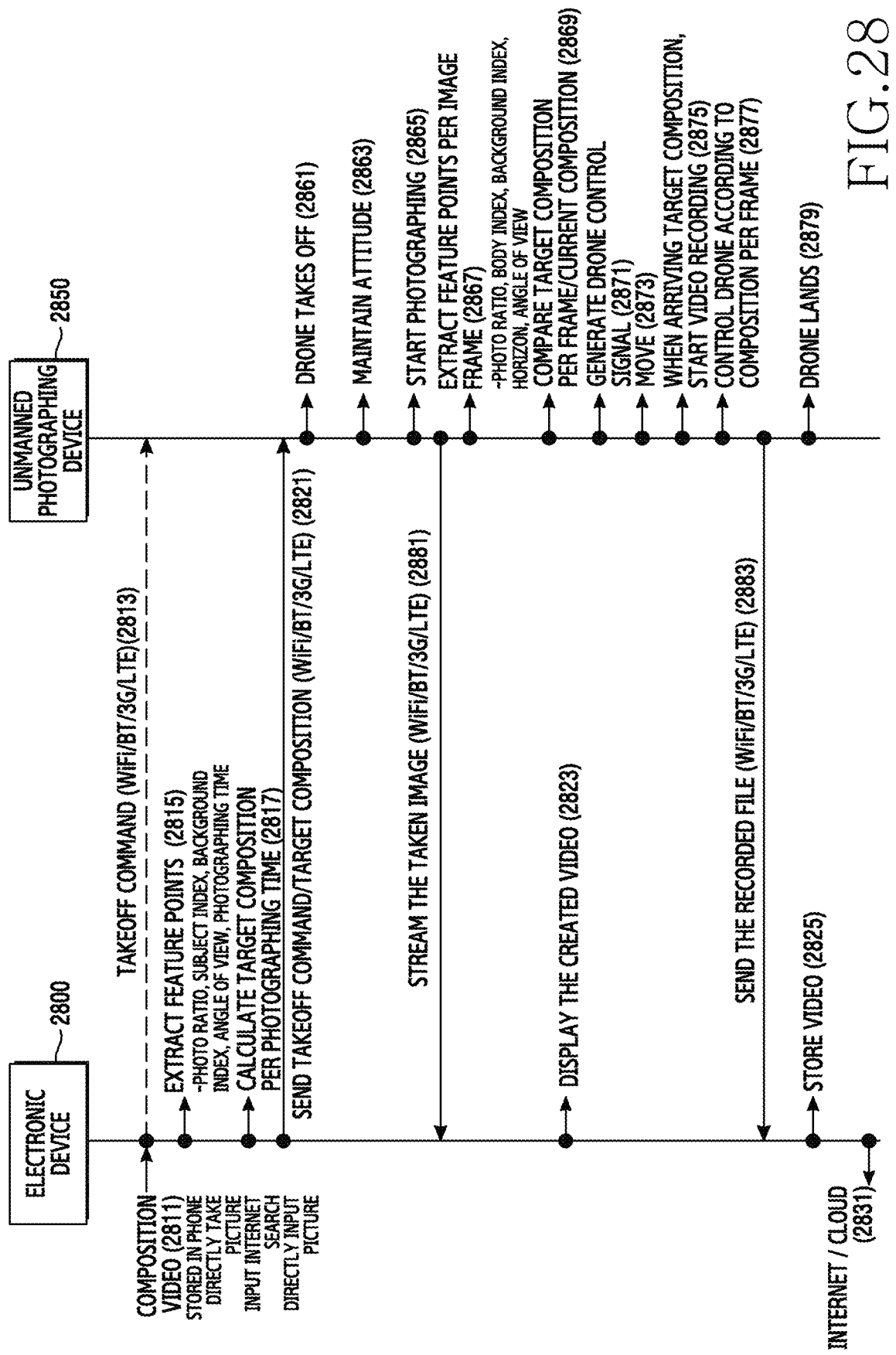
FIG. 28 is a flow diagram of a method of video capture by an electronic device and an unmanned photographing device according to an embodiment of the present disclosure.

FIG. 28 is a flow diagram of a method of video capture using an electronic device and an unmanned photographing device according to an embodiment of the present disclosure.

Referring to FIG. 28, an electronic device 2800 inputs a video to capture through an unmanned photographing device 2850 (drone) in step 2811. The video may be stored in the electronic device 2800, captured by a camera unit, downloaded over the Internet, or directly input from the user.

After selecting the video, the electronic device 2800 issues a takeoff command to the unmanned photographing device 2850 in step 2813. In step 2815, the electronic device 2800 extracts composition information (feature point) of frame images of the video. The composition information may include an image ratio, an object index (e.g., a body index of a person, a background index of a background object), an angle of view, and a photographing time.

The electronic device 2800 calculates target composition of the images per photographing time (e.g., per captured image frame) in step 2817 and sends the target composition information to the unmanned photographing device 2850 in step 2821. When not sending the takeoff command in step 2813, the electronic device 2800 also sends a video capture command (e.g., takeoff command) in step 2821.

When receiving the target composition information and the takeoff command from the electronic device 2800 in step 2821, the unmanned photographing device 2850 takes off in step 2861 and maintains its movement attitude in step 2863. The unmanned photographing device 2850 may hover and recognize an object. In step 2865, the unmanned photographing device 2850 moves to the photographing composition position of the first image of the video and captures an image through the camera module. In step 2881, the unmanned photographing device 2850 sends the captured image to the electronic device 2800. The transmitted image, which is the streaming image, may be a preview image.

In step 2867, the unmanned photographing device 2850 obtains composition information of the image taken in the movement. The composition information obtained from the image taken by the unmanned photographing device 2850 may include an image ratio, an object index (e.g., body index, background index), and an angle of view.

In step 2869, the unmanned photographing device 2850 compares and analyzes the obtained composition information and the image composition information per captured image frame received from the electronic device 2800. The unmanned photographing device 2865 generates a movement control signal for moving to the target composition based on the comparison of the composition information in step 2871, and moves based on the movement control signal in step 2873.

When moving to the target composition position, the unmanned photographing device 2850 captures (records) an image in step 2875. In step 2875, the unmanned photographing device 2850 moves to the target composition position of the first image, and captures the first image of the video based on the first image target composition. Next, the unmanned photographing device 2850 captures an image based on the target composition of a next image per captured image frame and moves to a position corresponding to the target composition information in step 2877.

When moving to the first image position of the video, the unmanned photographing device 2850 captures a first image. When the target composition per captured image frame matches, the unmanned photographing device 2850 may capture an image. Upon capturing the last image of the video, the unmanned photographing device 2850 terminates the video capture and sends the captured video to the electronic device 2800 in step 2883. In step 2879, the unmanned photographing device 2850 lands at the original position.

When receiving the video from the unmanned photographing device 2850 in step 2883, the electronic device 2800 stores and/or displays the received video in step 2825. In step 2831, the electronic device 2800 sends the received video to the Internet and/or the cloud network according to a user request.

The electronic device 2800 and the unmanned photographing device 2850 may capture the video with the same composition using a previously captured video. A general user, who is not a professional pilot, may experience difficulty in capturing a video with high-quality composition using the unmanned photographing device 2850. According to an embodiment of the present disclosure, a general user who is not familiar with the control may capture a video with composition of the professional pilot using the unmanned photographing device 2850.

The user may input a video of his/her intended composition to the electronic device 2800. The electronic device 2800 may calculate composition per captured image frame of the input video or may calculate composition of image frame of the input video selected at time intervals (e.g., 1/30 second, 1/10 second, 1/5 second, 1 second), and send the calculated target composition and photographing time to the unmanned photographing device 2850. The unmanned photographing device 2850 may autonomously fly by comparing the input target composition with the composition information of the video taken by itself, and capture a corresponding image when the target composition matches the composition of the captured image during the autonomous flight. When capturing the last image (e.g., the target time of the video) of the input video, the unmanned photographing device 2850 may terminate the video capture, send the captured video to the electronic device 2800, and land.

Figure 29A:
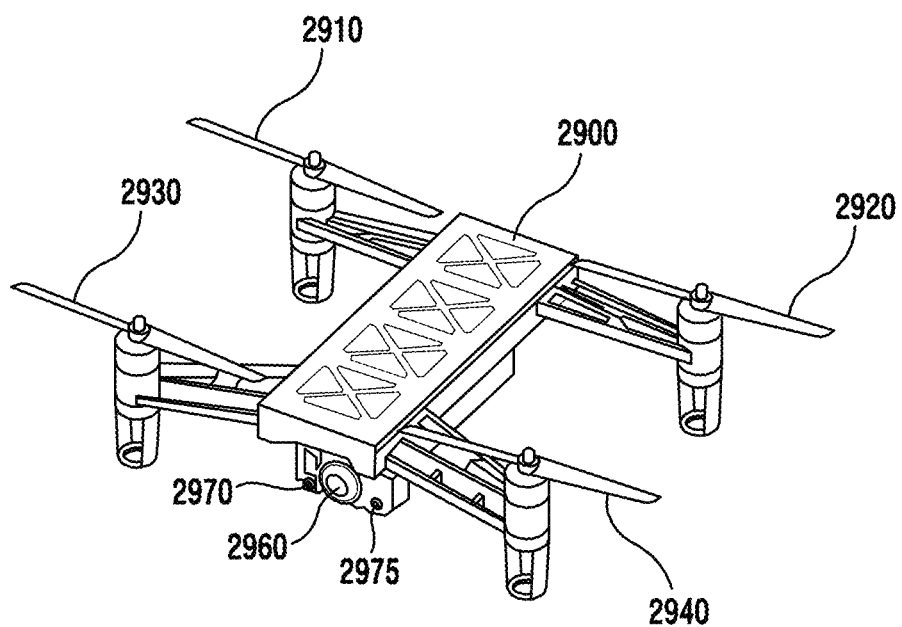
FIGS. 29A, 29B, and 29C are diagrams of video capture by an unmanned photographing device according to an embodiment of the present disclosure.
Figure 29B:
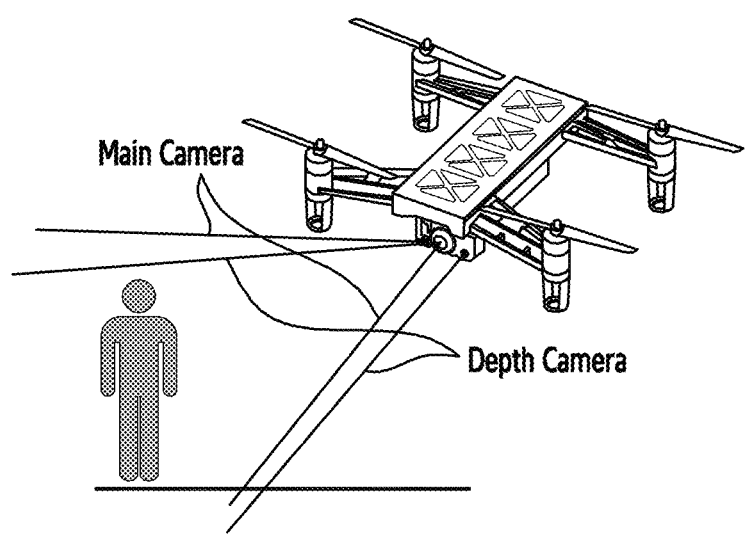
Figure 29C:
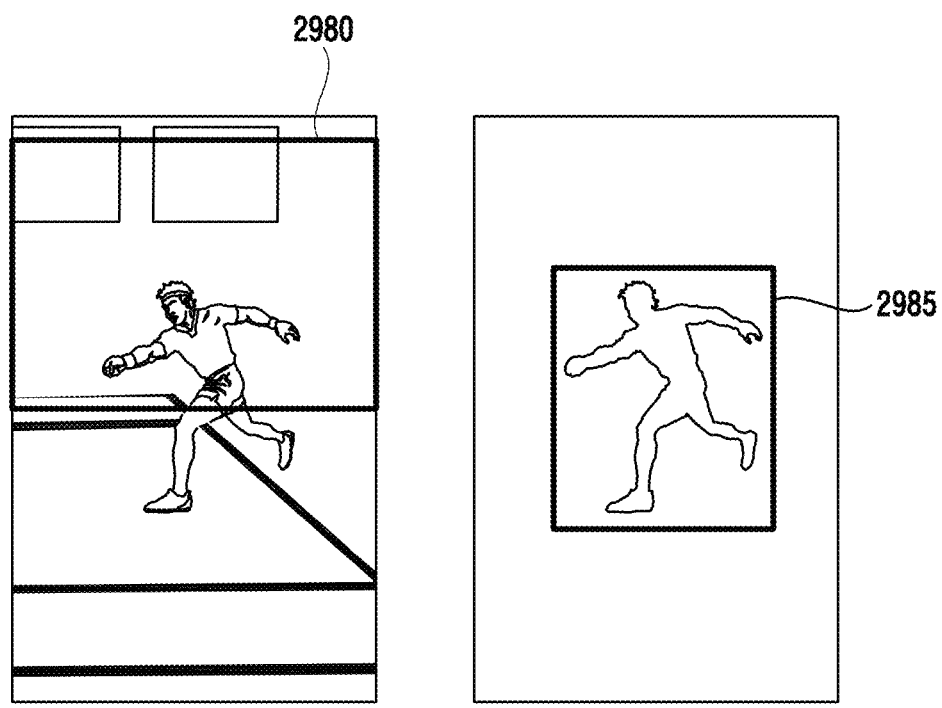

FIGS. 29A, 29B, and 29C are diagrams of video capture using an unmanned photographing device according to an embodiment of the present disclosure.

In FIG. 29A, the unmanned photographing device is a drone, and the drone is a quadcopter. As shown in FIG. 29A, the drone includes a main board 2900 constructed as shown in FIG. 7, propellers 2910 through 2940, a main camera 2960, and depth cameras (e.g., a first depth camera 2970, a second depth camera 2975). The main camera 2960 may be disposed beneath the unmanned photographing device, and the first depth camera 2970 and the second depth camera 2975 may be disposed on both sides of the main camera 2960. The first depth camera 2970 and the second depth camera 2975 may include stereo depth cameras.

Referring to FIG. 29B, the main camera 2960 may capture an object, and the first depth camera 2970 and the second depth camera 2975 may acquire 3D coordinate (position) information from the object. The unmanned photographing device may generate a movement control signal of photographing composition based on the 3D coordinate (position) information of the object acquired by the depth cameras 2970 and 2975, and capture an image through the main camera 2960 at a target composition position.

Referring to FIG. 29C, the main camera 2960 may capture a subject image 2980, and the depth cameras 2970 and 2975 may acquire a depth image 2985 (or depth information) of the subject. The unmanned photographing device may calculate a distant background composition based on the subject image 2980 taken by the main camera 2960. The distant background composition may include a geographic feature such as a horizon, a structure, or a tree in the image. The unmanned photographing device may calculate specific close composition of the main subject based on the subject depth information 2985 acquired by the depth cameras 2970 and 2975. The specific close composition may include a size, a position, a distance, and a height of the subject.

The unmanned photographing device may control distance movement based on the object size, control a movement velocity based on a size change of the object, control altitude movement based on a vertical coordinate of the object, and control horizontal and azimuth movement based on a horizontal coordinate of the object. With respect to the background object, the unmanned photographing device may control the altitude movement based on a horizontal background (e.g., horizon) and control the horizontal and azimuth movement according to vertical and horizontal positions of the background object.

Figure 30:
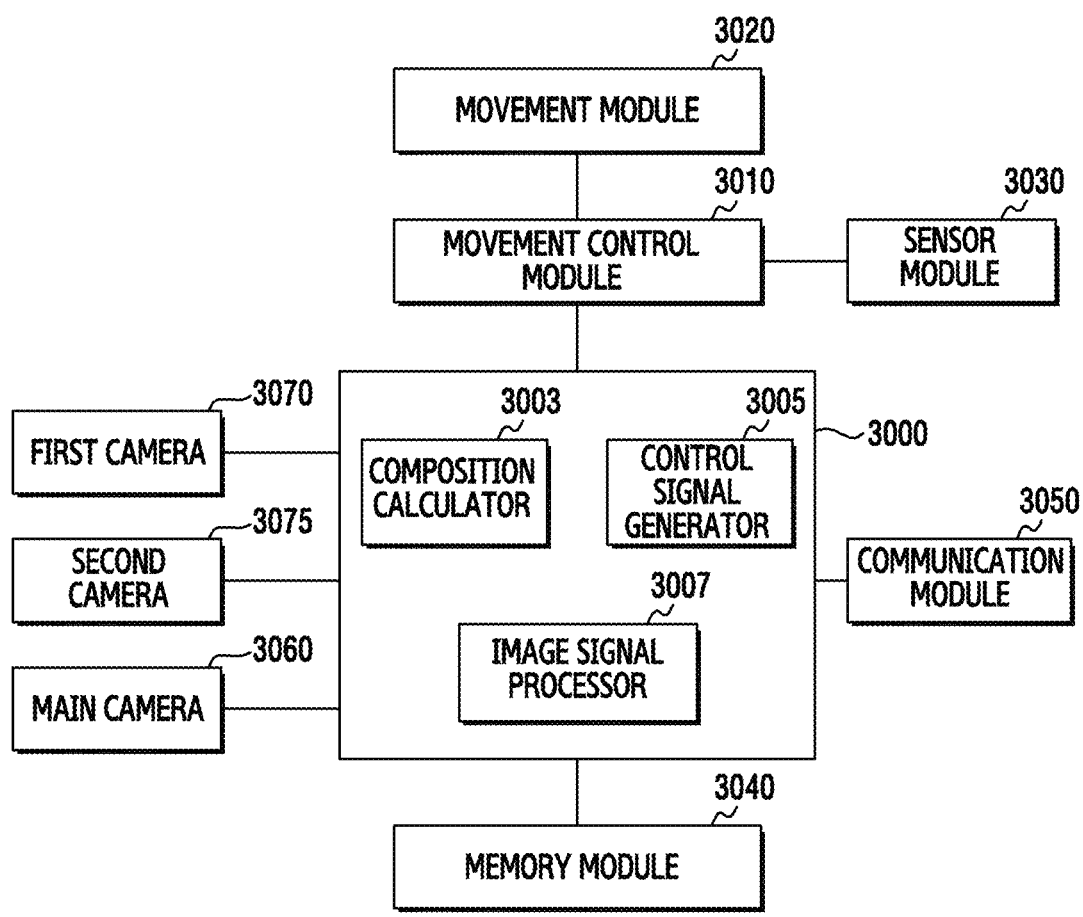
FIG. 30 is a block diagram of an unmanned photographing device including a depth camera according to an embodiment of the present disclosure.

FIG. 30 is a block diagram of an unmanned photographing device including a depth camera according to an embodiment of the present disclosure.

Referring to FIG. 30, according to an embodiment of the present disclosure, the unmanned photographing device includes a processor 3000, a movement control module 3010, a movement module 3020, a sensor module 3030, a memory module 3040, a communication module 3050, a main camera 3060, a first camera 3070, and a second camera 3075.

The processor 3000 may process operations or data for controlling one or more other components of the unmanned photographing device and/or application execution. The processor 3000 may control video capture by comparing and analyzing photographing information including 3D composition coordinate information received from the electronic device with a captured 3D image. When setting 3D composition information, the processor 3000 may move the unmanned photographing device (e.g., autonomously fly a UAV) by controlling the movement control module 3010. When the unmanned photographing device moves to the 3D position determined per captured image frame, the processor 3000 may capture an image. When the photographing ends, the processor 3000 may control the unmanned photographing device to return to its original position. The processor 3000 may send photographing information including the captured image and the image photographing information to the electronic device.

The movement control module 3010 may control the movement of the unmanned photographing device using position and attitude information of the unmanned photographing device. The movement control module 3010 may control the flight and the attitude of the unmanned photographing device. The movement control module 3010 may obtain attitude information and/or position information of the unmanned photographing device through a GPS module of the communication module 3050 and the sensor module 3030.

The movement module 3020 may move the unmanned photographing device under the control of the movement control module 3010. When the unmanned photographing device is a drone, the movement module 3020 may include motors corresponding to propellers respectively.

The sensor module 3030 may include sensors for controlling the attitude of the unmanned photographing device. The sensors for calculating the attitude of the unmanned photographing device may include a gyro sensor and an acceleration sensor. To calculate the azimuth and to prevent drift of the gyro sensor, the sensor module 3030 may combine an output of a terrestrial magnetism sensor/compass sensor.

The memory module 3040 may store multiple instances of composition information. The composition information may include subject type information, image resolution or size (XY ratio) information, composition information regarding subject position, size, and orientation, and composition area information. The memory module 3040 may store the photographing information received from the electronic device. The photographing information may include target composition information to automatically photograph and/or camera control information. The target composition information may include object size and position information in an image.

The communication module 3050 may receive the photographing information including the target composition information of the video from the electronic device. According to an embodiment of the present disclosure, the communication module 3050 may send the image taken by the unmanned photographing device and the photographing information to the electronic device.

The main camera 3060 may capture frame images corresponding to the photographing composition position per captured image frame based on the control of the processor 3000.

The first camera 3070 and the second camera 3075 may serve as stereo depth cameras, and may be disposed on both sides of the main camera 3060 as shown in FIG. 29A. The first and second cameras 3070 and 3075 may acquire the depth information of the object, and the processor 3000 may calculate the composition information of the captured image based on the depth information acquired by the first and second cameras 3070 and 3075.

The processor 3000 may include a composition calculator 3003, a control signal generator 3005, and an image signal processor 3007. The memory module 3040 may include instructions for capturing video images based on the information of the first and second cameras 3070 and 3075. The processor 3000 may calculate composition information for the video capture based on the instructions, and capture an image at a target composition position.

The composition calculator 3003 may calculate the 3D position information of the image taken by the main camera 3060 based on the depth information acquired by the first and second cameras 3070 and 3075.

The control signal generator 3005 may generate a movement control signal of the unmanned photographing device by comparing and analyzing the 3D composition information of the target composition received from the electronic device with the calculated 3D position information. The movement control module 3010 may move the unmanned photographing device by controlling the movement module 3020 according to the movement control signal generated by the processor 3000. When the photographing composition of the captured image matches the target composition, the processor 3000 may capture an image using the main camera 3060.

According to an embodiment of the present disclosure, when generating the target composition information based on the video, the electronic device may generate the target composition information including the distant background composition and the close detailed composition information of the subject based on the image. The unmanned photographing device may generate distant background composition and close detailed composition information of the subject using the main camera 3060 and the first and second cameras 3070 and 3075.

In the operations of the unmanned photographing device, the processor 3000 may calculate the target composition based on the images taken by the main camera 3060 and the first and second cameras 3070 and 3075 which are the depth cameras. The main camera 3060 may generate an image (e.g., a 2D image) of the subject. The first and second cameras 3070 and 3075 may obtain the depth information of the subject. The composition calculator 3003 may calculate the distant background composition based on the subject image taken by the main camera 3060, and calculate the close detailed composition of the main object based on the subject depth information acquired by the first and second cameras 3070 and 3075. The control signal generator 3005 may generate the movement control signal of the unmanned photographing device by comparing and analyzing the target composition information received from the electronic device with the calculated distant background composition and close detailed composition information of the subject.

The movement control module 3010 may move the unmanned photographing device by controlling the movement module 3020 according to the movement control signal. When the photographing composition matches the target composition, the processor 3000 may capture the image taken by the main camera 3060.

Figure 31:
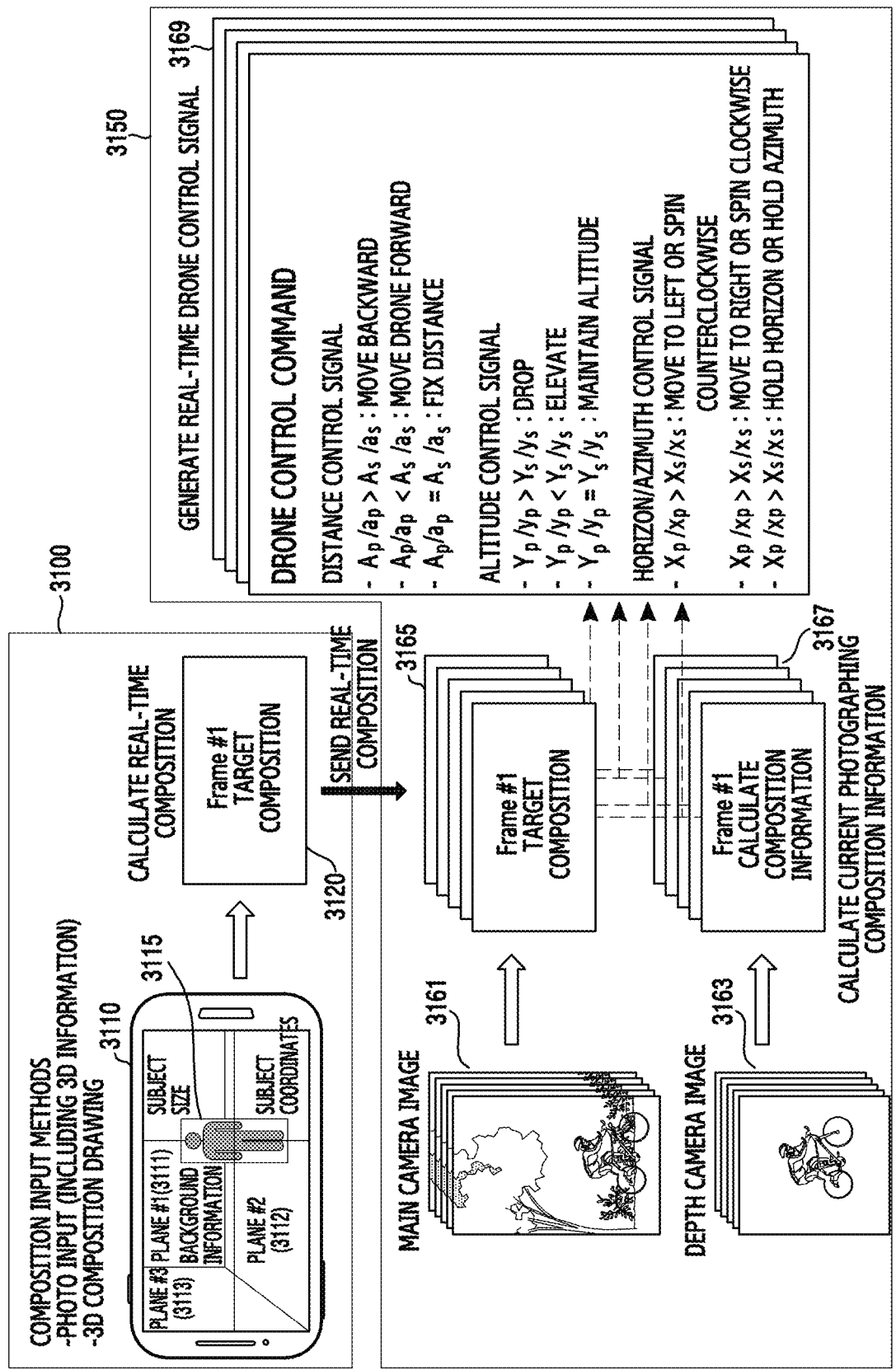
FIG. 31 is a diagram of video capture based on three-dimensional (3D) position information in an electronic device and an unmanned photographing device according to an embodiment of the present disclosure.

FIG. 31 is a diagram of video capture based on 3D position information in an electronic device and an unmanned photographing device according to an embodiment of the present disclosure.

Referring to FIG. 31, the electronic device 3100 may obtain target composition information 3115 of a frame image 110 in a video. The frame image 3110 may be a 3D image. The frame image 3110 may include an object 3115 placed on a first plane (e.g., an X plane) 3111, a second plane (e.g., a Y plane) 3112, and a third plane (e.g., a Z plane) 3113. The object 3115 may be represented by 3D coordinates.

When generating composition information of the frame image 3110, the electronic device 3100 may include a 3D coordinate value of the object 3115 and information about the object 3115, the first plane 3111, the second plane 3112, and the third plane 3113. The information about the first plane 3111, the second plane 3112, and the third plane 3113 may include background object information. When a main subject is the object 3115 and a background is a horizon, the electronic device 3100 may include 3D position information regarding a body index of the object 3115 and position information of a horizon plane (e.g., the first plane and/or the second plane).

The electronic device 3100 may calculate target composition information 3120 including 3D position information of objects and backgrounds (e.g., plane information) of frame images at intervals in the video. The interval may be each frame. The electronic device 3100 may calculate 3D target composition for all of the frame images of the video, and send the calculated target composition information 3120 per captured image frame to the unmanned photographing device 3150 through the communication unit 420).

The unmanned photographing device 3150 may receive the target composition information 3120 per captured image frame from the electronic device 3100 through the communication unit 550. When receiving a user input, a command of the electronic device 3100, and target composition information 3165 per captured image frame, the unmanned photographing device 3150 may enter a video capture mode. In the video capture mode, the main camera of the unmanned photographing device 3150 may capture an image 3161 including an object and the first and second cameras may acquire depth information 3163 of the object. The unmanned photographing device 3150 may calculate 3D composition information 3167 of the image from the depth information 3163, and generate its movement control signal by comparing and analyzing the calculated 3D composition information 3167 with the target composition information 3165 calculated by the electronic device 3100. When the calculated 3D composition information 3167 matches the target composition information 3165 calculated by the electronic device 3100, the unmanned photographing device 3150 may capture and store the image 3161 taken by the main camera.

Figure 32:
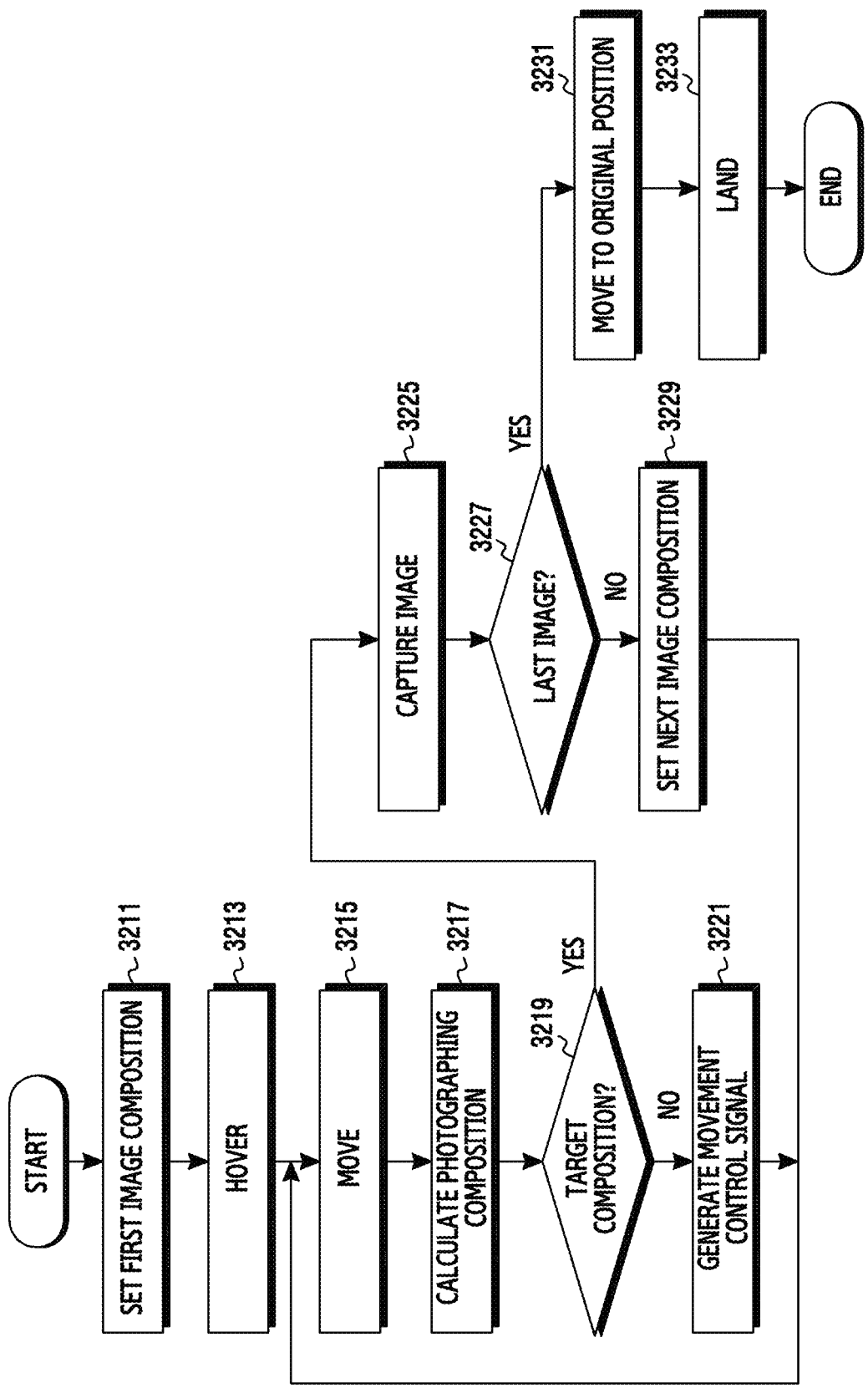
FIG. 32 is a flowchart of a method for capturing a video by an unmanned photographing device according to an embodiment of the present disclosure.

FIG. 32 is a flowchart of a method for capturing a video in an unmanned photographing device according to an embodiment of the present disclosure.

According to an embodiment of the present disclosure, the unmanned photographing device may capture a video based on photographing information including 3D target composition information. The photographing information may include object information in frame images of the video. The object information may include the entire or part of a subject in the image. The object information may include main object and/or at least one background object information. The main object may include a person (or an animal) or a thing (e.g., a structure, a tree, a vehicle, etc.) The background object may include a mountain, a river, a horizon, a building, the sun, and the like. The background object may include a particular plane. The background object may include at least one plane information of the X plane, the Y plane, and the Z plane.

When receiving the video photographing information from the electronic device, the unmanned photographing device may automatically perform a video photographing operation based on the received video photographing information. The video may be created by the user through the electronic device or through the unmanned photographing device.

Referring to FIG. 32, in the video photographing mode, the unmanned photographing device determines a position to move to by checking target composition information of a first image of the video photographing information in step 3211. The target composition information may be 3D information, and include position and composition information of the main object and/or the background objects. In the video capture mode, the unmanned photographing device may autonomously fly from a current position to the position for the target composition of the first image.

After checking the target composition information of the first image, the unmanned photographing device may start to move. When the unmanned photographing device is a UAV, the unmanned photographing device takes off and hovers to discover an object in step 3213. The unmanned photographing device hovering may recognize an object in an image taken by a camera module. The unmanned photographing device may confirm composition of the first image of the video to create, automatically take off (e.g., vertically take off), and search for an object. When recognizing the object, the unmanned photographing device may hover and check the composition. In step 3215, the unmanned photographing device moves.

In step 3217, the unmanned photographing device, which is moving, calculates 3D composition information (e.g., photographing composition) of the objects based on the depth information of the images taken by depth cameras. In step 3219, the unmanned photographing device compares and analyzes the calculated composition information with the target composition. The target composition information may be received from the electronic device.

When the image taken by the camera module 560 is not the target composition in step 3219, the unmanned photographing device generates a movement control signal to move to a position of the target composition information according to the analysis in step 3221. Next, the unmanned photographing device autonomously flies based on the movement control signal in step 3215.

When the composition information of the frame image of the current video matches the target composition information (or similar composition satisfying a preset condition) in step 3219, the unmanned photographing device captures an image taken by the main camera 3060 in step 3225. In step 3227, the unmanned photographing device determines whether the captured image is the last frame image of the video. When determining no last image, the unmanned photographing device sets target composition of a next image in step 3229 and returns to step 3215.

When capturing the video, the unmanned photographing device, which is moving, may calculate 3D composition information of the image (e.g., the main object and/or the background object in the image) taken based on the depth information of the depth cameras. The unmanned photographing device may compare and analyze the calculated 3D composition information and the target composition information received from the electronic device, generate the movement control signal to move to the position of the target composition, and move according to the generated movement control signal. When calculating the composition information matching the image of the target composition, the unmanned photographing device may capture and store an image taken by the main camera. When the target composition information is set at frame intervals. The unmanned photographing device may repeat the above operations and create a video by capturing and storing frame images which match the target composition.

By repeating such operations, the unmanned photographing device may capture images based on the target composition information per captured image frame. When recognizing the last frame image of the video in step 3227, the unmanned photographing device moves to its original position (e.g., a takeoff position for the video capture) in step 3231 and lands at the original position in step 3233.

According to an embodiment of the present disclosure, the unmanned photographing device may calculate the composition of the captured image based on the image and the image depth information. When moving in step 3215, the unmanned photographing device may capture an image through the main camera 3060 and obtain subject depth information in the image through the first and second cameras 3070 and 3075. The unmanned photographing device may calculate distant background composition based on the image taken by the main camera 3260 and calculate close detailed composition of the subject based on the subject depth information obtained through the first and second cameras 3070 and 3075 in step 3217.

In step 3219, the unmanned photographing device compares and analyzes the calculated composition information with the target composition information. When the calculated composition information does not match the target composition information, the unmanned photographing device generates a movement control signal to move to the position of the target composition information in step 3221 and autonomously flies based on the movement control signal in step 3215.

When the obtained image composition information matches the target composition information (or similar composition satisfying a preset condition) in step 3219, the unmanned photographing device captures an image taken by the main camera in step 3225. When the captured image is not the last frame image of the video in step 3227, the unmanned photographing device sets target composition of a next image in step 3229 and returns to step 3217. When recognizing that the captured image is the last image in step 3227, the unmanned photographing device finishes the video capture.

A method for operating an unmanned photographing device according to an embodiment of the present disclosure includes establishing a wireless connection with an external electronic device comprising a display using a communication device, receiving a first signal at a first 3D position from the external electronic device through the wireless connection, the first signal comprising data associated with a first image comprising a first object, determining a second 3D position based on at least part of the data and the first 3D position, controlling the unmanned photographing device to fly to or near the second 3D position, tracking a second object corresponding to the first object using a camera, capturing a second image comprising the second object at or near the second 3D position such that the second image corresponds to the first image, and sending the second image to the external electronic device through the wireless connection.

Controlling an unmanned photographing device to fly is performed by a control command which is calculated by comparing first 3D position information and second 3D position information. The data includes composition of the first image. The data includes a relative position of the first object in the first image. The first object includes a face of a person. Instructions executed by a processor cause the unmanned photographing device to change an orientation of the camera based on at least part of the data.

The external electronic device establishes a wireless connection with the unmanned photographing device using a communication device, sends target composition data to the unmanned photographing device through the wireless connection, the target composition data comprising data of the first image comprising an object, and receives the second image from the unmanned photographing device through the wireless connection.

Sending the target composition data includes recognizing selection of the first image, recognizing the object based on analysis of the selected first image, extracting object information of the recognized object, and generating the target composition data based on the object information.

The target composition data includes a position and a size of the object in the first image. The target composition data further includes a feature point.

As set forth above, according to an embodiment of the present disclosure, to take a picture using a UAV, the unmanned photographing device automatically captures an image of an intended composition in association with an application of a mobile communication device. To take a picture using the UAV, when the user sets and sends an image or composition to capture through the electronic device without directly controlling the UAV, the UAV sets the photographing composition, autonomously flies, automatically takes a picture in the set composition, and then returns to the original position of UAV. The unmanned photographing device provides an intuitive and easy photographing function.

While the present disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An unmanned photographing device comprising:
   a housing;
   a navigation device attached to or integrated with the housing and configured to fly an electronic device to a three-dimensional (3D) position;
   at least one wireless communication device;
   a camera attached to or integrated with the housing;
   a processor electrically connected to the navigation device, the at least one wireless communication device, and the camera; and
   a memory electrically connected to the processor and storing instructions, which when executed, cause the processor to:
   establish a wireless connection with an external electronic device, using the at least one wireless communication device,
   receive a first signal at a first 3D position from the external electronic device through the wireless connection, the first signal comprising data associated with a first image comprising a first object,
   determine a second 3D position based on at least part of the data and the first 3D position,
   control the navigation device to fly the electronic device to or near the second 3D position,
   track a second object corresponding to the first object using the camera,
   capture a second image comprising the second object at or near the second 3D position such that the second image corresponds to the first image, and
   send the second image to the external electronic device through the wireless connection.

2. The unmanned photographing device of claim 1, wherein the navigation device comprises:
   at least one propeller; and
   a controller for controlling the at least one propeller.

3. The unmanned photographing device of claim 1, wherein the data comprises a composition of the first image.

4. The unmanned photographing device of claim 3, wherein the data further comprises a relative position of the first object in the first image.

5. The unmanned photographing device of claim 1, wherein the first object comprises a face of a person.

6. The unmanned photographing device of claim 1, wherein the instructions cause the processor to change an orientation of the camera based on at least part of the data.

7. An electronic device comprising:
   a housing;
   at least one wireless communication device;
   a camera attached to or integrated with the housing;
   a display;
   a processor electrically connected to the at least one wireless communication device and the camera; and
   a memory electrically connected to the processor and storing instructions, which when executed, cause the processor to:
   establish a wireless connection with an unmanned photographing device using the at least one wireless communication device,
   send a first signal to the unmanned photographing device at a first 3D position through the wireless connection, the first signal comprising data associated with a first image comprising a first object, and
   receive a second image taken at or near a second 3D position such that the second image corresponds to the first image, from the unmanned photographing device through the wireless connection.

8. The electronic device of claim 7, wherein the data comprises a composition of the first image.

9. The electronic device of claim 8, wherein the data further comprises a relative position of the first object in the first image.

10. The electronic device of claim 9, wherein the first object comprises a face of a person.

11. A method for operating an unmanned photographing device comprising:
    establishing a wireless connection with an external electronic device using a communication device;
    receiving a first signal at a first three-dimensional (3D) position from the external electronic device through the wireless connection, the first signal comprising data associated with a first image comprising a first object;
    determining a second 3D position based on at least part of the data and the first 3D position;
    controlling the unmanned photographing device to fly to or near the second 3D position;

tracking a second object corresponding to the first object using a camera;

capturing a second image comprising the second object at or near the second 3D position such that the second image corresponds to the first image; and sending the second image to the external electronic device through the wireless connection.

12. The method of claim 11, wherein controlling the unmanned photographing device to fly is performed by a control command calculated based on comparing first 3D position information and second 3D position information.

13. The method of claim 11, wherein the data comprises a composition of the first image.

14. The method of claim 13, wherein the data further comprises a relative position of the first object in the first image.

15. The method of claim 11, wherein the first object comprises a face of a person.

16. The method of claim 11, further comprising changing an orientation of the camera based on at least part of the data.

17. The method of claim 11, further comprising:

sending target composition data to the unmanned photographing device through the wireless connection, the target composition data comprising data of the first image comprising an object; and receiving the second image from the unmanned photographing device through the wireless connection.

18. The method of claim 17, wherein sending the target composition data comprises:

recognizing a selection of the first image;

recognizing the object based on the selected first image;

extracting object information of the recognized object; and generating the target composition data based on the object information.

19. The method of claim 18, wherein the target composition data comprises a position and a size of the object in the first image.

20. The method of claim 19, wherein the target composition data further comprises a feature point.

* * * * *